(12) United States Patent
Nagano

(10) Patent No.: US 6,278,681 B1
(45) Date of Patent: Aug. 21, 2001

(54) OPTICAL HEAD, METHOD OF FABRICATING OPTICAL HEAD, AND APPARATUS FOR FABRICATING OPTICAL HEAD

(75) Inventor: Tsuyoshi Nagano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/273,725

(22) Filed: Mar. 22, 1999

(30) Foreign Application Priority Data

Mar. 24, 1998 (JP) .................................................. 10-075830
Jan. 26, 1999 (JP) .................................................. 11-016724

(51) Int. Cl.$^7$ ........................................................ G11B 7/00
(52) U.S. Cl. ................................ 369/112.16; 369/112.16; 369/112.17; 369/112.19; 369/112.26; 369/110.04
(58) Field of Search ............................ 369/44.23, 112.01, 369/112.02, 112.03, 112.17, 112.06, 112.19, 112.11, 112.16, 112.14, 112.21, 112.18, 112.28, 112.26, 110.04

(56) References Cited

U.S. PATENT DOCUMENTS

| 4,730,899 | 3/1988 | Kime et al. . |
| 5,790,502 | 8/1998 | Horinouchi et al. . |
| 5,903,529 | * 5/1999 | Nishi et al. .......................... 369/44.23 |

FOREIGN PATENT DOCUMENTS

| 61-20235 | 1/1986 | (JP) . |
| 61-3330 | 1/1986 | (JP) . |

(List continued on next page.)

OTHER PUBLICATIONS

Japanese Office Action dated Jun. 5, 2000 with partial English translation.
Japanese Offic Action dated Jun. 5, 2000 with partial English translation.
Matsumoto, et al., "The optical features of an integrated "Laser Coupler" optical pickup in the CD system", 1996, pp. 541–546.
European Search Report dated Nov. 8, 2000.
Japanese Office Action dated Feb. 14, 2001, with partial English translation.

Primary Examiner—Nabil Hindi
(74) Attorney, Agent, or Firm—McGinn & Gibb, PLLC

(57) ABSTRACT

There is provided an optical head including a laser diode chip, a lens for focusing lights onto an object, an optical separator for separating lights reflected from the object, from an optical axis of a light directing towards the lens from the laser diode chip, and a photodiode chip receiving lights having been separated from the optical axis by the optical separator. The optical separator is defined by first and second sidewalls, and first to fourth outer surfaces, and has first and second inner planes both being inclined relative to the first outer surface. A light enters the first outer surface, passes through the first and second inner planes, leaves the optical separator at the third outer surface, and is focused onto the object by the lens. The light having been reflected by the object enters the third outer surface, and is reflected at the second inner plane by the remaining half. The light having been reflected at the second inner plane is received in a front light-receiving section formed on the light-receiving plane. The light having passed through the second inner plane is reflected at the first inner plane, and is received in a rear light-receiving section formed on the light-receiving plane. The laser diode chip is positioned so that an optical length between the laser diode chip and the first inner plane is equal to (a+b−c)/2 wherein "a" indicates an optical length between the first inner plane and said rear light-receiving section, "b" indicates an optical length between the second inner plane and the front light-receiving section, and "c" indicates an optical length between the first and second inner planes.

16 Claims, 40 Drawing Sheets

U.S. PATENT DOCUMENTS

| | | |
|---|---|---|
| 2-21431 | 1/1990 | (JP) . |
| 4-134731 | 5/1992 | (JP) . |
| 5-15129 | 2/1993 | (JP) . |
| 5-73953 | 3/1993 | (JP) . |
| 5-298721 | 11/1993 | (JP) . |
| 6-302044 | 10/1994 | (JP) . |
| 6-30244 | 10/1994 | (JP) . |
| 6-333290 | 12/1994 | (JP) . |
| 7-29199 | 1/1995 | (JP) . |
| 7-262603 | 10/1995 | (JP) . |
| 8-7325 | 1/1996 | (JP) . |
| 8-36781 | 2/1996 | (JP) . |
| 8-161768 | 6/1996 | (JP) . |
| 9-44890 | 2/1997 | (JP) . |
| 9-73652 | 3/1997 | (JP) . |
| 9-251640 | 9/1997 | (JP) . |
| 9-312030 | 12/1997 | (JP) . |

\* cited by examiner

104b 第2面

$$r = \frac{n(\sqrt{2n^2-1}-1)}{n^2-1} q$$

DIFFERENCE IN OPTICAL PATH LENGTH $= r/n - q$ $$= \frac{\sqrt{2n^2-1}-n^2}{n^2-1} q$$

(n : INDEX OF REFRACTION)

OBJECT POINT OF
MICROSCOPE 601

OPTICAL HEAD, METHOD OF FABRICATING OPTICAL HEAD, AND APPARATUS FOR FABRICATING OPTICAL HEAD

BACKGROUND OF THE INVENTION

1. Field of the Invention

The invention relates to an optical head for recording data into and reproducing data from a medium such as a phase-change type optical disc and a photo-electro-magnetic tape, a method of fabricating such an optical head, and an apparatus for fabricating such an optical head.

2. Description of the Related Art

FIG. 1 illustrates an optical pickup as an example of a conventional optical head equipped with a micro-prism. The illustrated pickup is one having been suggested in Proceedings of the 6th Sony Research Forum, "The optical features of an integrated "Laser Coupler" optical pickup in the CD system", Yoshiyuki Matsumoto et al., 1996, pp. 541–546.

A light having been emitted from a laser diode chip 101 is reflected at a first plane 104a of a micro-prism 104 by half an amount, and the thus reflected light is focused onto an optical disc 106 through a lens 105. A light having been reflected at the optical disc 106 advances on the same optical path in an opposite direction, and then, is refracted at the first plane 104a to thereby enter the micro-prism 104.

The micro-prism 104 includes a second surface 104b having a half-mirror coating in the right half thereof Hence, a light having entered the second surface 104b of the micro-prism 104 transmits through the second surface 104b in half an amount, and then, is received in a front light-receiving section 103a of a photodiode chip 103. The remaining half of a light is reflected at the second surface 104b, and enters a third surface 104c of the micro-prism 104.

The second surface 104b of the micro-prism has a non-reflective coating applied thereto in the left half. Hence, a light having been reflected at the third surface 104c of the micro-prism transmits through the second surface 104b, and then, is received at a rear light-receiving section 103b of the photodiode chip 103.

Alight emitted from the laser diode chip 101 varies in an amount due to degradation with the lapse of time and variation in temperature, even if a constant current is applied to the laser diode chip 101. Hence, a light backwardly emitted from the laser diode chip 101 is received a light-receiving section (not illustrated) formed on a sub-mount 102, and a signal detected by the light-receiving section is fed back to a current to be applied to the laser diode chip 101, to thereby keep an amount of light emitted from the laser diode chip 101 constant.

As illustrated in FIG. 2, the front light-receiving section 103a is comprised of four light-receiving sections 103aa, 103ab, 103ac and 103ad defined by three divisional lines extending in a direction from the laser diode chip 101 to the micro-prism 104 (that is, a y-axis direction illustrated in FIGS. 1 and 2) in parallel with one another. Similarly, the rear light-receiving section 103b is comprised of four light-receiving sections 103ba, 103bb, 103bc and 103bd defined by similar three divisional lines. Herein, signals to be detected in the light-receiving sections 103aa to 103bd are represented with S103aa to S103bd, respectively. A focus signal FE100 is detected in accordance with the following equation.

FE100=S103aa−S103ab−S103ac+S103ad−S103ba+S103bb+S103bc−S103bd

A track error signal TE100 is detected in accordance with the following equation.

TE100=S103aa+S103ab−S103ac−S103ad−S103ba−S103bb+S103bc+S103bd

However, the conventional optical head illustrated in FIG. 1 is accompanied with the following problems.

The first problem is that it is unavoidable for an optical head to be thick.

For instance, Japanese Unexamined Patent Publication No. 6-333290 has suggested such an optical pickup as illustrated in FIG. 3. The illustrated optical pickup is designed to include a mirror 107 to reflect a light reflected at the first surface 104a, in parallel with the photodiode chip 103, in order to make the optical pickup thinner.

However, as long as a light directing from the laser diode chip 101 to the lens 105 is to be reflected at the first surface 104a of the micro-prism 104, the pickup cannot have a thickness smaller than a sum of thicknesses of the mirror 107, the micro-prism 104, and the photodiode 103.

In addition, the optical pickup illustrated in FIG. 3 has to include a second mirror 108 at which a light reflected from the mirror 107 is reflected towards the optical disc 106, as well as the first mirror 107, resulting in an increase in the number of parts and complexity in a structure.

The second problem is that a light can be utilized in an amount only by 25% at greatest.

This is because, among a light emitted from the laser diode chip 101 to the lens 105, a light not reflected but refracted at the first surface 104a of the micro-prism 104, and a light having been reflected at the optical disc 106, and then, not refracted but reflected at the first surface 104a, are consumed in loss.

There may be employed a quarter wavelength plate in order to change polarizing directions in incoming and outgoing optical path for increasing a light utilization efficiency. However, a surface having polarization can be formed only at a surface through which mediums having almost the same indexes of refraction make contact with each other. Hence, it might occur to those skilled in the art that a pillar-shaped micro-prism having a cross-section of a right-angled isos-celes triangle and having almost the same index of refraction as that of the micro-prism 104 is adhered to the first surface 104a of the micro-prism 104. However, such a structure would be accompanied newly with a problem that a focus error signal cannot be detected, because a light having been reflected at the optical disc 106 straightly advances without being refracted at the first surface 104a.

The third problem is poor productivity of the micro-prism 104.

This is because that the first surface 104a of the micro-prism has to be polished accurately at an angle of 45 degrees, and further because the second surface 104b has be coated with a half-mirror coating in one half, and with non-reflective coating in the other half.

The fourth problem is that if a light-emitting point of the laser diode chip 101 at which a light is emitted is shifted in a z-axis direction, there will be generated focus offset. This is because a height of the light-emitting point of the laser diode chip 101 is dependent on a thickness of the sub-mount 102 on which the laser diode chip 101 is mounted.

A light reflected at the optical disc 106 is designed to be converged on the third surface 104c of the micro-prism, when the optical disc 106 is located on a light-converging point of the lens 105. As illustrated in FIG. 4, if the light-emitting point of the laser diode chip 101 is shifted in a z-axis direction by a distance of "q", there is not generated an optical path difference in an incoming path, but there is generated an optical path difference D in an outgoing path, defined as the following equation, with respect to an optical path indicated with a solid line and an optical path indicated with a broken line. As a result, a light having been reflected at the optical disc 106 is not focused on the third surface 104c of the micro-prism 104.

$$D=[(2n^2-1)^{1/2}-n^2]q/(n^2-1)$$

The fifth problem is that the track error signal is likely to be mixed into the focus error signal.

This is because it is unavoidable for an optical pickup to be assembled containing focus offset therein, due to limited assembling accuracy. The focus offset is removed by means of a particular circuit, when an optical pickup is incorporated into a drive. However, after all, the optical pickup is assembled in such a manner that a beam spot formed on the front light-receiving section 103a and a beam spot formed on the rear light-receiving section 103b are different in size from each other when the optical disc 106 is located on a light-converging point of the lens 105.

The focus error signal FE100 is detected in accordance with the following equation.

$$FE100=S103aa-S103ab-S103ac+S103ad-S103ba+S103bb+S103bc-S103bd$$

Hence, components of the track error signal to be mixed into the focus error signal FE100 ought to be cancelled. Specifically, a component mixed into (S103aa−S103ab) ought to be cancelled with a component mixed into (S103bc−S103bd), and a component mixed into (−S103ac+S103ad) ought to be cancelled with a component mixed into (−S103ba+S103bb). However, since the optical pickup is assembled in such a manner that a beam spot formed on the front light-receiving section 103a and a beam spot formed on the rear light-receiving section 103b bare different in size from each other when the optical disc 106 is located on a light-converging point of the lens 105, the track error signal components to be mixed into the focus error signal are not cancelled, and thus, remain as they are.

Apart from the optical head illustrated in FIG. 1, Japanese Unexamined Patent Publication No. 9-73652 has suggested an optical pickup including a first beam splitter film, a second beam splitter film which allows p-polarization components to transmit therethrough by 100%, but reflects s-polarization components by a certain ratio in a direction of an optical axis of a light having transmitted through the first beam splitter film, and a quarter wavelength plate converting the thus reflected light from a linearly polarized light to a circularly polarized light, or vice versa.

However, this optical pickup is accompanied with the same problems as the problems mentioned above with respect to the optical head illustrated in FIG. 1.

Japanese Unexamined Patent Publication No. 6-302044 has suggested an optical pickup in which a light having emitted from a laser source and having transmitted through a beam splitter film and a polarized beam splitter film of an optical block is radiated onto a recording surface of a photo-electro-magnetic disc through a complicated rotatory polarization plate and an objective lens, and a reflected light is introduced into the optical block through the complicated rotatory polarization plate. The light is detected by means of a photodetector in the optical block.

However, this optical pickup is accompanied with the following problems.

In the optical pickup, the complicated rotatory polarization plate is designed to have 45 degrees of a rotatory polarization angle for detecting photo-electro-magnetic signals. However, this results in that a ratio of an amount of a light entering a first photodetector to an amount of a light entering a second photodetector is 20:3, and resultingly, a focus error signal can no longer be detected.

Even if it is given up to detect a photo-electro-magnetic signal, and the complicated rotatory polarization plate is designed to have such a rotatory polarization angle that s-polarization components are 13% and p-polarization components are 87%, in order to detect a focus error signal, a light utilization efficiency of the optical pickup is about 22% at greatest. This means that it is not worth while utilizing polarization. Utilization of polarization causes extra costs for preparing a part or parts for utilizing polarization, and makes it extremely difficult to reproduce data from an optical disc having birefringence. Hence, the optical pickup is not allowed to put into practice, considering the fact that a light utilization efficiency is low, specifically, about 22%, in spite of utilization of polarization.

Japanese Unexamined Patent Publication No. 8-7325 has suggested an optical head in which a light beam emitted from a semiconductor laser is reflected a plurality of times in first and second prisms, and then, is introduced to an objective lens through which the light beam is focused onto a recording surface of an optical disc. The reflected light is divided into two portions one of which is utilized for servo operation in focusing and tracking, and the other is utilized for detecting a photo-electro-magnetic signal.

Japanese Unexamined Patent Publication No. 8-36781 has suggested an optical head including a prism formed with a first inclined surface having a half-mirror function and a second inclined surface allowing a light to transmit therethrough. A light reflected from an optical disc is divided into a plurality of portions through a polarized light splitter and a planar prism. The thus divided portions of a light have different polarization directions. These portions of a light are focused onto a light-receiving region formed on a substrate to thereby detect data of the optical disc. At the same time, a focus error signal is detected by virtue of astigmatism which is generated when the portions of a light transmits through the planar prism.

SUMMARY OF THE INVENTION

In view of the above-mentioned problems of the conventional optical heads, it is an object of the present invention to provide an optical head which is capable of being fabricated thinner, enhancing a light utilization efficiency and preventing a track error signal from mixing into a focus error signal.

It is also an object of the present invention to provide a method of and an apparatus for fabricating such an optical disc.

In one aspect of the present invention, there is provided an optical head including (a) a laser diode chip, (b) a lens for focusing lights emitted from the laser diode chip, onto an object, (c) an optical separator for separating lights reflected from the object, from an optical axis of a light directing towards the lens from the laser diode chip, and (d) a photodiode chip receiving lights having been separated from the optical axis by the optical separator, the optical separator being a square pole in shape defined by a first sidewall, a second sidewall in parallel with the first side wall, and first, second, third and fourth outer surfaces all perpendicular to both the first and second sidewalls, the first and third outer surfaces being in parallel with each other, the optical separator having first and second inner planes both perpendicular to the first and second sidewalls and in parallel with each other, and both being inclined relative to the first outer surface at a predetermined angle, the photodiode chip having a light-receiving plane in parallel with the second outer surface, a light directing towards the lens from the laser diode chip, entering the first outer surface, passing through the first and second inner planes in this order, leaving the optical separator at the third outer surface, and being focused onto the object by the lens, the light having been reflected by the object, entering the third outer surface, passing through the second inner plane by half, and being reflected at the second inner plane by the remaining half, the light having been reflected at the second inner plane, leaving the optical separator at the second outer surface, and being received in a front light-receiving section formed on the light-receiving plane of the photodiode chip, the light having passed through the second inner plane, being reflected at the first inner plane, leaving the optical separator at the second outer surface, and being received in a rear light-receiving section formed on the light-receiving plane of the photodiode chip, the laser diode chip being positioned so that an optical length between the laser diode chip and the first inner plane is equal to (a+b−c)/2 wherein "a" indicates an optical length between the first inner plane and the rear light-receiving section, "b" indicates an optical length between the second inner plane and the front light-receiving section, and "c" indicates an optical length between the first and second inner planes.

It is preferable that the optical head further includes a base composed of light-permeable material, and located between the optical separator and the photodiode chip.

It is preferable that the optical head further includes a quarter wavelength plate located between the optical separator and the object, the quarter wavelength plate converting a light having left the third outer surface or the diffraction device to a circularly polarized light from a linearly polarized light, and also converting a light having been reflected at the object from a circularly polarized light to a linearly polarized light having an orientation perpendicular to an original orientation thereof.

The quarter wavelength plate may be formed integral with the optical separator.

It is preferable that the first inner plane is inclined relative to the first outer surface by 45 degrees, and the second outer surface is perpendicular to the first outer surface. It is also preferable that the fourth outer surface is in parallel with the second outer surface.

It is preferable that when the object moves from a converging point of the lens towards an optical axis, and as a result, a size of a beam spot formed on the photodiode chip is varied, a focus error signal is detected based on variation of the size of a beam spot in an optically tangential direction.

It is preferable that the optical head further includes a half-wave plate associated with a polarization direction of a light emitted from the laser diode chip, located between the laser diode chip and the optical separator.

It is preferable that the laser diode chip is positioned in parallel with or perpendicularly to a surface of the photodiode chip in accordance with a polarization direction of a light emitted from the laser diode chip.

It is preferable that the optical head further includes a semiconductor heat sink on which the laser diode chip is to be mounted.

It is preferable that the optical head further includes a reflection mirror mounted on the fourth outer surface, and wherein a light directing from the laser diode chip towards the lens is reflected at any one of the first to third inner planes by β%(0<β<100), and the thus reflected light is reflected and collected at the reflection mirror, leaves the optical separator at the second outer surface, and received at the light-receiving sections formed on the light-receiving plane of the photodiode chip.

It is preferable that the front and rear light-receiving sections are both comprised of first to 2N-th light-receiving sections (N is a positive integer equal to or greater than 3), the first to 2N-th light-receiving sections being divided from one another by a first division line parallel to an optically tangential direction of the object and (N−1) division lines perpendicular to the first division line.

For instance, the front light-receiving section may be comprised of first to sixth light-receiving sections. The first, third and fourth light-receiving sections are located at one side of a front first division line parallel to an optically tangential direction of the object, and the fifth, sixth and second light-receiving sections are located at the other side of the front first division line. The first, fifth and sixth light-receiving sections are located at one side of a front second division line parallel to an optically radial direction of the object, and the third, fourth and second light-receiving sections are located at the other side of the front second division line. An optical axis of the light reflected at the second inner plane and leaving the optical separator at the second outer surface passes through an intersection between the front first division line and the front second division line. The rear light-receiving section may be comprised of seventh to twelfth light-receiving sections. The ninth, tenth and seventh light-receiving sections are located at one side of a rear first division line parallel to an optically tangential direction of the object, and the eighth, eleventh and twelfth light-receiving sections are located at the other side of the rear first division line. The ninth, tenth and eighth light-receiving sections are located at one side of a rear second division line parallel to an optically radial direction of the object, and the seventh, eleventh and twelfth light-receiving sections are located at the other side of the rear second division line. An optical axis of the light reflected at the first inner plane and leaving the optical separator at the second outer surface passes through an intersection between the rear first division line and the rear second division line.

It is preferable that a front third division line dividing the third and fourth light-receiving sections from each other, a front fourth division line dividing the fifth and sixth light-receiving sections from each other, a rear third division line dividing the ninth and tenth light-receiving sections from each other, and a rear fourth division line dividing the eleventh and twelfth light-receiving sections from each other are all parallel to an optically radial direction of the object.

The third light-receiving section may be located between the front third division line and the front second division line, the fifth light-receiving section may be located between the front fourth division line and the front second division line, the ninth light-receiving section may be located between the rear third division line and the rear second division line, the eleventh light-receiving section may be located between the rear fourth division line and the rear second division line, the third and fifth light-receiving sections may overlap each other on the front second division line, and the ninth and eleventh light-receiving sections may overlap each other on the rear second division line.

It is preferable that the reflection mirror is designed to have reflectance of about 10% when β and γ are both equal to 61.8.

There is further provided an optical head including (a) a laser diode chip, (b) a lens for focusing lights emitted from the laser diode chip, onto an object, (c) an optical separator for separating lights reflected from the object, from an optical axis of a light directing towards the lens from the laser diode chip, and (d) a photodiode chip receiving lights having been separated from the optical axis by the optical separator, the optical separator being a square pole in shape defined by a first sidewall, a second sidewall in parallel with the first side wall, and first, second, third and fourth outer surfaces all perpendicular to both the first and second sidewalls, the first and third outer surfaces being in parallel with each other, the optical separator having first, second and third inner planes all perpendicular to the first and second sidewalls and in parallel with one another, and all being inclined relative to the first outer surface at a predetermined angle, the photodiode chip having a light-receiving plane in parallel with the second outer surface, a light directing towards the lens from the laser diode chip, entering the first outer surface, passing through the first to third inner planes in this order, leaving the optical separator at the third outer surface, and being focused onto the object by the lens, the light having been reflected by the object, entering the third outer surface, being reflected at the third inner plane by β%(0<α<100), and passing through the third inner plane by (100−α)%, the light having been reflected at the third inner plane, leaving the optical separator at the second outer surface, and being received in an additional light-receiving section formed on the light-receiving plane of the photodiode chip, the light having passed the third inner plane, being reflected at the second inner plane by half, and passing through the second inner plane by the remaining half, the light having been reflected at the second inner plane, leaving the optical separator at the second outer surface, and being received in a front light-receiving section formed on the light-receiving plane of the photodiode chip, the light having passed through the second inner plane, being reflected at the first inner plane, leaving the optical separator at the second outer surface, and being received in a rear light-receiving section formed on the light-receiving plane of the photodiode chip, the laser diode chip being positioned so that an optical length between the laser diode chip and the first inner plane is equal to (a+b−c)/2 wherein "a" indicates an optical length between the first inner plane and the rear light-receiving section, "b" indicates an optical length between the second inner plane and the front light-receiving section, and "c" indicates an optical length between the first and second inner planes.

It is preferable that the front and rear light-receiving sections are both comprised of (N+1) light-receiving sections defined by N division lines in parallel to an optically radial direction of the object (N is a positive integer equal to or greater than 1), and that the additional light-receiving section is comprised of (M+1) light-receiving sections defined by M division lines in parallel to an optically tangential direction of the object (M is a positive integer equal to or greater than 1).

It is preferable that the additional light-receiving section is further divided by a division line parallel to an optically radial direction of the object.

It is preferable that the front and rear light-receiving sections are further divided by a division line parallel to an optically tangential direction of the object.

It is preferable that each of light-receiving sections constituting the front and rear light-receiving sections is turned by a certain degree about an optical axis thereof.

There is still further provided an optical head including (a) a laser diode chip, (b) a lens for focusing lights emitted from the laser diode chip, onto an object, (c) an optical separator for separating lights reflected from the object, from an optical axis of a light directing towards the lens from the laser diode chip, and (d) a photodiode chip receiving lights having been separated from the optical axis by the optical separator, the optical separator comprising a prism and a diffraction device, the prism being a square pole in shape defined by a first sidewall, a second sidewall in parallel with the first side wall, and first, second, third and fourth outer surfaces all perpendicular to both the first and second sidewalls, the first and third outer surfaces being in parallel with each other, the prism having first and second inner planes both perpendicular to the first and second sidewalls and in parallel with each other, and both being inclined relative to the first outer surface at a predetermined angle, the photodiode chip having a light-receiving plane in parallel with the second outer surface, a light directing towards the lens from the laser diode chip, entering the first outer surface, passing through the first and second inner planes in this order, leaving the optical separator at the third outer surface, passing through the diffraction device, and being focused onto the object by the lens, the light having been reflected by the object, being separated into a transmitted light and a diffracted light by the diffraction device, entering the third outer surface, passing through the second inner plane by half, and being reflected at the second inner plane by the remaining half, the light having been reflected at the second inner plane, leaving the optical separator at the second outer surface, and being received in a front light-receiving section formed on the light-receiving plane of the photodiode chip, the light having passed through the second inner plane, being reflected at the first inner plane, leaving the optical separator at the second outer surface, and being received in a rear light-receiving section formed on the light-receiving plane of the photodiode chip, a track error signal indicative of an error of a track, being detected from the diffracted light, the laser diode chip being positioned so that an optical length between the laser diode chip and the first inner plane is equal to (a+b−c)/2 wherein "a" indicates an optical length between the first inner plane and the rear light-receiving section, "b" indicates an optical length between the second inner plane and the front light-receiving section, and "c" indicates an optical length between the first and second inner planes.

It is preferable that the diffraction device is divided into a first region and a second region via a division line parallel to an optically tangential direction and intersecting with an optical axis, the track error signal being detected based on a difference in an amount between a diffracted light diffracted by the first region and a diffracted light diffracted by the second region.

It is preferable that the diffraction device is divided into first, second, third and fourth regions via a first division line parallel to an optically tangential direction and intersecting with an optical axis, and a second division line parallel to an optically radial direction and intersecting with an optical axis, the first and third regions diagonally facing each other, the second and fourth regions diagonally facing each other, the track error signal being detected based on a sum in an amount of a diffracted light diffracted by the first and third regions, and further based on a sum in an amount of a diffracted light diffracted by the second and fourth regions.

For instance, the diffraction device may be comprised of a hologram device acting also as a lens.

There is yet further provided an optical head including (a) a laser diode chip, (b) a lens for focusing lights emitted from the laser diode chip, onto an object, (c) an optical separator for separating lights reflected from the object, from an optical axis of a light directing towards the lens from the laser diode chip, and (d) a photodiode chip receiving lights having been separated from the optical axis by the optical separator, the optical separator being a square pole in shape defined by a first sidewall, a second sidewall in parallel with the first side wall, and first, second, third and fourth outer surfaces all perpendicular to both the first and second sidewalls, the first and third outer surfaces being in parallel with each other, the optical separator having first and second inner planes both perpendicular to the first and second sidewalls and in parallel with each other, and both being inclined relative to the first outer surface at a predetermined angle, the photodiode chip having a light-receiving plane in parallel with the second outer surface, a light directing towards the lens from the laser diode chip, entering the first outer surface, passing through the first inner plane, leaving the optical separator at the third outer surface, and being focused onto the object by the lens, the light having been reflected by the object, entering the third outer surface, being reflected at the first inner plane, passing through the second inner plane by half, and being reflected at the second inner plane by the remaining half, the light having passed through the second inner plane, leaving the optical separator at the second outer surface, and being received in a front light-receiving section formed on the light-receiving plane of the photodiode chip, the light having been reflected at the second inner plane, being reflected at the first inner plane, leaving the optical separator at the second outer surface, and being received in a rear light-receiving section formed on the light-receiving plane of the photodiode chip, the laser diode chip being positioned so that an optical length between the laser diode chip and the first inner plane is equal to (a+b+3c)/2 wherein "a" indicates an optical length between the first inner plane and the rear light-receiving section, "b" indicates an optical length between the second inner plane and the front light-receiving section, and "c" indicates an optical length between the first and second inner planes.

There is still yet further provided an optical head including (a) a laser diode chip, (b) a lens for focusing lights emitted from the laser diode chip, onto an object, (c) an optical separator for separating lights reflected from the object, from an optical axis of a light directing towards the lens from the laser diode chip, and (d) a photodiode chip receiving lights having been separated from the optical axis by the optical separator, the optical separator being a square pole in shape defined by a first sidewall, a second sidewall in parallel with the first side wall, and first, second, third and fourth outer surfaces all perpendicular to both the first and second sidewalls, the first and third outer surfaces being in parallel with each other, the optical separator having first and second inner planes both perpendicular to the first and second sidewalls and in parallel with each other, and both being inclined relative to the second outer surface at a predetermined angle, the photodiode chip having a light-receiving plane in parallel with the second outer surface, a light directing towards the lens from the laser diode chip, entering the first outer surface, passing through the first and second inner planes in this order, leaving the optical separator at the third outer surface, and being focused onto the object by the lens, the light having been reflected by the object, entering the third outer surface, passing through the second inner plane by half, and being reflected at the second inner plane by the remaining half, the light having been reflected at the second inner plane, leaving the optical separator at the second outer surface, and being received in an additional light-receiving section formed on the light-receiving plane of the photodiode chip, the light having passing through the second inner plane, being reflected at the first inner plane, entering the second inner plane again, passing through the second inner plane by half and being reflected at the second inner plane by the remaining half, the light having passed through the second inner plane, leaving the optical separator at the second outer surface, and being received in a front light-receiving section formed on the light-receiving plane of the photodiode chip, the light having been reflected at the second inner plane, being reflected at the first inner plane, leaving the optical separator at the second outer surface, and being received in a rear light-receiving section formed on the light-receiving plane of the photodiode chip, the laser diode chip being positioned so that an optical length between the laser diode chip and the first inner plane is equal to (a+b+3c)/2 wherein "a" indicates an optical length between the first inner plane and the rear light-receiving section, "b" indicates an optical length between the second inner plane and the front light-receiving section, and "c" indicates an optical length between the first and second inner planes.

There is further provided an optical head including (a) a laser diode chip, (b) a lens for focusing lights emitted from the laser diode chip, onto an object, (c) an optical separator for separating lights reflected from the object, from an optical axis of a light directing towards the lens from the laser diode chip, and (d) a photodiode chip receiving lights having been separated from the optical axis by the optical separator, the optical separator comprising a prism and a diffraction device, the prism being a square pole in shape defined by a first sidewall, a second sidewall in parallel with the first side wall, and first, second, third and fourth outer surfaces all perpendicular to both the first and second sidewalls, the first and third outer surfaces being in parallel with each other, the prism having first and second inner planes both perpendicular to the first and second sidewalls and in parallel with each other, and both being inclined relative to the first outer surface at a predetermined angle, the photodiode chip having a light-receiving plane in parallel with the second outer surface, a light directing towards the lens from the laser diode chip, entering the first outer surface, passing through the first inner plane, leaving the optical separator at the third outer surface, passing through the diffraction device, and being focused onto the object by the lens, the light having been reflected by the object, being separated into a transmitted light and a diffracted light by the diffraction device, entering the third outer surface, being reflected at the first inner plane, passing through the second inner plane by half, and being reflected at the second inner plane by the remaining half, the light having passed the second inner plane, leaving the optical separator at the second outer surface, and being received in a front light-receiving section formed on the light-receiving plane of the photodiode chip, the light having been reflected at the second inner plane, being reflected at the first inner plane, leaving the optical separator at the second outer surface, and being received in a rear light-receiving section formed on the light-receiving plane of the photodiode chip, a track error signal indicative of an error of a track, being detected from the diffracted light, the laser diode chip being positioned so that an optical length between the laser diode chip and the first inner plane is equal to (a+b+3c)/2 wherein "a" indicates an optical length between the first inner plane and the rear light-receiving section, "b" indicates an optical length between the second inner plane and the front light-receiving section, and "c" indicates an optical length between the first and second inner planes.

There is further provided an optical head including (a) a laser diode chip, (b) a lens for focusing lights emitted from the laser diode chip, onto an object, (c) an optical separator for separating lights reflected from the object, from an optical axis of a light directing towards the lens from the laser diode chip, and (d) a photodiode chip receiving lights having been separated from the optical axis by the optical separator, the optical separator being a square pole in shape defined by a first sidewall, a second sidewall in parallel with the first side wall, and first, second, third and fourth outer surfaces all perpendicular to both the first and second sidewalls, the first and third outer surfaces being in parallel with each other, the optical separator having first and second inner planes both perpendicular to the first and second sidewalls and in parallel with each other, and both being inclined relative to the first outer surface at a predetermined angle, the photodiode chip having a light-receiving plane in parallel with the second outer surface, a light directing towards the lens from the laser diode chip, entering the first outer surface, passing through the first inner plane by $(100-\gamma)\%$ ($0 < \gamma < 100$), leaving the optical separator at the third outer surface, and being focused onto the object by the lens, the light having been reflected by the object, entering the third outer surface, being reflected at the first inner plane by $\gamma\%$, passing through the second inner plane by $100\gamma/(\gamma+100)\%$, and being reflected at the second inner plane by $10000/(\gamma+100)\%$, the light having passed through the second inner plane, leaving the optical separator at the second outer surface, and being received in a front light-receiving section formed on the light-receiving plane of the photodiode chip, the light having been reflected at the second inner plane, being reflected at the first inner plane by $\gamma\%$, leaving the optical separator at the second outer surface, and being received in a rear light-receiving section formed on the light-receiving plane of the photodiode chip, the laser diode chip being positioned so that an optical length between the laser diode chip and the first inner plane is equal to $(a+b+3c)/2$ wherein "a" indicates an optical length between the first inner plane and the rear light-receiving section, "b" indicates an optical length between the second inner plane and the front light-receiving section, and "c" indicates an optical length between the first and second inner planes.

It is preferable that the above-mentioned optical head further includes a diffraction device, and wherein a light directing towards the lens from the laser diode chip leaves the optical separator at the third outer surface, and passes through the diffraction device, and being focused onto the object by the lens, and the light having been reflected at the object is separated into a transmitted light and a diffracted light by the diffraction device, and enters the third outer surface.

For instance, $\gamma$ is set equal to 61.8.

In another aspect of the present invention, there is provided a method of fabricating an optical separator to be used in an optical head, the optical head comprising (a) a laser diode chip, (b) a lens for focusing lights emitted from the laser diode chip, onto an object, (c) an optical separator for separating lights reflected from the object, from an optical axis of a light directing towards the lens from the laser diode chip, and (d) a photodiode chip receiving lights having been separated from the optical axis by the optical separator, the optical separator being a square pole in shape defined by a first sidewall, a second sidewall in parallel with the first side wall, and first, second, third and fourth outer surfaces all perpendicular to both the first and second sidewalls, the first and third outer surfaces being in parallel with each other, the optical separator having first and second inner planes both perpendicular to the first and second sidewalls and in parallel with each other, and both being inclined relative to the second outer surface at a predetermined angle, the photodiode chip having a light-receiving plane in parallel with the second outer surface, the method comprising the steps of (a) depositing glass plates one on another, each of the glass plates having a coating on a surface thereof, (b) cutting the thus deposited glass plates, (c) optically polishing a cutting surface at which the deposited glass plates have been cut, (d) cutting the glass plates at a predetermined angle relative to the cutting surface, and (e) dicing the thus cut glass plates into chips.

It is preferable that the deposited glass plates are cut at an angle of $(\theta+\eta-\pi/2)$ in the step (b) wherein $\theta$ indicates an angle formed between the first inner plane and a surface of the optical separator through which a light emitted from the laser diode chip passes into the optical separator, and $\eta$ indicates an angle formed between the photodiode chip and a surface of the optical separator through which a light emitted from the laser diode chip passes into the optical separator The above-mentioned method may further include the step of adhering a bar-shaped quarter wavelength plate or a bar-shaped photodiode to the deposited glass plates prior to carrying out the step (e).

In still another aspect of the present invention, there is provided an apparatus for fabricating an optical head, including (a) a microscope, (b) a beam splitter for splitting images having passed through the microscope, into at least two images, (c) a first charge coupled device located at the rear of an image point of the microscope by a distance of $M^2 \times c/2$ for detecting one of the images split by the beam splitter, wherein "M" indicates a magnification of the microscope, and "c" indicates an optical length between the first and second inner planes, and (d) a second charge coupled device located in front of an image point of the microscope by a distance of $M^2 \times c/2$ for detecting the other of the images split by the beam splitter.

There is further provided an apparatus for fabricating an optical head, including (a) an objective lens, (b) a beam splitter for splitting images focused by the objective lens, into at least two images, (c) a first eye-piece lens for focusing one of images split by the beam splitter, (d) a second eye-piece lens for focusing the other of images split by the beam splitter, (e) a first charge coupled device located at the rear of a focal point of the first eye-piece lens by a distance of $M_1^2 \times c/2$ wherein "$M_1$" indicates a combined magnification of the objective lens and the first eye-piece lens, and "c" indicates an optical length between the first and second inner planes, and (d) a second charge coupled device located in front of a focal point of the second eye-piece lens by a distance of $M_2^2 \times c/2$ wherein "$M_2$" indicates a combined magnification of the objective lens and the second eye-piece lens.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

First Embodiment

Figure 1:
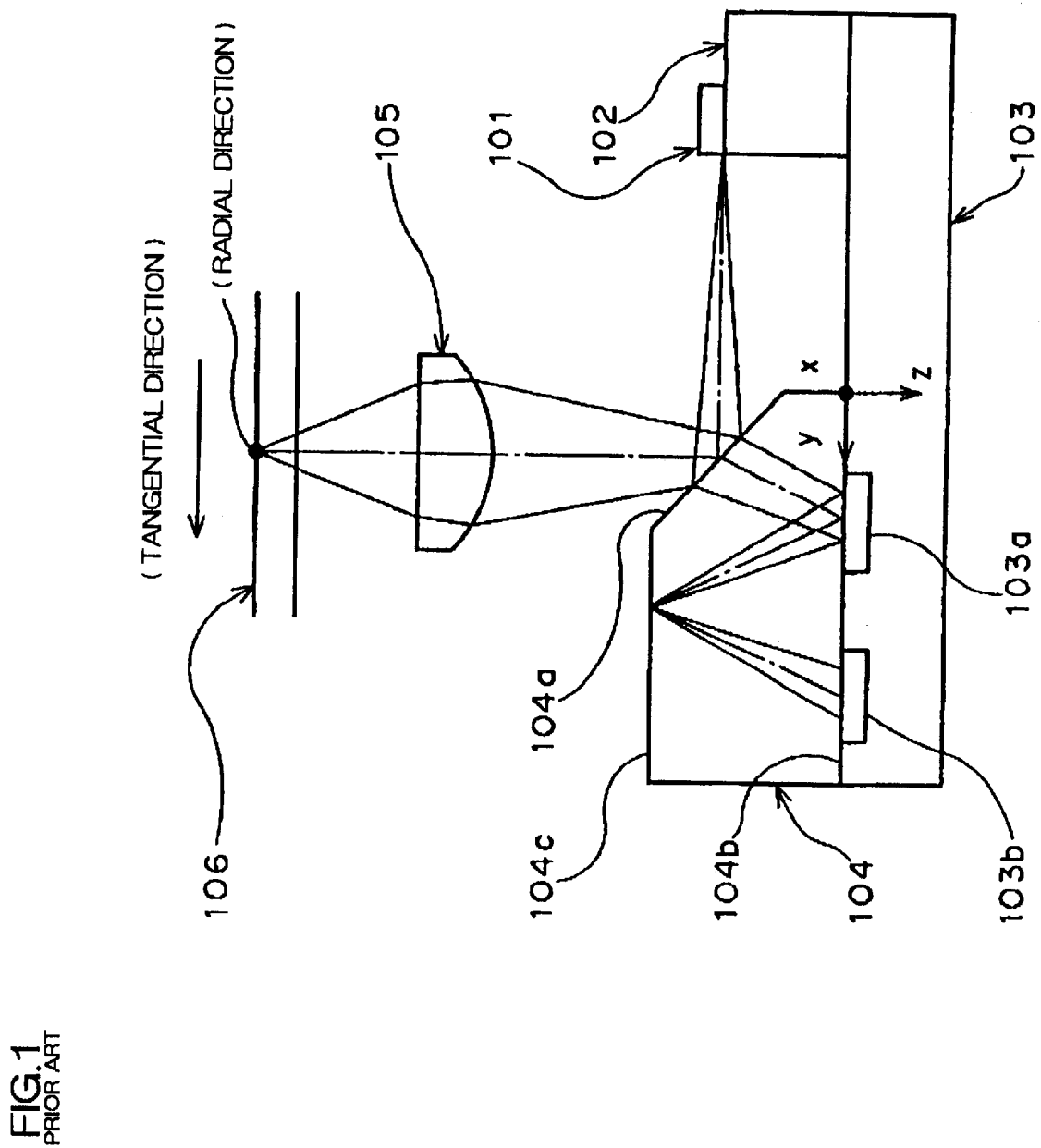
FIG. 1 is a side view illustrating a conventional optical head.
Figure 2:
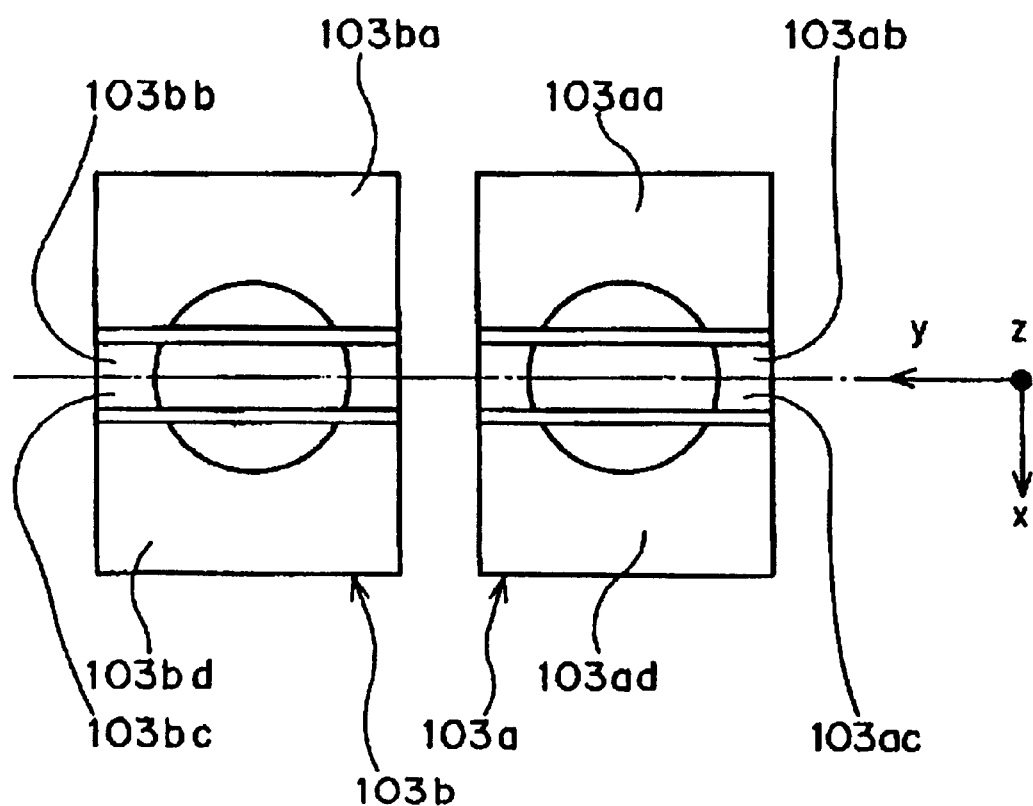
FIG. 2 is a top plan view of a photodiode chip constituting the optical head illustrated in FIG. 1.
Figure 3:
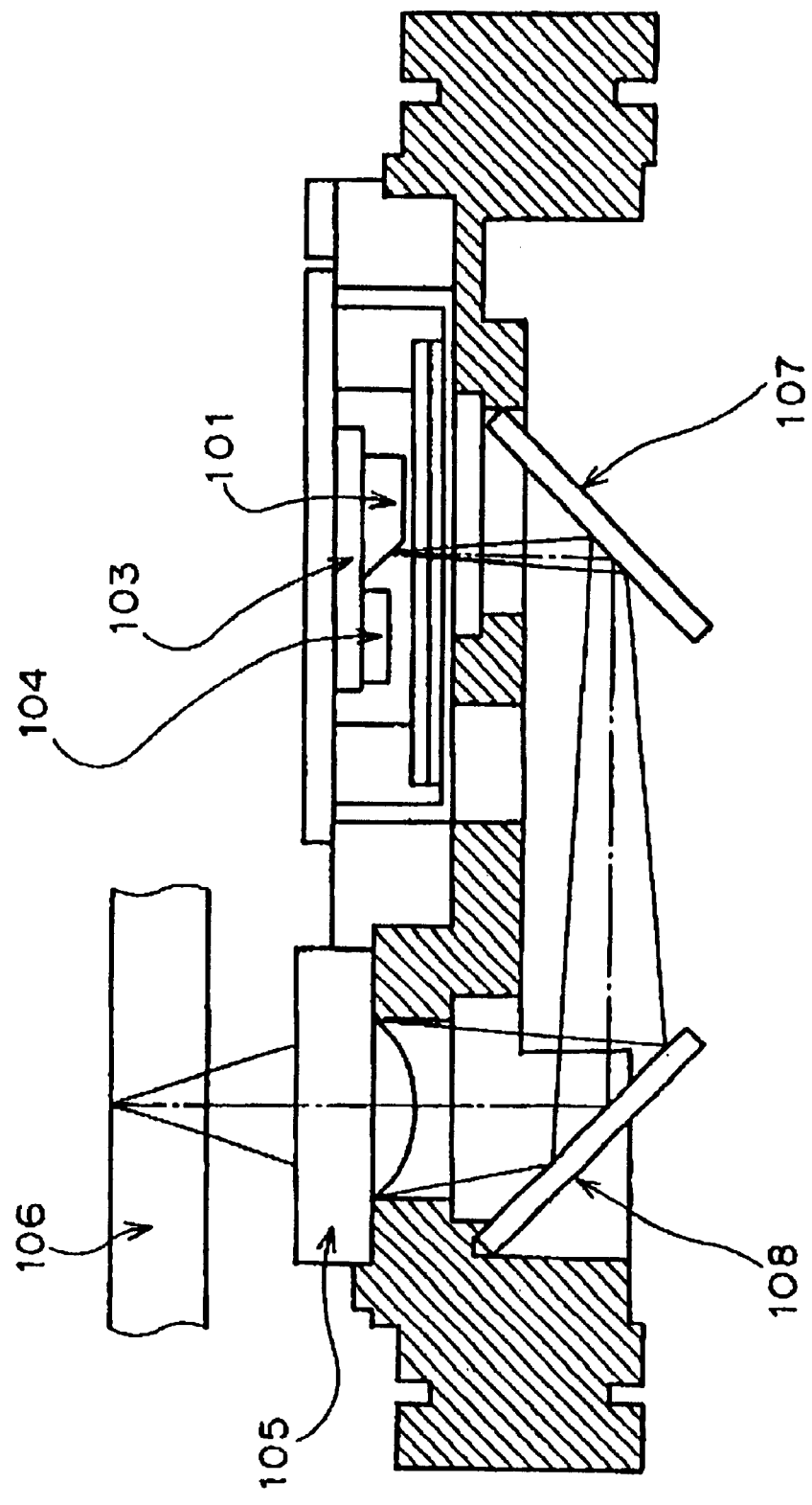
FIG. 3 is a cross-sectional view illustrating another conventional optical head.
Figure 4:
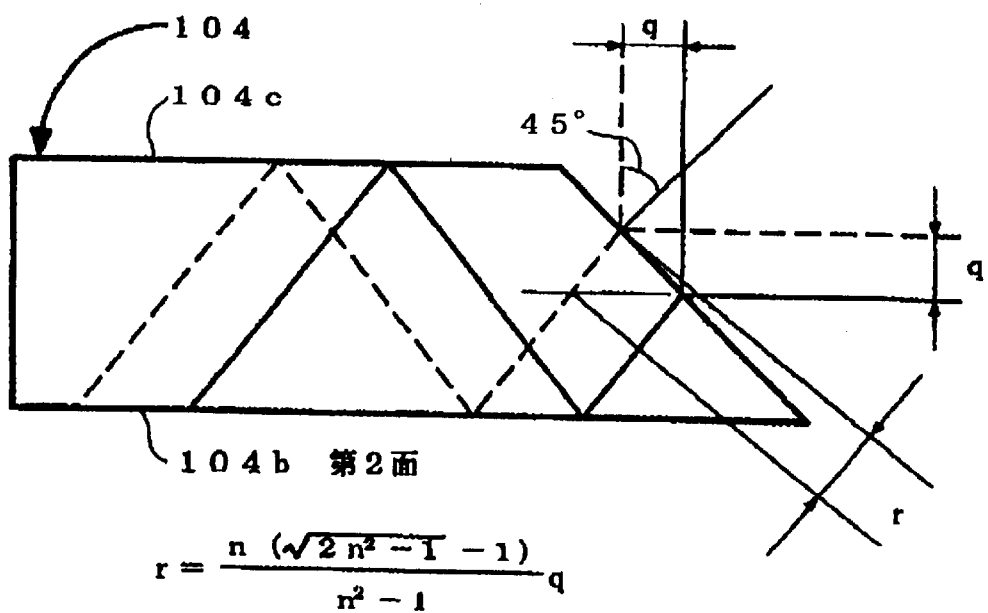
FIG. 4 is a side view of a micro-prism constituting the optical head illustrated in FIG. 3.
Figure 5A:
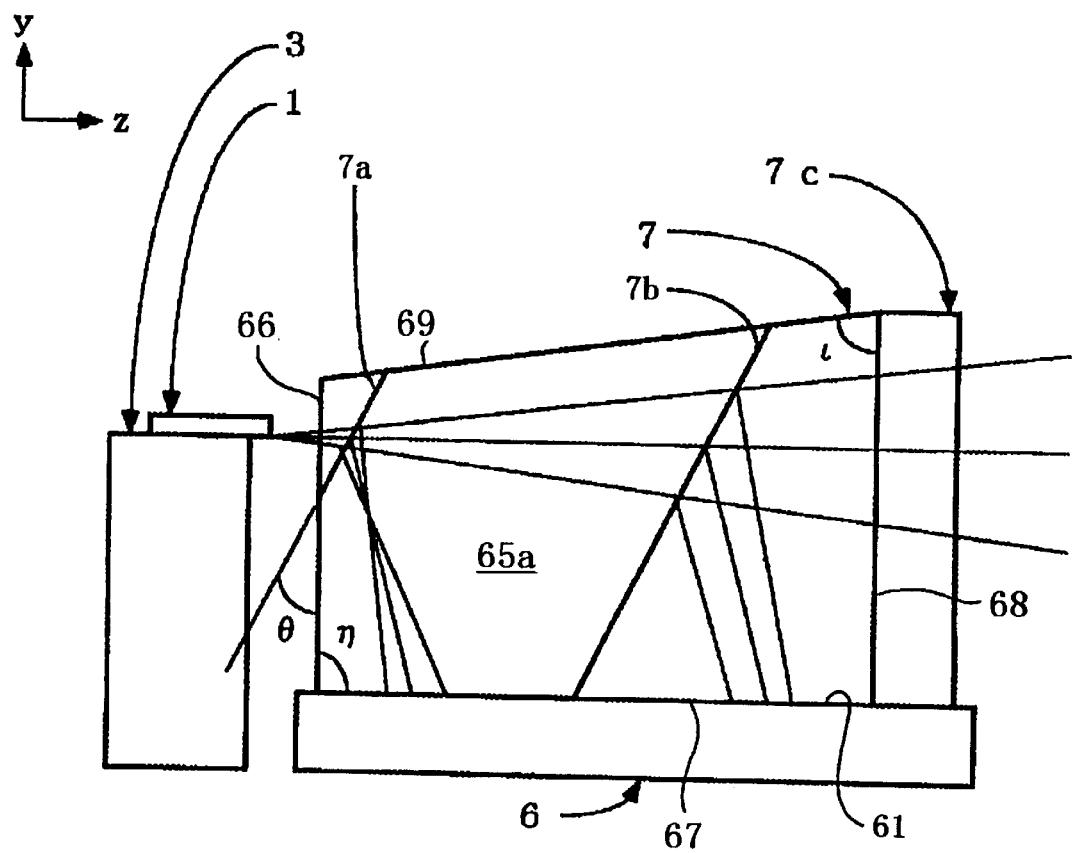
FIG. 5A is a side view illustrating an optical head in accordance with the first embodiment of the present invention.
Figure 5B:
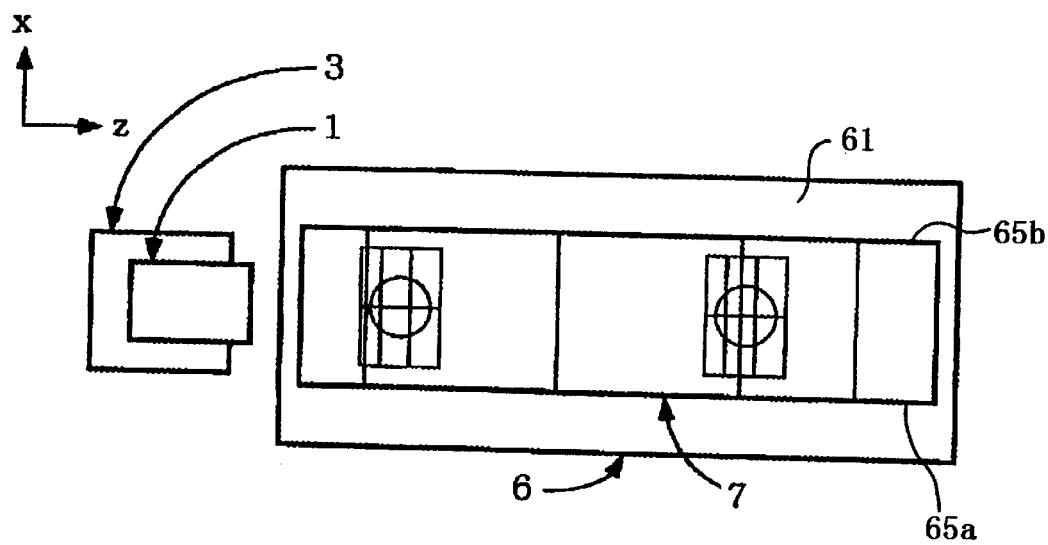
FIG. 5B is a top plan view of the optical head illustrated in FIG. 5A.

FIGS. 5A and 5B illustrate an optical head in accordance with the first embodiment of the present invention.

An optical head in accordance with the first embodiment is comprised of a laser diode chip 1, a sub-mount 3 on which the laser diode chip 1 is mounted and which keeps the laser diode chip 1 at a predetermined height, a lens (not illustrated) for focusing a light emitted from the laser diode chip 1, onto a medium (not illustrated), an optical separator or prism 7 for separating a light reflected from the medium, from an optical axis of a light directing to the lens from the laser diode chip 1, a photodiode chip 6 receiving a light separated from the optical axis by means of the prism 7, and a quarter wavelength plate 7c mounted on the photodiode chip 6 integrally with the prism 7.

The optical separator or prism 7 is a square pole in shape defined by a first sidewall 65a and a second sidewall 65b in parallel with each other, and first, second, third and fourth outer surfaces 66, 67, 68 and 69 all perpendicular to both the first and second sidewalls 65a and 65b. The first and third outer surfaces 66 and 68 are in parallel with each other.

The prism 7 is designed to have first and second inner planes 7a and 7b both perpendicular to the first and second sidewalls 65a and 65b, in parallel with each other, and both inclined relative to the first outer surface 66 at a predetermined angle θ.

The quarter wavelength plate 7c converts a light having passed through the third outer surface 68 of the prism 7 to a circularly polarized light from a linearly polarized light, and also converts a light having been reflected from the medium from a circularly polarized light to a linearly polarized light having an orientation perpendicular to an original orientation.

Figure 6:
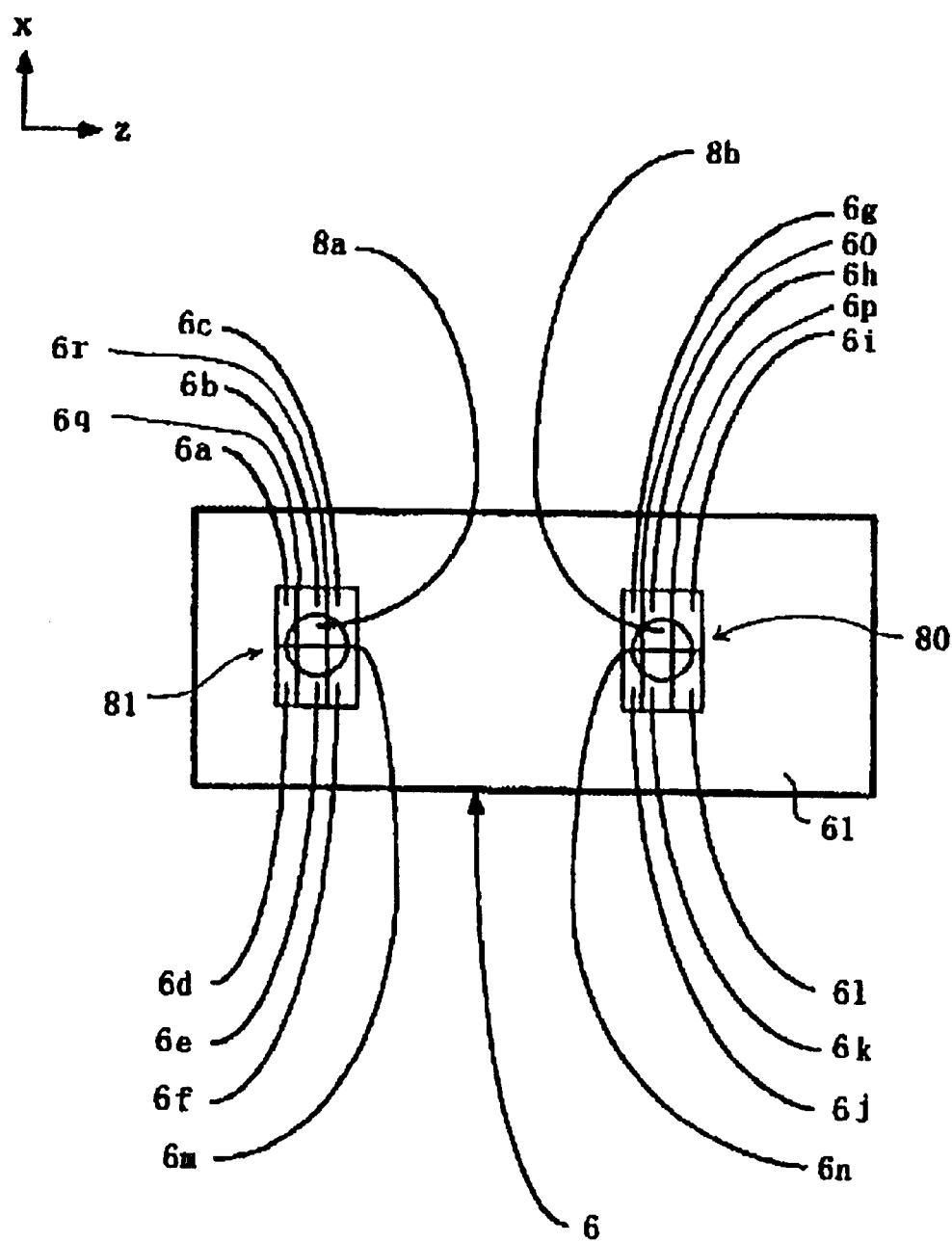
FIG. 6 is a top plan view illustrating a photodiode chip constituting the optical head illustrated in FIGS. 5A and 5B.

The photodiode chip 6 has a light-receiving plane 61 in parallel with the second outer surface 67. As illustrated in FIG. 6, a front light-receiving section 80 and a rear light-receiving section 81 are formed on the light-receiving plane 61.

With reference to FIG. 6, a light having been reflected at the first inner plane 7a forms a first beam spot 8a, and a light having been reflected at the second inner plane 7b forms a second beam spot 8b both on the photodiode chip 6. The front and rear light-receiving sections 80 and 81 are associated with the second and first beam spots 8b and 8a, respectively.

The front light-receiving section 80 is comprised of six light-receiving sections 6g, 6h, 6i, 6j, 6k and 6l defined by a first front division line 6n parallel to an optically tangential direction of the medium, and second and third front division lines 6o and 6p both parallel to an optically radial direction of the medium.

Similarly, the rear light-receiving section 81 is comprised of six light-receiving sections 6a, 6b, 6c, 6d, 6e and 6f defined by a first rear division line 6m parallel to an optically tangential direction of the medium, and second and third rear division lines 6q and 6r both parallel to an optically radial direction of the medium.

The laser diode chip 1 is positioned so that an optical length between the laser diode chip 1 and the first inner plane 7a is equal to (a+b−c)/2 wherein "a" indicates an optical length between the first inner plane 7a and the rear light-receiving section 81, "b" indicates an optical length between the second inner plane 7b and the front light-receiving section 80, and "c" indicates an optical length between the first and second inner planes 7a and 7b.

The optical head in accordance with the first embodiment operates as follows.

A light emitted from the laser diode chip 1 and polarized in a y-axis direction enters the prism 7 through the first outer surface 66 so that an optical axis thereof is perpendicular to the first outer surface 66. Then, the light transmits through the first and second inner plane 7a and 7b in this order, and leaves the prism 7 at the third outer surface 68 with an optical axis thereof being perpendicular to the third outer surface 68. The light having left the prism 7 is converted into a circularly polarized light in the quarter wavelength plate 7c, and then, is focused onto the medium through the lens (not illustrated).

The light having been reflected by the medium advances on the same optical path in an opposite direction, and is converted by the quarter wavelength plate 7c into a light polarized in a direction perpendicular to an original direction, that is, in an x-axis direction. Then, the light enters the prism 7 at the third outer surface 68 with an optical axis thereof being perpendicular to the third outer surface 68.

The light having entered the prism 7 is reflected at the second inner plane 7b by half in an amount, and the remaining half passes through the second inner plane 7b. The light having been reflected at the second inner plane 7b leaves the prism 7 at the second outer surface 67, and is received in the front light-receiving section 80 formed on the light-receiving plane 61 of the photodiode chip 6. The light having passed through the second inner plane 7b is reflected at the first inner plane 7a, and leaves the prism 7 at the second outer surface 67. Then, the light is received in the rear light-receiving section 81 formed on the light-receiving plane 61 of the photodiode chip 6.

An additional light-receiving section may be formed on the sub-mount 3. The formation of an additional light-receiving section prevents variation in an amount of a light emitted from the laser diode chip 1 which variation is caused by degradation occurring with the lapse of time, or by temperature variation.

It is not always necessary to form the quarter wavelength plate 7c integrally with the prism 7. The quarter wavelength plate 7c may be positioned at any place intermediate between the prism 7 and the medium.

A focus error signal FE1 is obtained by a spot-size process in accordance with the following equation, based on signals S6a to S6l detected at the light-receiving sections 6a to 6l constituting the front and rear light-receiving sections 80 and 81 formed on the light-receiving plane 61 of the photodiode chip 6.

FE1=(S6a+S6c+S6k)−(S6b+S6j+S6l)+(S6d+S6f+S6h)−(S6e+S6g+S6i)

A track error signal TE1 is obtained by a push-pull process in accordance with the following equation.

TE1=(S6a+S6c+S6k)+(S6b+S6j+S6l)−(S6d+S6f+S6h)−(S6e+S6g+S6i)

A signal indicative of data to be reproduced can be obtained as a sum of the signals S6a to S6l.

The laser diode chip 1 and the photodiode chip 6 are fixedly installed in such a position that the first beam spot 8a is uniformly divided by the first rear division line 6m partitioning the light-receiving sections 6a, 6b and 6c from the light-receiving sections 6d, 6e and 6f, and that the second beam spot 8b is uniformly divided by the first front division line 6n partitioning the light-receiving sections 6g, 6h and 6i from the light-receiving sections 6j, 6k and 6l.

However, the first and second beam spots 8a and 8b deviate in an x-axis direction, if the laser diode chip 1 and the photodiode chip 6 are assembled containing assembling error therein. In accordance with the first embodiment, even if such assembling error exists in the laser diode chip 1 and the photodiode chip 6, −(S6g+S6h+S6i)+(S6j+S6k+S6l) is decreased (or increased) to a degree to which (S6a+S6b+S6c)−(S6d+S6e+S6f) is increased (or decreased). Hence, they are cancelled with each other, ensuring no track offset.

When a focus error signal is to be detected by a spot-size process, a size of a beam spot formed on the photodiode chip 6 varies to a greater degree relative to a deviation of the medium in an optical axis direction, as an optical length between front and rear light-converging points of the photodiode chip 6 positioned so that the medium is located on a light-converging point of the lens, and the photodiode chip 6 is set shorter. Herein, considering the facts that a ratio of variation in a size of a beam spot has a relation with sensitivity of a focus error signal, and that an optical length between the light-converging point and the photodiode chip is equal to a half of a distance between the first and second inner planes 7a and 7b, it is understood that a shorter distance between the first and second inner plane 7a and 7b ensures a focus error signal to have greater sensitivity.

Even if a distance between the first and second inner planes 7a and 7b is intended to narrow in order to prevent a light having been reflected at the first inner plane 7a from being reflected again at the second inner plane 7b, there is a limitation in doing so. However, a distance between the first and second inner planes 7a and 7b can be narrowed to an intended degree, for instance, by placing a base between the prism 7 and the photodiode chip 6 with a gap therebetween.

In accordance with the first embodiment, since a light emitted from the laser diode 1 transmits through the prism 7, an optical head can be designed to have a reduced thickness equal to a sum of thicknesses of the prism 7 and the photodiode chip 6.

In addition, the first embodiment ensures no optical loss in the prism 7.

In accordance with the first embodiment, since the focus error signal FE1 is detected in the form of variation in a size of the first and second beam spots 8a and 8b in a z-axis direction, and the track error signal component is detected in the form of variation in an amount of a light of the first and second beam spots 8a and 8b in an x-axis direction, the track error signal component is unlikely to be mixed into the focus error signal FE1.

As the lens to be used in the first embodiment, there may be used a single finite lens or a combination of a collimate lens and an objective lens. The combination may include a beam splitter located between the collimate lens and the objective lens for separating a light directing to the medium from the laser diode chip 1, or a light directing to the photodiode chip 6 from the medium. This ensures these lights to be parallel lights in the case that the medium is located on a light-converging point of the objective lens. Hence, these lights could be readily dealt with.

The medium mentioned in the first embodiment includes an optical disc, an optical tape, and the like, and is composed of phase-change material or photo-electro-magnetic material, for instance.

A method of fabricating the prism 7 is explained hereinbelow with reference to FIGS. 7A to 7D.

Hereinbelow an angle formed between the first inner plane 7a and the first outer surface 66 is indicated as θ, an angle formed between the first inner plane 7a and the photodiode chip 6 is indicated as η, and an angle formed between the fourth outer surface 69 and the third outer surface 68 is indicated as ζ.

Figure 7A:
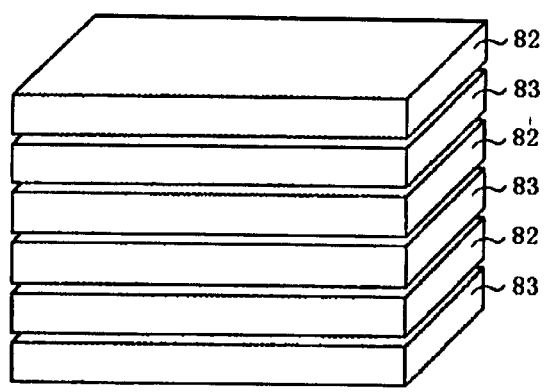
FIGS. 7A, 7B, 7C and 7D are perspective views of an optical head, illustrating respective steps in a method of fabricating an optical head.

First, as illustrated in FIG. 7A, a plurality of first glass plates 82 and a plurality of second glass plates 83 are alternately adhered by means of an adhesive. Each of the first glass plates 82 is coated with a coating A having characteristics shown in Table 1, and each of the second glass plates 83 is coated with a coating B having characteristics shown in Table 2.

TABLE 1

| Charcateristics of Coating A | | |
|---|---|---|
| Direction of polarization of incident light | Transmissivity | Reflectivity |
| p-polarization | 100% | 0 |
| s-polarization | 0 | 100% |

TABLE 2

| Charcateristics of Coating B | | |
|---|---|---|
| Direction of polarization of incident light | Transmissivity | Reflectivity |
| p-polarization | 100% | 0 |
| s-polarization | 50% | 50% |

Figure 7B:
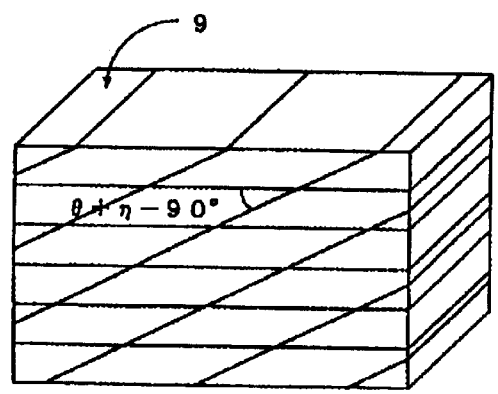

Then, as illustrated in FIG. 7B, a resultant deposited structure 9 of the glass plates is cut into a plurality of slices 10 (see FIG. 7C) at an angle of (θ+η−90°) relative to a horizontal direction.

Figure 7C:
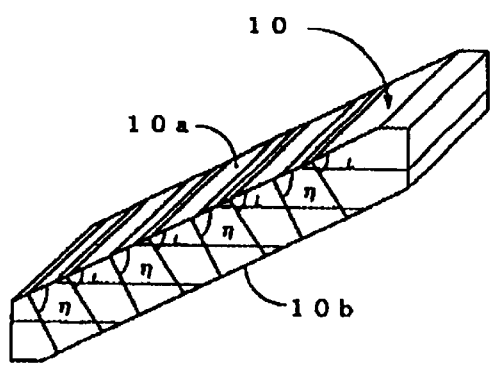

Then, as illustrated in FIG. 7C, each of the slices 10 is optically polished at cutting surfaces 10a and 10b thereof. Then, each of the slices 10 is cut at angles of η and ζ relative to the cutting surface 10a to thereby obtain a bar-shaped prism 11.

Figure 7D:
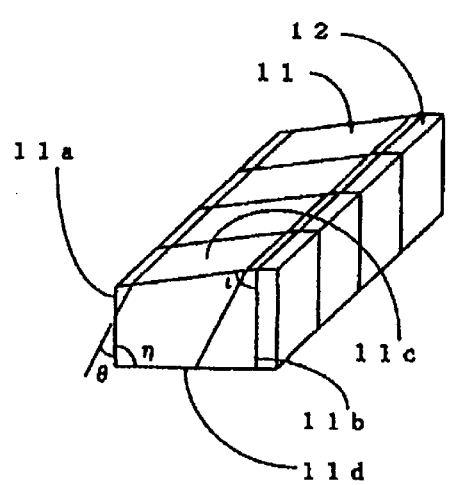

Then, a bar-shaped quarter wavelength plate 12 is adhered to the prism 11, as illustrated in FIG. 7D. The prism 11 with the quarter wavelength plate 12 is diced into chips.

The method as mentioned above with reference to FIGS. 7A to 7D enables mass-production of the optical head, and enhances productivity. Though not illustrated, a bar-shaped photodiode may be adhered to the bar-shaped prism 11 prior to the dicing of the prism 11. By dicing the prism 11 to which the bar-shaped photodiode is adhered, there is obtained enhanced productivity.

Cutting surfaces 11a and 11b of the prism 11 are optically polished before the slice 10 is diced into chips. However, cutting surfaces 11c and 11d of the prism 11 cannot be optically polished, because the bar-shaped prism 11 is too small in size to optically polish. Hence, the surfaces 11c and 11d remain like ground glass. However, the prism 11 is adhered to the photodiode chip 6 through the surface 11c by means of transparent adhesive, irregularity at the surface 11c is planarized with an adhesive, ensuring no scattering and aberration.

In the method illustrated in FIGS. 7A to 7D, the angle θ may be set equal to 45 degrees and the angle η may be set equal to 90 degrees, in which case, even if the sub-mount 3 would have a thickness different from a designed thickness, and accordingly, a light-emitting point of the laser diode chip 1 is deviated relative to the photodiode chip 6 in a y-axis direction, a relative positional relation in a direction of an optical axis between the laser diode chip 1 and the photodiode chip 6 remains unchanged, ensuring that there is not generated focus offset caused by the deviation in the light-emitting point of the laser diode chip 1.

Only one row of the bar-shaped prism 11 can be cut out of the slice 10 illustrated in FIG. 7C. However, if the angles w and i are set equal to each other ($\eta=\zeta$), a plurality of rows of the bar-shaped prisms 11 can be cut out, which would ensure no loss in material and cost.

Second Embodiment

Figure 8:
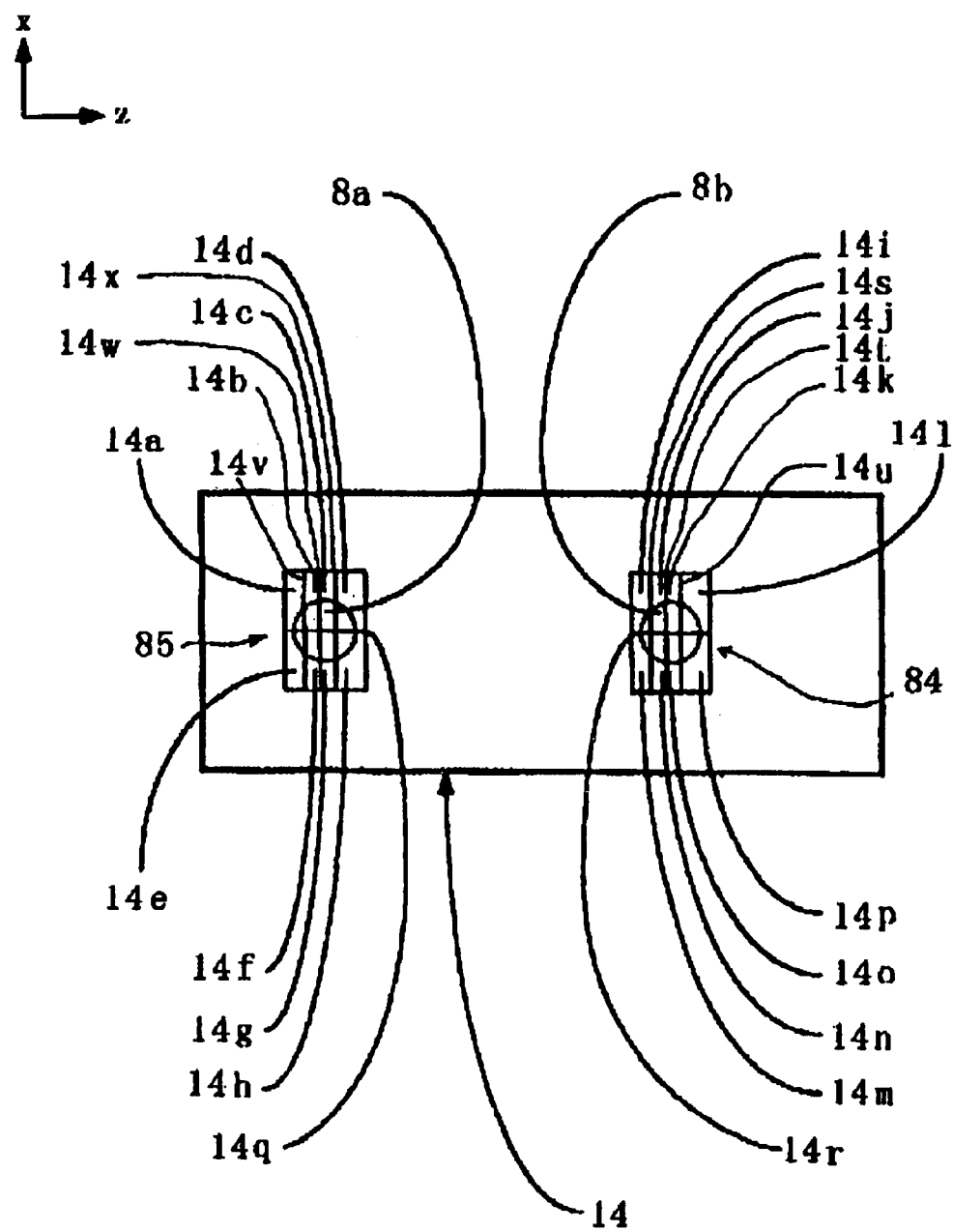
FIG. 8 is a top plan view illustrating a photodiode chip constituting an optical head in accordance with the second embodiment of the present invention.

An optical head in accordance with the second embodiment has almost the same structure as the structure of the optical head in accordance with the first embodiment, but is different only in that the photodiode chip 6 is replaced with a photodiode chip 14. FIG. 8 is a plan view of the photodiode chip 14.

As illustrated in FIG. 8, a front light-receiving section 84 and a rear light-receiving section 85 are formed on a light-receiving plane of the photodiode chip 14.

With reference to FIG. 8, a light having been reflected at the first inner plane 7a forms a first beam spot 8a, and a light having been reflected at the second inner plane 7b forms a second beam spot 8b both on the photodiode chip 14. The front and rear light-receiving sections 84 and 85 are formed in association with the second and first beam spots 8b and 8a, respectively.

The front light-receiving section 84 is comprised of eight light-receiving sections 14i, 14j, 14k, 14l, 14m, 14n, 14o, and 14p defined by a first front division line 14r parallel to an optically tangential direction of the medium, and second, third and fourth front division lines 14s, 14t and 14u all parallel to an optically radial direction of the medium.

Similarly, the rear light-receiving section 85 is comprised of eight light-receiving sections 14a, 14b, 14d, 14d, 14e, 14f, 14g, and 14h defined by a first rear division line 14q parallel to an optically tangential direction of the medium, and second, third and fourth rear division lines 14v, 14w and 14x all parallel to an optically radial direction of the medium.

A focus error signal FE2 is obtained by a spot-size process in accordance with the following equation, based on signals S14a to S14p detected at the light-receiving sections 14a to 14p constituting the front and rear light-receiving sections 84 and 85 formed on the light-receiving plane 61 of the photodiode chip 6.

FE2=(S14a+S14o)−(S14b+S14p)−(S14c+S14m)+(S14d+S14n)+(S14e+S14k)−(S14f+S14l)−(S14g+S14i)+(S14h+S14j)

A track error signal TE2 is obtained by a push-pull process in accordance with the following equation.

TE2=(S14a+S14o)+(S14b+S14p)+(S14c+S14m)+(S14d+S14n)−(S14e+S14k)−(S14f+S14l)−(S14g+S14i)−(S14h+S14j)

A track error signal TE3 is obtained by a phase difference process as follows.

TE3=Phase difference between (S14a+S14o)+(S14b+S14p)+(S14g+S14i)+(S14h+S14j) and (S14c+S14m)+(S14d+S14n)+(S14e+S14k)+(S14f+S14l)

A signal indicative of data to be reproduced can be obtained as a sum of the signals S14a to S14p.

The laser diode chip 1 and the photodiode chip 14 are fixedly installed in such a position that the first beam spot 8a is uniformly divided by the first rear division line 14q partitioning the light-receiving sections 14a, 14b, 14c and 14d from the light-receiving sections 14e, 14f, 14g and 14h, and that the second beam spot 8b is uniformly divided by the first front division line 14r partitioning the light-receiving sections 14i, 14j, 14k and 14l from the light-receiving sections 14m, 14n, 14o and 14p.

However, the first and second beam spots 8a and 8b deviate in an x-axis direction, if the laser diode chip 1 and the photodiode chip 14 are assembled containing assembling error therein. In accordance with the second embodiment, even if such assembling error exists in the laser diode chip 1 and the photodiode chip 14, −(S14i+S14j+S14k+S14l)+(S14m+S14n+S14o+S14p) is decreased (or increased) to a degree to which (S14a+S14b+S14c+S14d)−(S14e+S14f+S14g+S14h) is increased (or decreased). Hence, they are cancelled with each other, ensuring no track offset in a push-pull process.

In accordance with the second embodiment, the laser diode chip 1 emits a light in parallel to the photodiode chip 14, an optical head can be designed to have a reduced thickness equal to a sum of thicknesses of the prism 7 and the photodiode chip 14.

In addition, the second embodiment ensures no optical loss in the prism 7.

In accordance with the second embodiment, since the focus error signal FE2 is detected in the form of variation in a size of the first and second beam spots 8a and 8b in a z-axis direction, and the track error signal component is detected in the form of variation in an amount of a light of the first and second beam spots 8a and 8b in an x-axis direction, the track error signal component is unlikely to be mixed into the focus error signal FE2.

Third Embodiment

Figure 9:
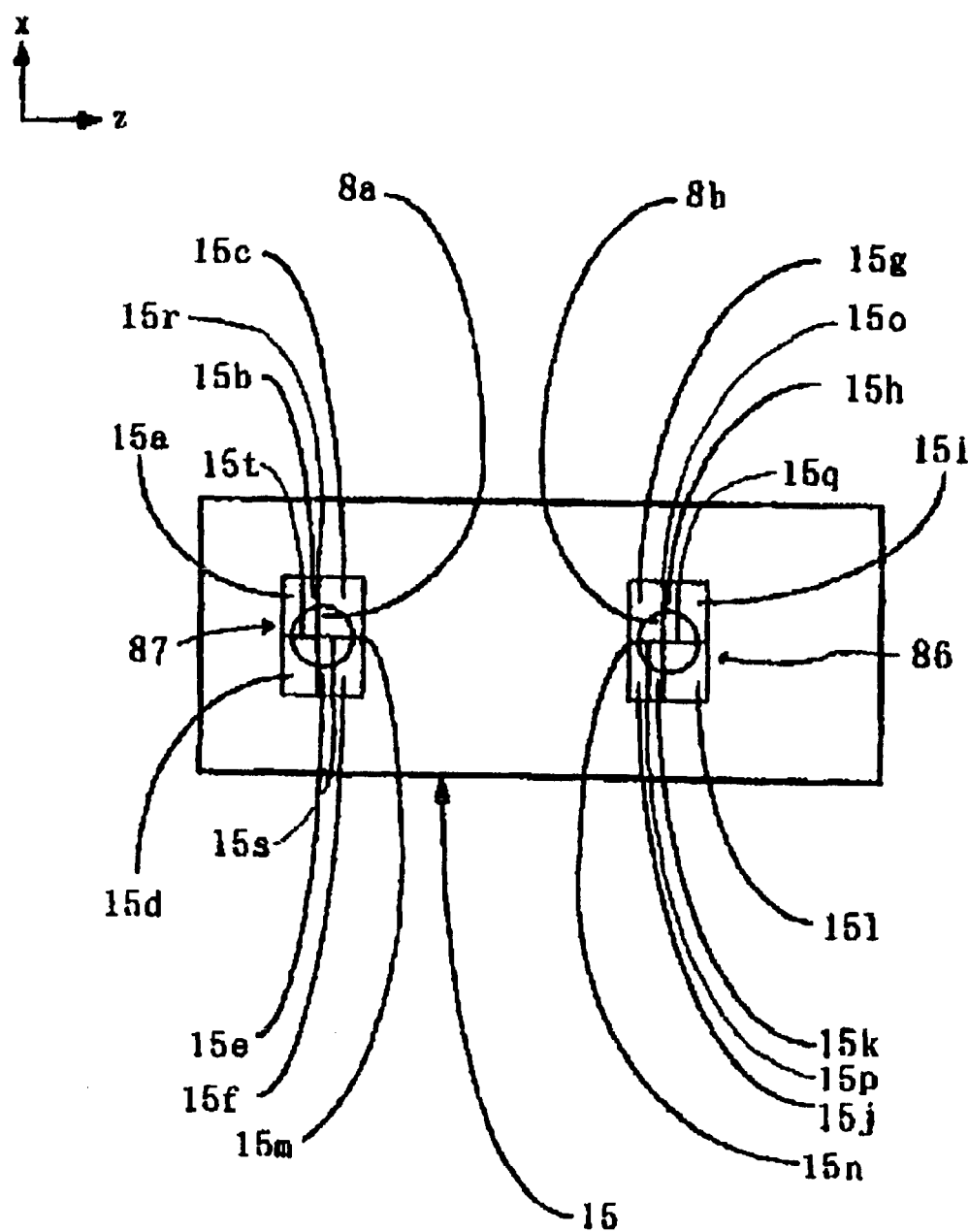
FIG. 9 is a top plan view illustrating a photodiode chip constituting an optical head in accordance with the third embodiment of the present invention.

An optical head in accordance with the third embodiment has almost the same structure as the structure of the optical head in accordance with the first embodiment, but is different only in that the photodiode chip 6 is replaced with a photodiode chip 15. FIG. 9 is a plan view of the photodiode chip 15.

With reference to FIG. 9, a light having been reflected at the first inner plane 7a forms a first beam spot 8a, and a light having been reflected at the second inner plane 7b forms a second beam spot 8b both on the photodiode chip 15. Front and rear light-receiving sections 86 and 87 are formed in association with the second and first beam spots 8b and 8a, respectively.

The front light-receiving section 86 is comprised of first to sixth light-receiving sections 15l, 15g, 15j, 15k, 15h and 15i defined by a first front division line 15n parallel to an optically tangential direction of the medium, and second, third and fourth front division lines 15o, 15p and 15q all parallel to an optically radial direction of the medium.

The first, fourth and third light-receiving sections 15l, 15k and 15j are located at a right side of the first front division line 15n, and the sixth, fifth and second light-receiving sections 15i, 15h and 15g are located at a left side of the first front division line 15n. The first, fifth and sixth light-receiving sections 15l, 15h and 15i are located at a left side of the second front division line 15o, and the third, fourth and second light-receiving sections 15j, 15k and 15g are located at a right side of the second front division line 15o.

A light having been reflected at the second outer surface 7b and having left the prism 7 at the second outer surface 72 passes an intersection between the first front division line 15n and the second front division line 15o.

Similarly, the rear light-receiving section 87 is comprised of seventh to twelfth light-receiving sections 15d, 15c, 15e, 15f, 15a and 15b defined by a first rear division line 15m parallel to an optically tangential direction of the medium, and second, third and fourth rear division lines 15r, 15s and 15t all parallel to an optically radial direction of the medium.

The ninth, tenth and seventh light-receiving sections 15e, 15f and 15d are located at a right side of the first rear division line 15m, and the eighth, eleventh and twelfth light-receiving sections 15c, 16a and 15b are located at a left side of the first rear division line 15m. The ninth, tenth and eighth light-receiving sections 15e, 15f and 15c are located at a left side of the second rear division line 15r, and the seventh, eleventh and twelfth light-receiving sections 15d, 15a and 15b are located at a right side of the second rear division line 15r.

A light having been reflected at the first outer surface 7a and having left the prism 7 at the second outer surface 72 passes an intersection between the first rear division line 15m and the second rear division line 15r.

A focus error signal FE3 is obtained by a spot-size process in accordance with the following equation, based on signals S15a to S15l detected at the light-receiving sections 15a to 15l constituting the front and rear light-receiving sections 86 and 87 formed on the light-receiving plane 61 of the photodiode chip 6.

$$FE3=(S15a+S15f+S15h+S15k)-(S15b+S15e+S15i+S15j)$$

A track error signal TE4 is obtained by a push-pull process in accordance with the following equation.

$$TE4=S15c-S15d-S15g+S15l$$

A track error signal TE5 is obtained by a phase difference process as follows.

$$TE5=\text{Phase difference between } (S15c+S15d) \text{ and } (S15g+S15l)$$

A signal indicative of data to be reproduced can be obtained as a sum of the signals S15c, S15d, S15g and S15l.

The laser diode chip 1 and the photodiode chip 15 are fixedly installed in such a position that the first beam spot 8a is uniformly divided by the first rear division line 15m partitioning the light-receiving sections 15a, 15b and 15c from the light-receiving sections 15d, 15e and 15f, and that the second beam spot 8b is uniformly divided by the first front division line 15n partitioning the light-receiving sections 15g, 15h and 15i from the light-receiving sections 15j, 15k and 15l.

However, the first and second beam spots 8a and 8b deviate in an x-axis direction, if the laser diode chip 1 and the photodiode chip 15 are assembled containing assembling error therein. In accordance with the third embodiment, even if such assembling error exists in the laser diode chip 1 and the photodiode chip 15, $-(S15g+S15l)$ is decreased (or increased) to a degree to which $(S15c-S15d)$ is increased (or decreased). Hence, they are cancelled with each other, ensuring no track offset in a push-pull process.

In accordance with the third embodiment, the laser diode chip 1 emits a light in parallel to the photodiode chip 15, an optical head can be designed to have a reduced thickness equal to a sum of thicknesses of the prism 7 and the photodiode chip 15.

In addition, the third embodiment ensures no optical loss in the prism 7.

In accordance with the third embodiment, since the focus error signal FE3 is detected in the form of variation in a size of the first and second beam spots 8a and 8b in a z-axis direction, and the track error signal component is detected in the form of variation in an amount of a light of the first and second beam spots 8a and 8b in an x-axis direction, the track error signal component is unlikely to be mixed into the focus error signal FE3.

The light-receiving sections 15a to 15l generate pairs of an electron and a hole on receipt of a light, that is, act as a current source. Wirings connected to the light-receiving sections can be collected into a bundle, if they are represented as an adding component in the equation for calculating the focus error signal and the track error signal. A current signal running through a wiring is converted into a voltage signal by means of an electron amplifier. Noises in the electron amplifier exerts a greater influence on a voltage signal converted from a smaller current. Thus, it is important to bundle as much as wirings to thereby increase a current per a wiring.

In accordance with the third embodiment, wirings electrically connected to the eleventh, tenth, fifth and fourth light-receiving sections 15a, 15f, 15h and 15k can be bundled into a single wiring, and wiring electrically connected to the twelfth, ninth, sixth and third light-receiving sections 15b, 15e, 15i and 15j can be bundled into a single wiring. As a result, the third embodiment makes noises in an electron amplifier smaller than the above-mentioned second embodiment.

Fourth Embodiment

Figure 10A:
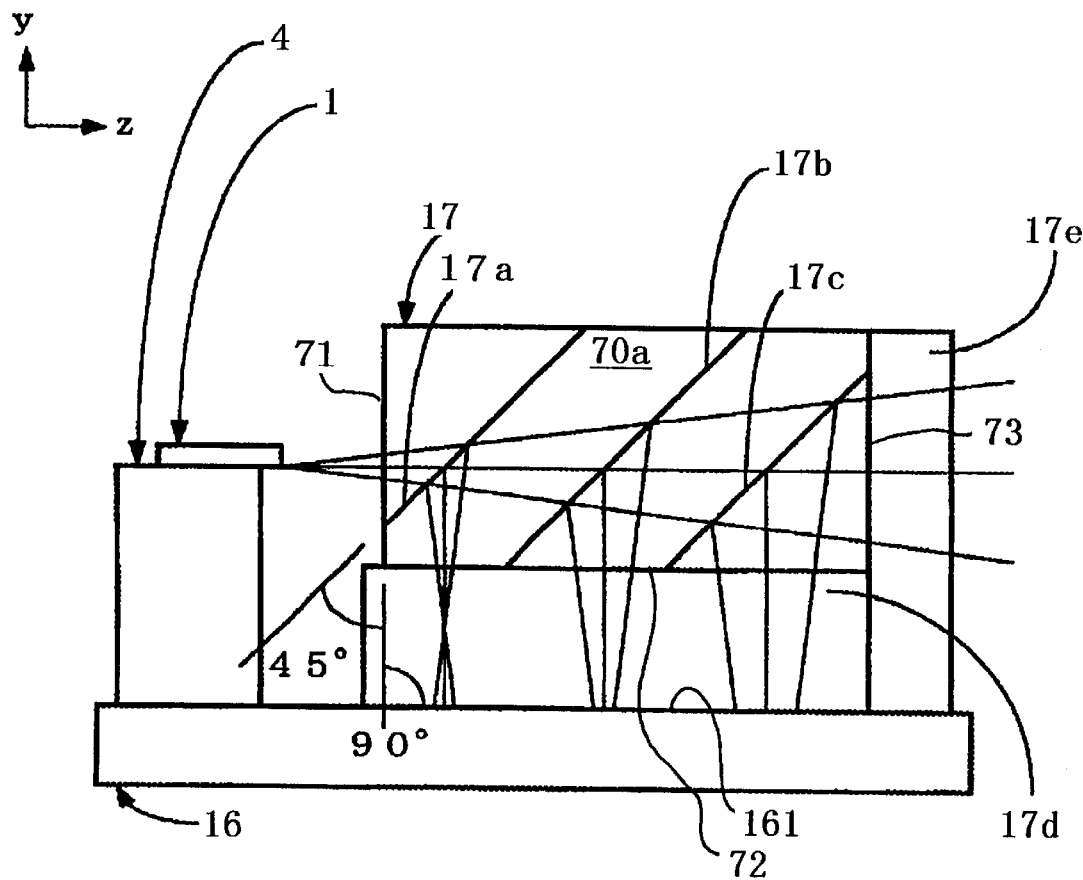
FIG. 10A is a side view illustrating an optical head in accordance with the fourth embodiment of the present invention.
Figure 10B:
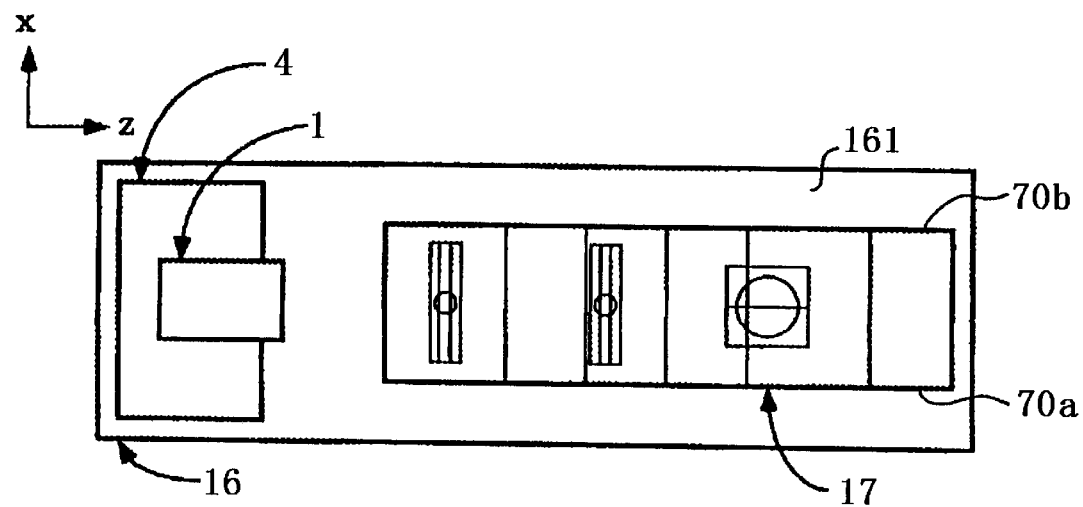
FIG. 10B is a top plan view of the optical head illustrated in FIG. 10A.

FIGS. 10A and 10B illustrate an optical head im accordance with the fourth embodiment of the present invention.

An optical head in accordance with the fourth embodiment is comprised of a laser diode chip 1, a sub-mount 4 on which the laser diode chip 1 is mounted and which keeps the laser diode chip 1 at a predetermined height, a lens (not illustrated) for focusing a light emitted from the laser diode chip 1, onto a medium (not illustrated), an optical separator or prism 17 for separating a light reflected from the medium, from an optical axis of a light directing to the lens from the laser diode chip 1, a photodiode chip 16 receiving a light separated from the optical axis by means of the prism 17, a base 17d sandwiched between the prism 17 and the photodiode chip 16 and composed of light-permeable material, and a quarter wavelength plate 17e mounted on the photodiode chip 16 integrally with the prism 17 and the base 17d.

The optical separator or prism 17 is a rectangular parallelopiped in shape defined by a first sidewall 70a and a second sidewall 70b in parallel with each other, and first, second, third and fourth outer surfaces 71, 72, 73 and 74 all perpendicular to both the first and second sidewalls 70a and 70b. The first and third outer surfaces 71 and 73 are in parallel with each other.

The prism 17 is designed to have first, second and third inner planes 17a, 17b and 17c all perpendicular to the first and second sidewalls 70a and 70b, in parallel with one another, and all inclined relative to the first outer surface 71 at a predetermined angle of 45 degrees.

The quarter wavelength plate 17e converts a light having passed through the third outer surface 73 of the prism 17 to a circularly polarized light from a linearly polarized light, and also converts a light having been reflected from the medium from a circularly polarized light to a linearly polarized light having an orientation perpendicular to an original orientation.

Figure 11:
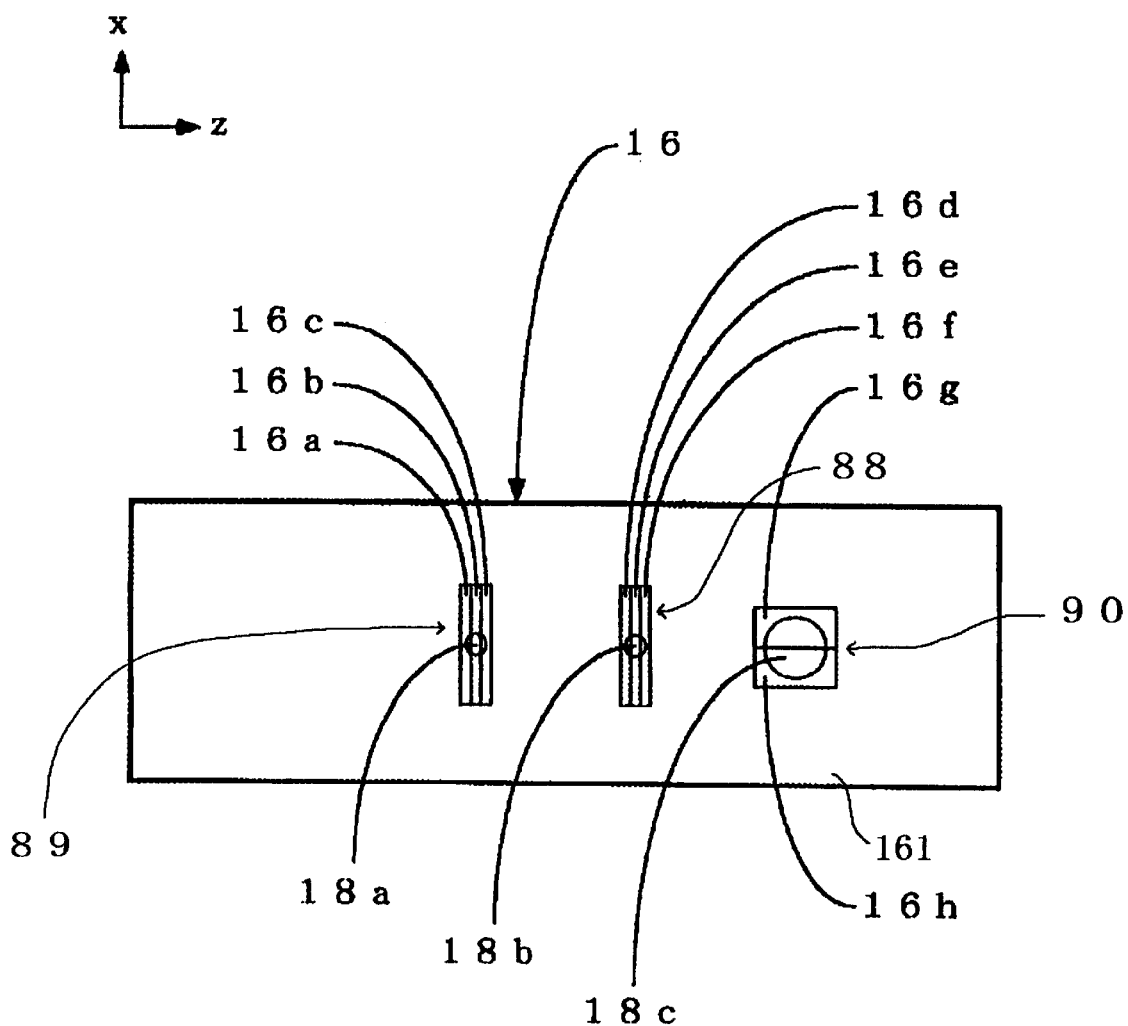
FIG. 11 is a top plan view illustrating a photodiode chip constituting the optical head illustrated in FIGS. 10A and 10B.

The photodiode chip 16 has a light-receiving plane 161 in parallel with the second outer surface 72. As illustrated in FIG. 11, a front light-receiving section 88, a rear light-receiving section 89 and an additional light-receiving section 90 are formed on the light-receiving plane 161.

With reference to FIG. 11, a light having been reflected at the first inner plane 17a forms a first beam spot 18a, a light having been reflected at the second inner plane 17b forms a second beam spot 18b, and a light having been reflected at the third inner plane 17c forms a third beam spot 18c all on the photodiode chip 16. The front, rear and additional light-receiving sections 88, 89 and 90 are associated with the second, first and third beam spots 18b, 18a and 18c, respectively.

As illustrated in FIG. 11, the front light-receiving section 88 is comprised of three light-receiving sections 16d, 16e and 16f defined by two division lines parallel to an optically radial direction of the medium. Similarly, the rear light-receiving section 89 is comprised of three light-receiving sections 16a, 16b and 16c defined by two division lines parallel to an optically radial direction of the medium. The additional light-receiving section 90 is comprised of two light-receiving sections 16g and 16h defined by a division line parallel to an optically tangential direction of the medium.

The laser diode chip 1 is positioned so that an optical length between the laser diode chip 1 and the first inner plane 17a is equal to (a+b−c)/2 wherein "a" indicates an optical length between the first inner plane 17a and the rear light-receiving section 89, "b" indicates an optical length between the second inner plane 17b and the front light-receiving section 88, and "c" indicates an optical length between the first and second inner planes 17a and 17b.

The optical head in accordance with the fourth embodiment operates as follows.

A light emitted from the laser diode chip 1 and polarized in a y-axis direction enters the prism 17 through the first outer surface 71 so that an optical axis thereof is perpendicular to the first outer surface 71. Then, the light transmits through the first, second and third inner plane 17a, 17b and 17c in this order, and leaves the prism 17 at the third outer surface 73 with an optical axis thereof being perpendicular to the third outer surface 73. The light having left the prism 17 is converted into a circularly polarized light in the quarter wavelength plate 17e, and then, is focused onto the medium through the lens (not illustrated).

The light having been reflected by the medium advances on the same optical path in an opposite direction, and is converted by the quarter wavelength plate 17e into a light polarized in an x-axis direction. Then, the light enters the prism 17 at the third outer surface 73 with an optical axis thereof being perpendicular to the third outer surface 73.

The light having entered the prism 17 is reflected at the third inner plane 17c by α% (0<α<100), and the remaining portion of the light passes through the third inner plane 17c, that is, the light passes through the third inner plane 17c by (100−α)%. The light having been reflected at the third inner plane 17c leaves the prism 17 at the second outer surface 72, passes through the base 17d, enters the photodiode chip 16, and is received in the additional light-receiving section 90 formed on the light-receiving plane 161 of the photodiode chip 16.

The light having passed through the third inner plane 17c is reflected at the second inner plane 17b by half in an amount, and the remaining half passes through the second inner plane 17b. The light having been reflected at the second inner plane 17b leaves the prism 17 at the second outer surface 72, passes through the base 17d, enters the photodiode chip 16, and is received in the front light-receiving section 88 formed on the light-receiving plane 161 of the photodiode chip 16.

The light having passed through the second inner plane 17b is reflected at the first inner plane 17a, passes through the base 17d, enters the photodiode chip 16, and is received in the rear light-receiving section 89 formed on the light-receiving plane 161 of the photodiode chip 16.

An additional light-receiving section may be formed on the sub-mount 4, similarly to the above-mentioned first embodiment. The formation of such an additional light-receiving section prevents variation in an amount of a light emitted from the laser diode chip 1 which variation is caused by degradation occurring with the lapse of time, or by temperature variation.

The photodiode chip 16 may be designed to have an alignment mark or marks for accurately mounting the sub-mount 4 on the photodiode chip 16.

It is not always necessary to form the quarter wavelength plate 17e integrally with the prism 17. The quarter wavelength plate 17e may be positioned at any place intermediate between the prism 17 and the medium.

A focus error signal FE4 is obtained by a spot-size process in accordance with the following equation, based on signals S16a to S16h detected at the light-receiving sections 16a to 16h constituting the front, rear and additional light-receiving sections 88, 89 and 90 formed on the light-receiving plane 161 of the photodiode chip 16.

$$FE4 = S16a - S16b + S16c - S16d + S16e - S16f$$

A track error signal TE6 is obtained by a push-pull process in accordance with the following equation.

$$TE6 = S16g - S16h$$

A signal indicative of data to be reproduced can be obtained as a sum of the signals S16g and S16h.

In the above-mentioned first to third embodiments, when the first and second beam spots 8a and 8b are deviated in an x-axis direction due to assembling error in the laser diode chip 1 and the photodiode chip 6 or 16, they are uniformly deviated. That is, if a light emitted from the laser diode chip 1 does not have an optical axis in parallel with a z-axis, there would be generated track offset in a push-pull process. In addition, even if a light emitted from the laser diode chip 1 has an optical axis in parallel with a z-axis, a track error signal obtained by a push-pull process would have a reduced signal amplitude.

In accordance with the fourth embodiment, the beam spot 18c is greater in size than the beams spots 8a and 8b, which ensures the laser diode chip 1 to have greater tolerance in an x-axis direction. In addition, since a division line parallel to a z-axis is formed only in the beam spot 18c, the laser diode chip 1 is given greater tolerance for rotation in an x-z plane.

Each of the first and second inner planes 17a and 17b makes an angle of 45 degrees relative to the first outer surface 71 of the prism 17, and the photodiode chip 16 makes an angle of 90 degrees relative to the first outer surface 71. Hence, even if the sub-mount 4 would have a thickness different from a designed thickness, and accordingly, a light-emitting point of the laser diode chip 1 is deviated relative to the photodiode chip 16 in a y-axis direction, a relative positional relation in a direction of an optical axis between the laser diode chip 1 and the photodiode chip 16 remains unchanged, ensuring that there is not generated focus offset caused by the deviation in the light-emitting point of the laser diode chip 1.

When a focus error signal is to be detected by a spot-size process, a size of a beam spot formed on the photodiode chip 16 varies to a greater degree relative to a deviation of the medium in an optical axis direction, as an optical length between front and rear light-converging points of the photodiode chip 16 positioned so that the medium is located on a light-converging point of the lens, and the photodiode chip 16 is set shorter. Herein, considering the facts that a ratio of variation in a size of a beam spot has a relation with sensitivity of a focus error signal, and that an optical length between the light-converging point and the photodiode chip 16 is equal to a half of a distance between the first and second inner planes 17a and 17b, it is understood that a shorter distance between the first and second inner plane 17a and 17b ensures a focus error signal. to have greater sensitivity.

In the prism 7 in the above-mentioned first to third embodiments, even if a distance between the first and second inner planes 7a and 7b is intended to narrow in order to prevent a light having been reflected at the first inner plane 7a from being reflected again at the second inner plane 7b, there is a limitation in doing so. However, since the optical head in accordance with the fourth embodiment is provided with the base 17d sandwiched between the prism 17 and the photodiode chip 16, a distance between the first and second inner planes 17a and 17b can be narrowed to an intended degree.

In accordance with the fourth embodiment, since the laser diode chip 1 emits a light in parallel with the photodiode chip 16, an optical head can be designed to have a reduced thickness equal to a sum of thicknesses of the prism 17 and the photodiode chip 16.

In addition, the fourth embodiment ensures no optical loss in the prism 17.

In accordance with the fourth embodiment, since the focus error signal FE4 is detected in the form of variation in a size of the first and second beam spots 18a and 18b in a z-axis direction, and the track error signal component is detected in the form of variation in an amount of a light of the first and second beam spots 18a and 18b in an x-axis direction, the track error signal component is unlikely to be mixed into the focus error signal FE4.

As the lens to be used in the fourth embodiment, there may be used a single finite lens or a combination of a collimate lens and an objective lens. The combination may include a beam splitter located between the collimate lens and the objective lens for separating a light directing to the medium from the laser diode chip 1, or a light directing to the photodiode chip 16 from the medium. This ensures these lights to be parallel lights in the case that the medium is located on a light-converging point of the objective lens. Hence, these lights could be readily dealt with.

The medium mentioned in the fourth embodiment includes an optical disc, an optical tape, and the like, and may be composed of phase-change material or photo-electro-magnetic material, for instance.

The above-mentioned constant a can be selected among figures in the range of 0 to 100 both inclusive in dependence on specific material of which the medium is composed. For instance, the constant a may be set equal to 50 or 80.

Fifth Embodiment

Figure 12:
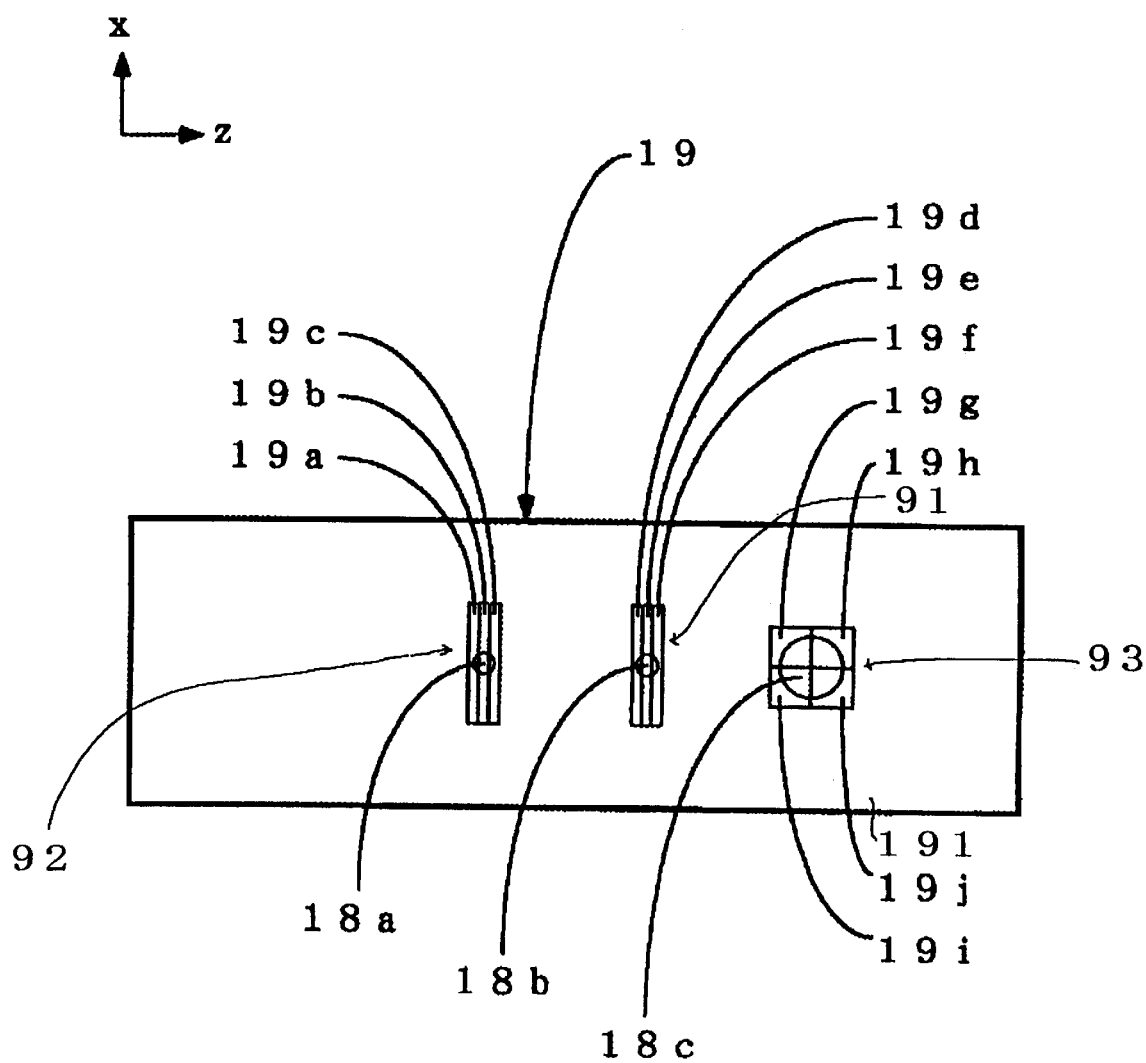
FIG. 12 is a top plan view illustrating a photodiode chip constituting an optical head in accordance with the fifth embodiment of the present invention.

An optical head in accordance with the fifth embodiment has almost the same structure as the structure of the optical head in accordance with the fourth embodiment, but is different only in that the photodiode chip 16 is replaced with a photodiode chip 19. FIG. 12 is a plan view of the photodiode chip 19.

As illustrated in FIG. 12, a front light-receiving section 91, a rear light-receiving section 92, and an additional light-receiving section 93 are formed on a light-receiving plane 191 of the photodiode chip 19.

With reference to FIG. 12, a light having been reflected at the first inner plane 17a forms a first beam spot 18a, a light having been reflected at the second inner plane 17b forms a second beam spot 18b, and a light having been reflected at the third inner plane 17c forms a third beam spot 18c all on the photodiode chip 19. The front, rear and additional light-receiving sections 91, 92 and 93 are formed in association with the second, first and third beam spots 18b, 18a and 18c, respectively.

As illustrated in FIG. 12, the front light-receiving section 91 is comprised of three light-receiving sections 19d, 19e and 19f defined by two division lines parallel to an optically radial direction of the medium. Similarly, the rear light-receiving section 92 is comprised of three light-receiving sections 19a, 19b and 19c defined by two division lines parallel to an optically radial direction of the medium. The additional light-receiving section 93 is comprised of four light-receiving sections 19g, 19h, 19i and 19j defined by both a division line parallel to an optically tangential direction of the medium and a division line parallel to an optically radial direction of the medium.

A focus error signal FE5 is obtained by a spot-size process in accordance with the following equation, based on signals S19a to S19j detected at the light-receiving sections 19a to 19 constituting the front, rear and additional light-receiving sections 91, 92 and 93 formed on the light-receiving plane 191 of the photodiode chip 19.

$$FE5=S19a-S19b+S19c-S19d+S19e-S19f$$

Track error signals TE7 and TE8 are obtained by a push-pull process and a phase difference process, respectively, in accordance with the following equations.

$$TE7=S19g+S19h-S19i-S19j$$

$$TE8=\text{Phase difference between } (S19g+S19j) \text{ and } (S19h+S19i)$$

A signal indicative of data to be reproduced can be obtained as a sum of the signals S19g, S19h, S19i and S19j.

In the above-mentioned first to third embodiments, when the first and second beam spots 8a and 8b are deviated in an x-axis direction due to assembling error in the laser diode chip 1 and the photodiode chip 19, they are uniformly deviated. That is, if a light emitted from the laser diode chip 1 does not have an optical axis in parallel with a z-axis, there would be generated track offset in a push-pull process. In addition, even if a light emitted from the laser diode chip 1 has an optical axis in parallel with a z-axis, a track error signal obtained by a push-pull process would have a reduced signal amplitude.

In accordance with the fifth embodiment, the beam spot 18c is greater in size than the beams spots 8a and 8b, which ensures the laser diode chip 1 to have greater tolerance in an x-axis direction. In addition, since a division line parallel to a z-axis is formed only in the beam spot 18c, the laser diode chip 1 is given greater tolerance for rotation in an x-z plane.

In accordance with the fifth embodiment, since the laser diode chip 1 emits a light in parallel with the photodiode chip 19, an optical head can be designed to have a reduced thickness equal to a sum of thicknesses of the prism 17 and the photodiode chip 19.

In addition, the fifth embodiment ensures no optical loss in the prism 17.

In accordance with the fifth embodiment, since the focus error signal FE5 is detected in the form of variation in a size of the first and second beam spots 18a and 18b in a z-axis direction, and the track error signal component is detected in the form of variation in an amount of a light of the first and second beam spots 18a and 18b in an x-axis direction, the track error signal component is unlikely to be mixed into the focus error signal FE5.

Sixth Embodiment

Figure 13:
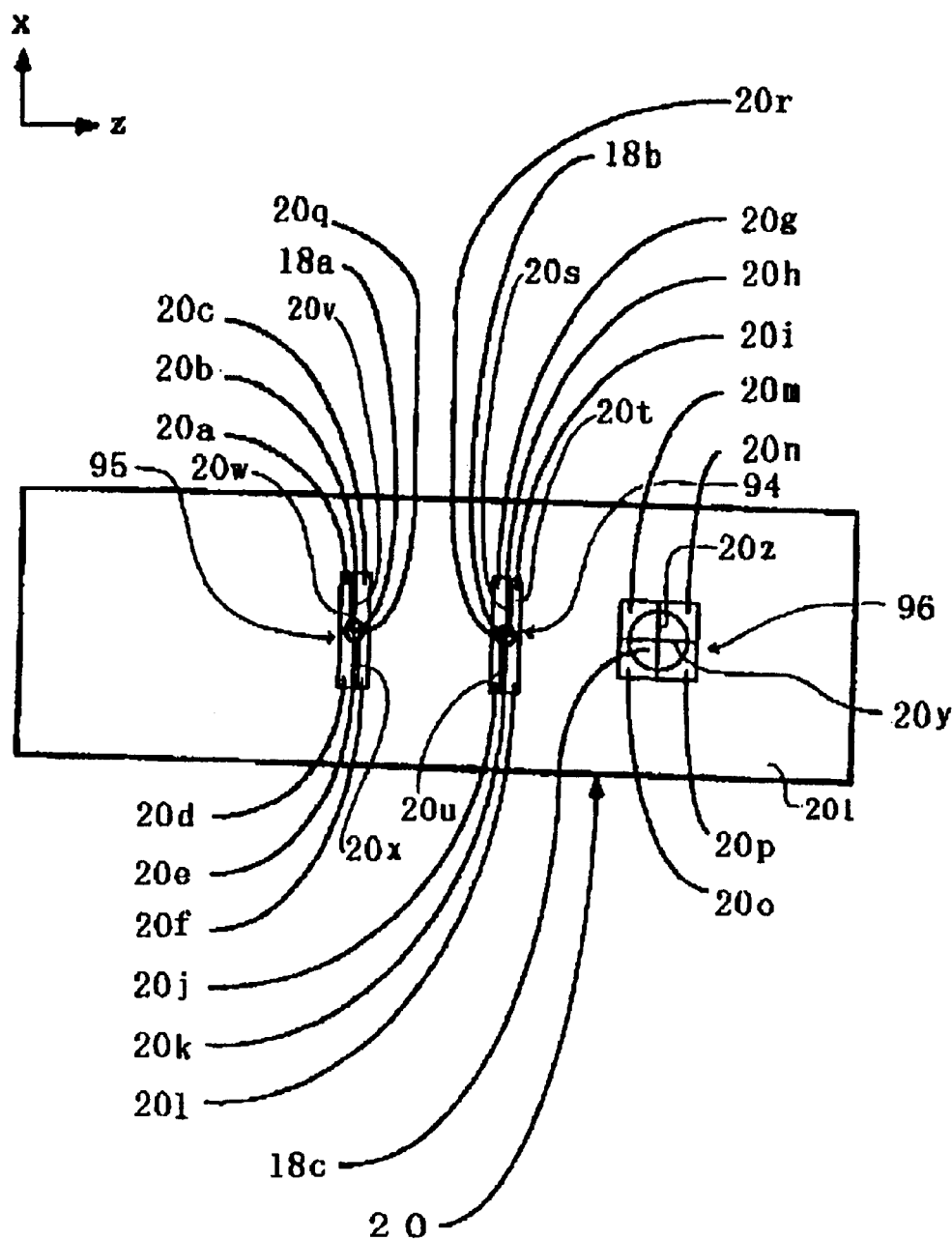
FIG. 13 is a top plan view illustrating a photodiode chip constituting an optical head in accordance with the sixth embodiment of the present invention.

An optical head in accordance with the sixth embodiment has almost the same structure as the structure of the optical head in accordance with the fourth embodiment, but is different only in that the photodiode chip 16 is replaced with a photodiode chip 20. FIG. 13 is a plan view of the photodiode chip 20.

As illustrated in FIG. 13, a front light-receiving section 94, a rear light-receiving section 95, and an additional light-receiving section 96 are formed on a light-receiving plane 201 of the photodiode chip 20.

With reference to FIG. 13, a light having been reflected at the first inner plane 17a forms a first beam spot 18a, a light having been reflected at the second inner plane 17b forms a second beam spot 18b, and a light having been reflected at the third inner plane 17c forms a third beam spot 18c all on the photodiode chip 20. The front, rear and additional light-receiving sections 94, 95 and 96 are formed in association with the second, first and third beam spots 18b, 18a and 18c, respectively.

As illustrated in FIG. 13, the front light-receiving section 94 is comprised of seventh to twelfth light-receiving sections 20g, 20h, 20i, 20j, 20k and 20l defined by a first division line 20r parallel to an optically tangential direction of the medium, and second, third and fourth division lines 20s, 20t and 20u all parallel to an optically radial direction of the medium.

The seventh, eighth and ninth light-receiving sections 20g, 20h and 20i are located at a left side of the first division line 20r, and the tenth, eleventh and twelfth light-receiving sections 20j, 20k and 20l are located at a right side of the first division line 20r. The seventh, tenth and eleventh light-receiving sections 20g, 20j and 20k are located at a right side of the second division line 20s, and the eighth, ninth and twelfth light-receiving sections 20h, 20i and 20l are located at a left side of the second division line 20s.

Similarly, the rear light-receiving section 95 is comprised of first to sixth light-receiving sections 20a, 20b, 20c, 20d, 20e and 20f defined by a fifth division line 20q parallel to an optically tangential direction of the medium, and sixth, seventh and eighth division lines 20v, 20w and 20x all parallel to an optically radial direction of the medium The first, second and third light-receiving sections 20a, 20b and 20c are located at a left side of the fifth division line 20q, and the fourth, fifth and sixth light-receiving sections 20d, 20e and 20f are located at a right side of the fifth division line 20q. The first, second and fourth light-receiving sections 20a, 20b and 20d are located at a right side of the sixth division line 20v, and the third, fifth and sixth light-receiving sections 20c, 20e and 20f are located at a left side of the sixth division line 20v.

The additional light-receiving section 96 is comprised of four light-receiving sections 20m, 20n, 20o and 20p defined by both a ninth division line 20y parallel to an optically tangential direction of the medium and a tenth division line 20z parallel to an optically radial direction of the medium.

A focus error signal FE6 is obtained by a spot-size process in accordance with the following equation, based on signals S20a to S20p detected at the light-receiving sections 20a to 20p constituting the front, rear and additional light-receiving sections 94, 95 and 96 formed on a light-receiving plane of the photodiode chip 20.

$$FE6=S20a-S20b-S20e+S20f+S20h-S20i-S20j+S20k$$

Track error signals TE9 and TE10 are obtained by a push-pull process and a phase difference process, respectively, in accordance with the following equations.

$$TE9=S20c-S20d-S20g+S20l$$

$$TE10=\text{Phase difference between } (S20m+S20p) \text{ and } (S20n+S20o)$$

A signal indicative of data to be reproduced can be obtained as a sum of the signals S20m, S20n, S20o and S20p.

The laser diode chip 1 and the photodiode chip 20 are fixedly installed in such a position that the first beam spot 18a is uniformly divided by the fifth division line 20q partitioning the light-receiving sections 20a, 20b and 20c from the light-receiving sections 20d, 20e and 20f, and that the second beam spot 18b is uniformly divided by the first division line 20r partitioning the light-receiving sections 20g, 20h and 20i from the light-receiving sections 20j, 20k and 20l.

However, the first and second beam spots 18a and 18b deviate in an x-axis direction, if the laser diode chip 1 and the photodiode chip 20 are assembled containing assembling error therein. In accordance with the sixth embodiment, even if such assembling error exists in the laser diode chip 1 and the photodiode chip 20, $-(S20g+S20l)$ is decreased (or increased) to a degree to which $(S20c-S20d)$ is increased (or decreased). Hence, they are cancelled with each other, ensuring no track offset in a push-pull process.

In the sixth embodiment, since the third beam spot 18c is greater in size than the first and second beam spots 18a and 18b, the track error signal TE10 is less influenced by deviation of the laser diode chip 1 in an x-axis direction than the track error signal TE9.

In accordance with the sixth embodiment, since the laser diode chip 1 emits a light in parallel with the photodiode chip 20, an optical head can be designed to have a reduced thickness equal to a sum of thicknesses of the prism 17 and the photodiode chip 20.

In addition, the sixth embodiment ensures no optical loss in the prism 17.

In accordance with the sixth embodiment, since the focus error signal FE6 is detected in the form of variation in a size of the first and second beam spots 18a and 18b in a z-axis direction, and the track error signal component is detected in the form of variation in an amount of a light of the first and second beam spots 18a and 18b in an x-axis direction, the track error signal component is unlikely to be mixed into the focus error signal FE6.

Seventh Embodiment

Figure 14:
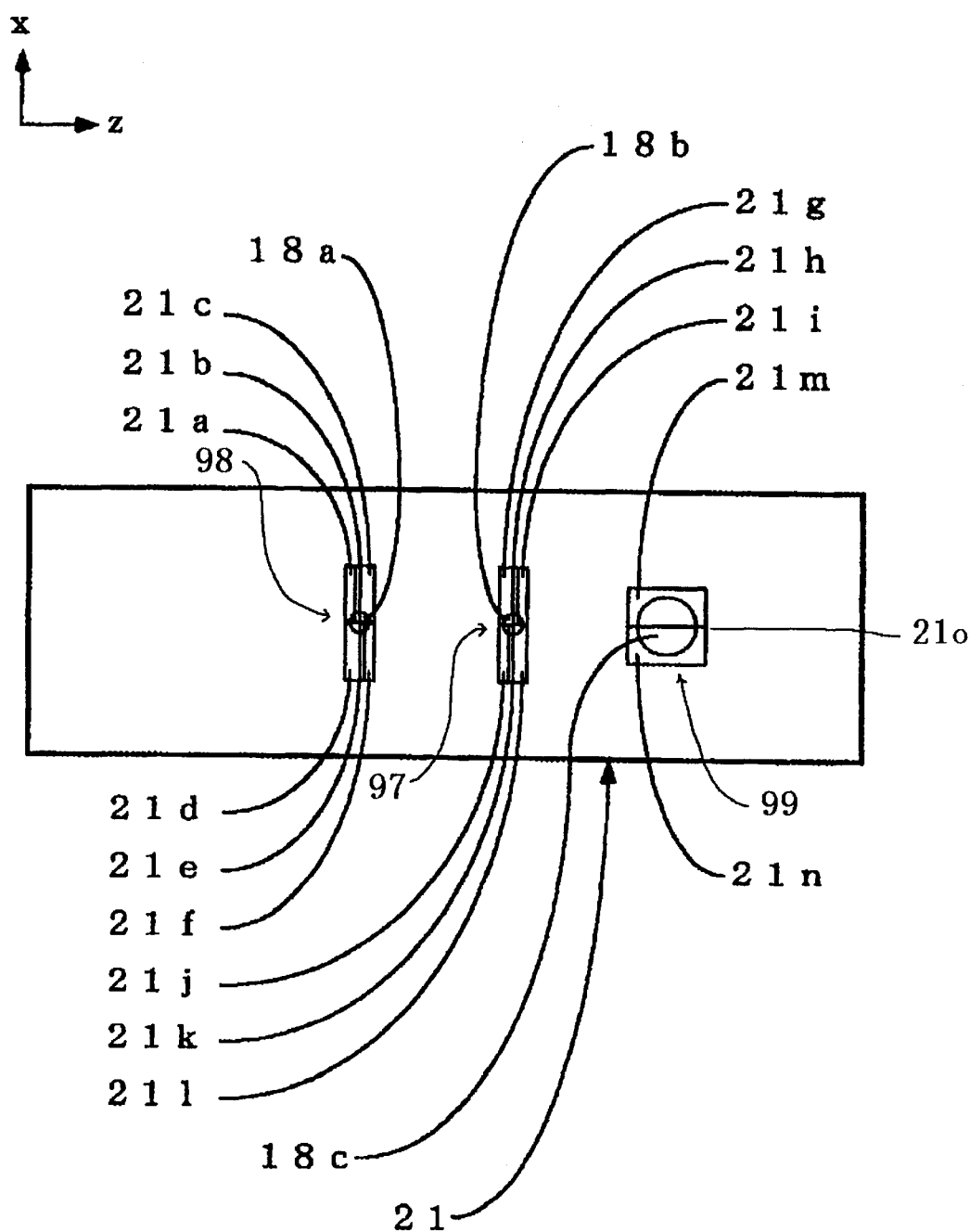
FIG. 14 is a top plan view illustrating a photodiode chip constituting an optical head in accordance with the seventh embodiment of the present invention.

An optical head in accordance with the seventh embodiment has almost the same structure as the structure of the optical head in accordance with the fourth embodiment, but is different only in that the photodiode chip 16 is replaced with a photodiode chip 21. FIG. 14 is a plan view of the photodiode chip 21.

The photodiode chip 21 is different from the photodiode chip illustrated in FIG. 13 in a structure of an additional light-receiving section. The photodiode chip 21 is designed to have an additional light-receiving section 99 in place of the additional light-receiving section 96. The additional light-receiving section 99 is comprised of two light-receiving sections 21m and 21n partitioned by a division line 21o parallel to an optically tangential direction of the medium.

A focus error signal FE7 is obtained by a spot-size process in accordance with the following equation, based on signals S21a to S21n detected at the light-receiving sections 21a to 21n constituting the front, rear and additional light-receiving sections 97, 98 and 99 formed on a light-receiving plane of the photodiode chip 21.

FE7=S21a−S21b−S21e+S21f+S21h−S21i−S21j+S21k

Track error signals TE11 and TE12 are obtained by a push-pull process and a phase difference process, respectively, in accordance with the following equations.

TE11=S21m−S21n

TE12=Phase difference between (S21c+S21d) and (S21g+S21l)

A signal indicative of data to be reproduced can be obtained as a sum of the signals S21m and S21n.

In the above-mentioned first to third embodiments, when the first and second beam spots 8a and 8b are deviated in an x-axis direction due to assembling error in the laser diode chip 1 and the photodiode chip 21, they are uniformly deviated. That is, if a light emitted from the laser diode chip 1 does not have an optical axis in parallel with a z-axis, there would be generated track offset in a push-pull process. In addition, even if a light emitted from the laser diode chip 1 has an optical axis in parallel with a z-axis, a track error signal obtained by a push-pull process would have a reduced signal amplitude.

In accordance with the seventh embodiment, the beam spot 18c is greater in size than the beams spots 8a and 8b, which ensures the laser diode chip 1 to have greater tolerance in an x-axis direction.

In accordance with the seventh embodiment, since the laser diode chip 1 emits a light in parallel with the photodiode chip 21, an optical head can be designed to have a reduced thickness equal to a sum of thicknesses of the prism 17 and the photodiode chip 21.

In addition, the seventh embodiment ensures no optical loss in the prism 17.

In accordance with the seventh embodiment, since the focus error signal FE7 is detected in the form of variation in a size of the first and second beam spots 18a and 18b in a z-axis direction, and the track error signal component is detected in the form of variation in an amount of a light of the first and second beam spots 18a and 18b in an x-axis direction, the track error signal component is unlikely to be mixed into the focus error signal FE7.

Eighth Embodiment

Figure 15A:
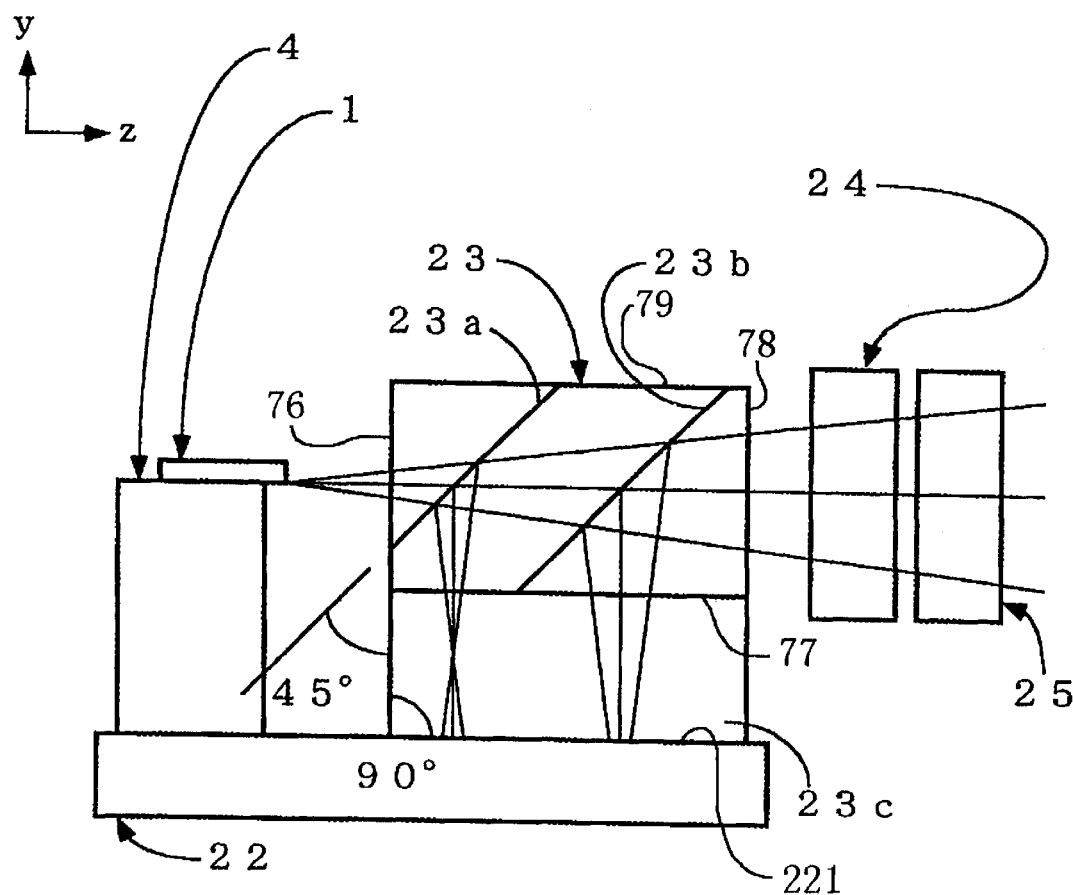
FIG. 15A is a side view illustrating an optical head in accordance with the eighth embodiment of the present invention.
Figure 15B:
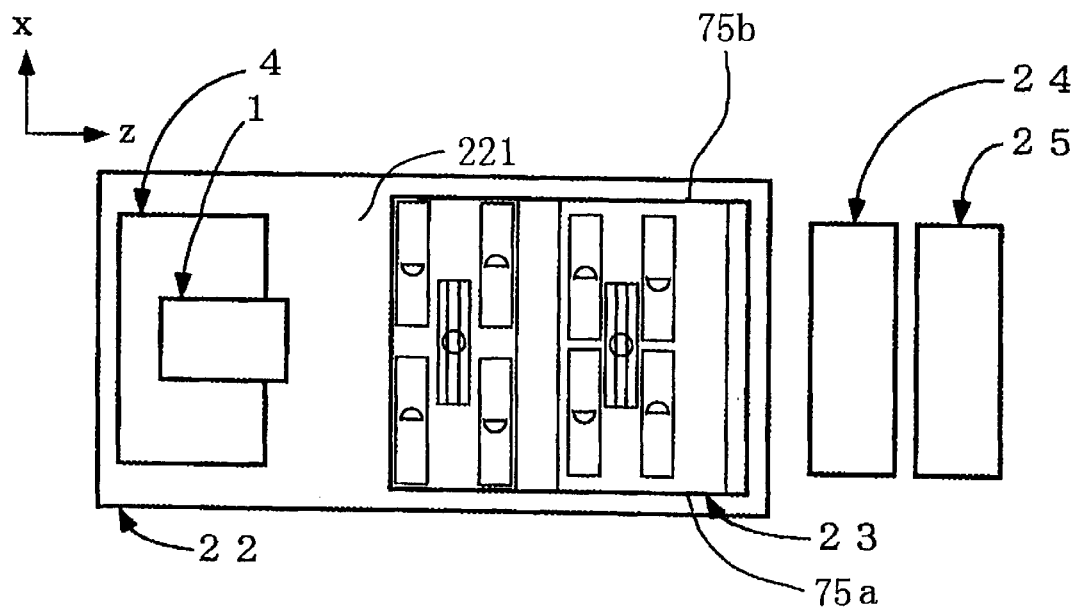
FIG. 15B is a top plan view of the optical head illustrated in FIG. 15A.

FIGS. 15A and 15B illustrate an optical head in accordance with the eighth embodiment of the present invention.

An optical head in accordance with the eighth embodiment is comprised of a laser diode chip 1, a sub-mount 4 on which the laser diode chip 1 is mounted and which keeps the laser diode chip 1 at a predetermined height, a lens (not illustrated) for focusing a light emitted from the laser diode chip 1, onto a medium (not illustrated), an optical separator or prism 23 for separating a light reflected from the medium, from an optical axis of a light directing to the lens from the laser diode chip 1, a photodiode chip 22 receiving a light separated from the optical axis by means of the prism 23, a base 23c sandwiched between the prism 23 and the photodiode chip 22 and composed of light-permeable material, a two-divisional grating 24 located in facing relation with the prism 23 and acting as a diffraction device, and a quarter wavelength plate 25 located in alignment with the two-divisional grating 24.

The optical separator or prism 23 is a rectangular parallelopiped in shape defined by a first sidewall 75a and a second sidewall 75b in parallel with each other, and first, second, third and fourth outer surfaces 76, 77, 78 and 79 all perpendicular to both the first and second sidewalls 75a and 75b. The first and third outer surfaces 76 and 78 are in parallel with each other.

The prism 23 is designed to have first and second inner planes 23a and 23b both perpendicular to the first and second sidewalls 75a and 75b, in parallel with one another, and both inclined relative to the first outer surface 76 at a predetermined angle of 45 degrees.

Figure 16:
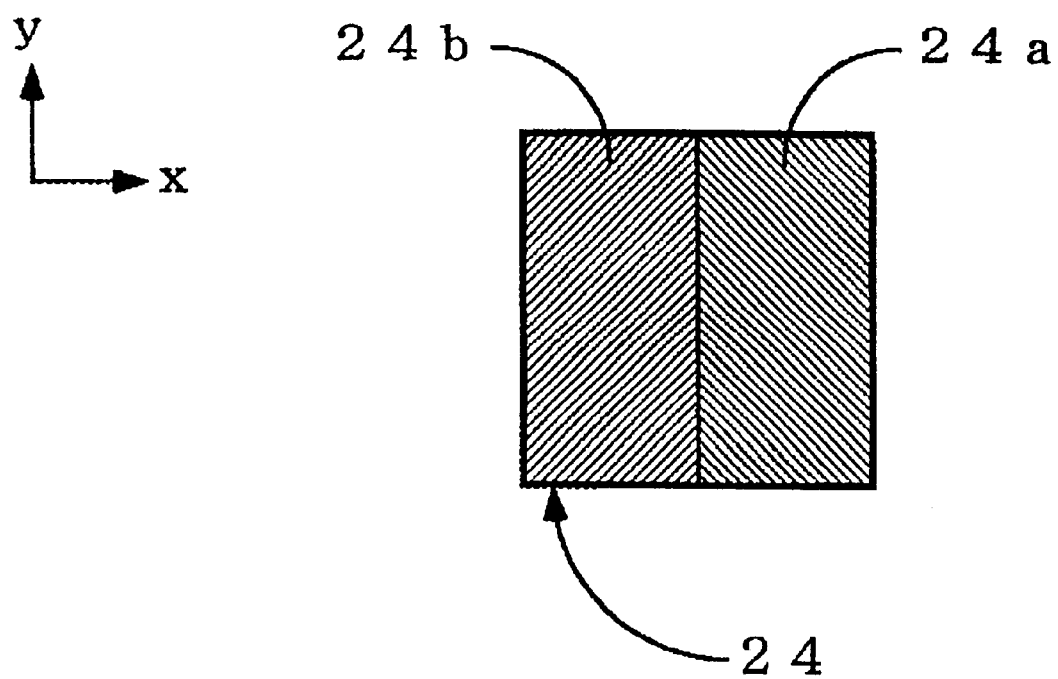
FIG. 16 is a right side view of a two-divisional grating constituting the optical head illustrated in FIGS. 15A and 15B.

As illustrated in FIG. 16, the two-divisional grating 24 is designed to have first and second regions 24a and 24b partitioned by a division line parallel to a y-axis.

The quarter wavelength plate 25 converts a light having passed through the third outer surface 78 of the prism 23 to a circularly polarized light from a linearly polarized light, and also converts a light having been reflected from the medium from a circularly polarized light to a linearly polarized light having an orientation perpendicular to an original orientation.

Figure 17:
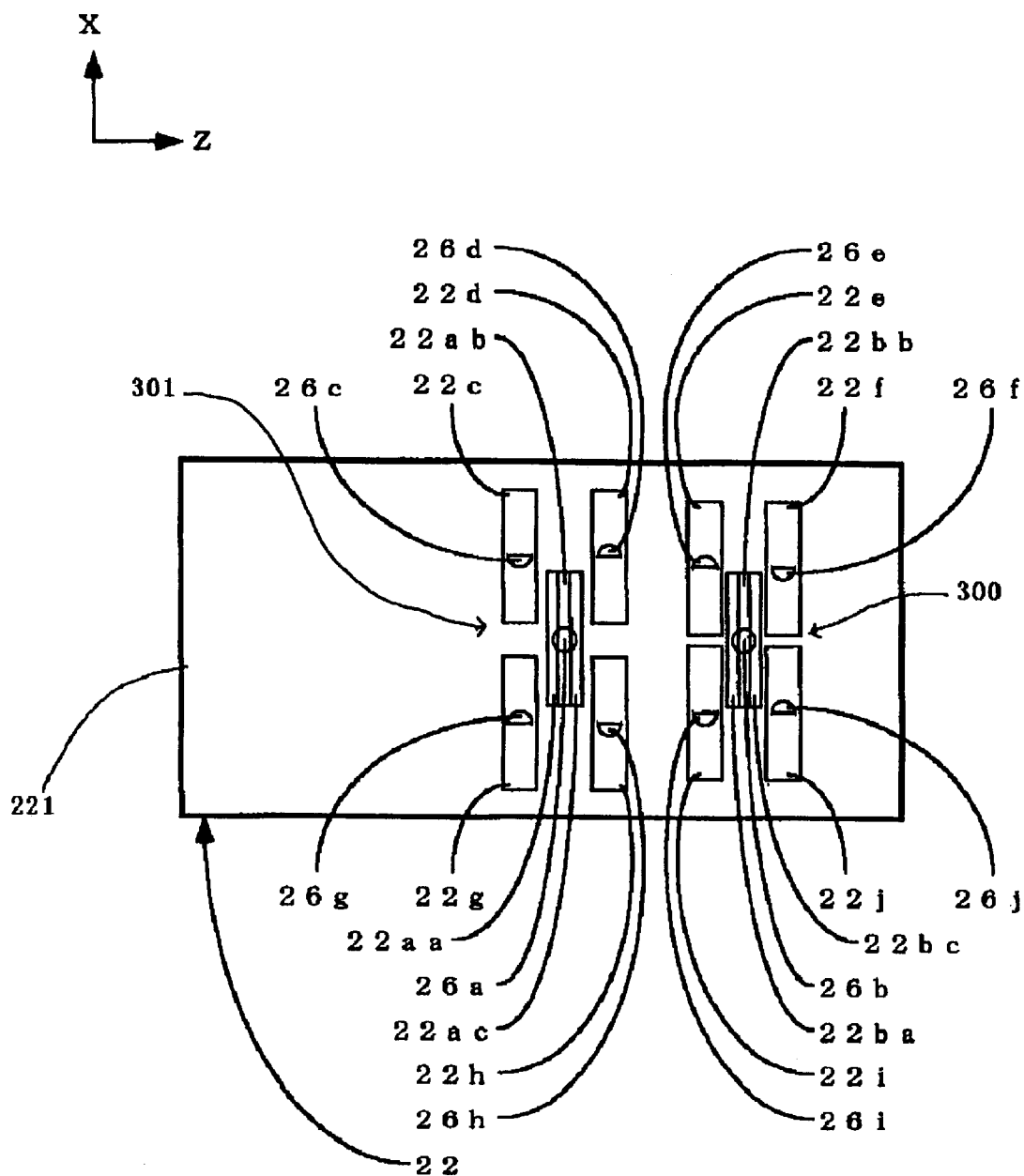
FIG. 17 is a top plan view illustrating a photodiode chip constituting the optical head illustrated in FIGS. 15A and 15B.

The photodiode chip 22 has a light-receiving plane 221 in parallel with the second outer surface 77. As illustrated in FIG. 17, a front light-receiving section 300 and a rear light-receiving section 301 are formed on the light-receiving plane 221.

With reference to FIG. 17, a light having been reflected at the first inner plane 23a forms five beam spots 26a, 26c, 26d, 26g and 26h, and a light having been reflected at the second inner plane 23b forms five beam spots 26b, 26e, 26f, 26i and 26j. The beam spots 26c, 26e, 26h and 26j are comprised of a diffracted light passing through the first region 24a of the two-divisional grating 24, and the beam spots 26d, 26f, 26g and 26i are comprised of a diffracted light passing through the second region 24b of the two-divisional grating 24. The beam spots 26a and 26b are comprised of a transmitted light passing through the two-divisional grating 24.

The beam spots 26c, 26d, 26g and 26h are all semicircular in shape, and are positioned radially around the beam spot 26a which is circular in shape. Similarly, the beam spots 26e, 26f, 26i and 26j are all semicircular in shape, and are positioned radially around the beam spot 26b which is circular in shape. In the rear light-receiving section 301, the beam spots 26c and 26g are positioned so that the arcuate portions of them face inwardly, and the beam spots 26d and 26h are positioned so that the arcuate portions of them face outwardly. In the front light-receiving section 300, the beam spots 26e and 26i are positioned so that the arcuate portions of them face outwardly, and the beam spots 26f and 26j are positioned so that the arcuate portions of them face inwardly.

The front light-receiving section 300 is associated with the beam spots 26b, 26e, 26f, 26i and 26j, and the rear light-receiving section 301 is associated with the beam spots 26a, 26c, 26d, 26g and 26h.

As illustrated in FIG. 17, the front light-receiving section 300 is comprised of five rectangular light-receiving sections each located around each of the beam spots 26b, 26e, 26i and 26j. Around the circular beam spot 26b are formed three light-receiving sections 22ba, 22bb and 22bc partitioned by two division lines both parallel to an optically radial direction of the medium. Around the semicircular beam spots 26e, 26t, 26i and 26j are formed rectangular light-receiving sections 22e, 22f, 22i and 22j, respectively.

Similarly, the rear light-receiving section 301 is comprised of five rectangular light-receiving sections each located around each of the beam spots 26a, 26c, 26d and 26g. Around the circular beam spot 26a are formed three light-receiving sections 22aa, 22ab and 22ac partitioned by two division lines both parallel to an optically radial direction of the medium. Around the semicircular beam spots 26c, 26d, 26g and 26h are formed rectangular light-receiving sections 22c, 22d, 22g and 22h, respectively.

The laser diode chip 1 is positioned so that an optical length between the laser diode chip 1 and the first inner plane 23a is equal to (a+b−c)/2 wherein "a" indicates an optical length between the first inner plane 23a and the rear light-receiving section 301, "b" indicates an optical length between the second inner plane 23b and the front light-receiving section 300, and "c" indicates an optical length between the first and second inner planes 23a and 23b.

The optical head in accordance with the eighth embodiment operates as follows.

A light emitted from the laser diode chip 1 and polarized in a y-axis direction enters the prism 23 through the first outer surface 76 so that an optical axis thereof is perpendicular to the first outer surface 76. Then, the light transmits through the first and second inner plane 23a and 23b in this order, and leaves the prism 23 at the third outer surface 78 with an optical axis thereof being perpendicular to the third outer surface 78. After passing through the two-divisional grating 24, the light is converted into a circularly polarized light in the quarter wavelength plate 25, and then, is focused onto the medium through the lens (not illustrated).

The light having been reflected by the medium advances on the same optical path in an opposite direction, and is converted by the quarter wavelength plate 25 into a light polarized in an x-axis direction. Then, the light is separated into a diffracted light and a transmitted light in the two-divisional grating 24. Then, the transmitted light enters the prism 23 at the third outer surface 78 with an optical axis thereof being perpendicular to the third outer surface 78.

The transmitted light having entered the prism 23 is reflected at the second inner plane 23b by half, and the remaining half of the light passes through the second inner plane 23b. FIG. 15A illustrates only the transmitted light passing through the two-divisional grating 24, and does not illustrate the diffracted light.

The light having been reflected at the second inner plane 23b leaves the prism 23 at the second outer surface 77, passes through the base 23c, enters the photodiode chip 22, and is received in the front light-receiving section 300 formed on the light-receiving plane 221 of the photodiode chip 22.

The light having passed through the second inner plane 23b is reflected at the first inner plane 23a, leaves the prism 23 at the second outer surface 77, passes through the base 23c, enters the photodiode chip 22, and is received in the rear light-receiving section 301 formed on the light-receiving plane 221 of the photodiode chip 22.

An additional light-receiving section may be formed on the sub-mount 4, similarly to the above-mentioned first embodiment. The formation of such an additional light-receiving section prevents variation in an amount of a light emitted from the laser diode chip 1 which variation is caused by degradation occurring with the lapse of time, or by temperature variation.

The photodiode chip 22 may be designed to have an alignment mark or marks for accurately mounting the sub-mount 4 on the photodiode chip 22.

The quarter wavelength plate 25 may be positioned at any place intermediate between the two-divisional grating 24 and the medium.

A focus error signal FE8 is obtained by a spot-size process in accordance with the following equation, based on signals S22aa to S22j detected at the light-receiving sections 22aa to 22j constituting the front and rear light-receiving sections 300 and 301 formed on the light-receiving plane 221 of the photodiode chip 22.

$$FE8 = S22aa - S22ab + S22ac - S22ba + S22bb - S22bc$$

A track error signal TE13 is obtained by a push-pull process in accordance with the following equation.

$$TE13 = (S22c + S22e + S22h + S22j) - (S22d + S22f + S22g + S22i)$$

A signal indicative of data to be reproduced can be obtained as a sum of the signals S22c, S22e, S22h, S22j, S22d, S22f, S22g and S22i.

In accordance with the eighth embodiment, even if the beam spots 26a to 26j are deviated in an x-axis direction due to assembling errors in the laser diode chip 1 and the photodiode chip 22, since the photodiode chip 22 is not formed with a division line parallel to a z-axis, there would not be generated track offset, and the focus error signal would not be influenced.

If the two-divisional grating 24 is deviated in an x-axis direction, there would be generated track offset. However, a light having been reflected at the medium could have great tolerance in an i-axis direction, because the light has a great diameter in the two-divisional grating 24. In addition, since the two-divisional grating 24 does not have a division line parallel to an x-axis, and is uniform in a y-axis direction, a tolerance in a y-axis direction is infinite, unless the light is not out of the two-divisional grating 24. If an oscillation wavelength of a light emitted from the laser diode chip 1 varies due to temperature fluctuation and so on, a diffraction angle of the diffracted light emitted from the two-divisional grating 24 would also vary. However, in the eighth embodiment, none of the beam spots 26c to 26j is cross over a plurality of the light-receiving sections, and hence, is influenced by the variation in a diffraction angle of the diffracted light.

The two-divisional grating 24 may be replaced with a hologram device having a lens function. Such a hologram device would provide convergence and divergence functions to the diffracted light.

Each of the first and second inner planes 23a and 23b makes an angle of 45 degrees relative to the first outer surface 76 of the prism 23, and the photodiode chip 22 makes an angle of 90 degrees relative to the first outer surface 76. Hence, even if the sub-mount 4 would have a thickness different from a designed thickness, and accordingly, a light-emitting point of the laser diode chip 1 is deviated relative to the photodiode chip 22 in a y-axis direction, a relative positional relation in a direction of an optical axis between the laser diode chip 1 and the photodiode chip 22 remains unchanged, ensuring that there is not generated focus offset caused by the deviation in the light-emitting point of the laser diode chip 1.

When a focus error signal is to be detected by a spot-size process, a size of a beam spot formed on the photodiode chip 22 varies to a greater degree relative to a deviation of the medium in an optical axis direction, as an optical length between front and rear light-converging points of the photodiode chip 22 positioned so that the medium is located on a light-converging point of the lens, and the photodiode chip 22 is set shorter. Herein, considering the facts that a ratio of variation in a size of a beam spot has a relation with sensitivity of a focus error signal, and that an optical length between the light-converging point and the photodiode chip 22 is equal to a half of a distance between the first and second inner planes 23a and 23b, it is understood that a shorter distance between the first and second inner plane 23a and 23b ensures a focus error signal. to have greater sensitivity.

In the prism 7 in the above-mentioned first to third embodiments, even if a distance between the first and second inner planes 7a and 7b is intended to narrow in order to prevent a light having been reflected at the first inner plane 7a from being reflected again at the second inner plane 7b, there is a limitation in doing so. However, since the optical head in accordance with the eighth embodiment is provided with the base 23c sandwiched between the prism 23 and the photodiode chip 22, a distance between the first and second inner planes 23a and 23b can be narrowed to an intended degree.

In accordance with the eighth embodiment, since the laser diode chip 1 emits a light in parallel with the photodiode chip 22, an optical head can be designed to have a reduced thickness equal to a sum of thicknesses of the prism 23 and the photodiode chip 22.

In addition, the eighth embodiment ensures no optical loss in the prism 23.

In accordance with the eighth embodiment, since the focus error signal FE8 is detected in the form of variation in a size of the first and second beam spots 26a and 26b in a z-axis direction, and the track error signal component is detected in the form of variation in an amount of a light of the first and second beam spots 26a and 26b in an x-axis direction, the track error signal component is unlikely to be mixed into the focus error signal FE8.

As the lens to be used in the eighth embodiment, there may be used a single finite lens or a combination of a collimate lens and an objective lens. The combination may include a beam splitter located between the collimate lens and the objective lens for separating a light directing to the medium from the laser diode chip 1, or a light directing to the photodiode chip 22 from the medium. This ensures these lights to be parallel lights in the case that the medium is located on a light-converging point of the objective lens. Hence, these lights could be readily dealt with.

The medium mentioned in the eighth embodiment includes an optical disc, an optical tape, and the like, and may be composed of phase-change material or photo-electro-magnetic material, for instance.

The two-divisional grating 24 may be comprised of a device composed of lithium niobate crystal on which a grid-like slit is formed in dependence on whether proton is exchanged or not. Namely, the two-divisional grating 24 utilizes the fact that an index ellipsoid is deformed, if proton exchange is applied to lithium niobate crystal. A phase difference between dielectric films deposited on a region to which proton exchange is applied, and a portion to which proton exchange is not applied is multiplied by $N\pi$ for a light polarized in a y-axis direction, and is set equal to an appropriate value for a light polarized in an x-axis direction, wherein N is an even integer and $\pi$ is indicated in a unit of radian. As a result, the two-divisional grating 24 can be designed to allow a light polarized in a y-axis direction to pass therethrough, and a light polarized in an x-axis direction to diffract and pass therethrough.

Ninth Embodiment

Figure 18:
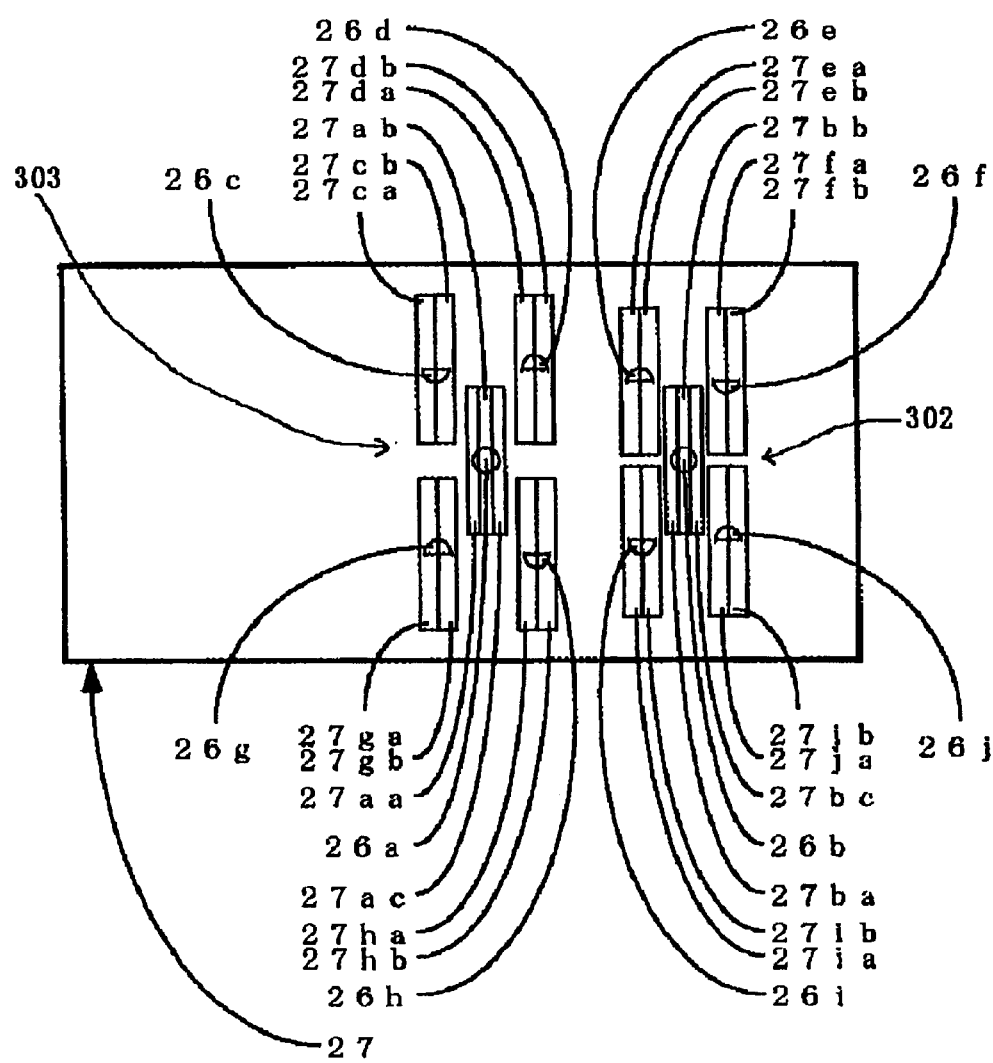
FIG. 18 is a top plan view illustrating a photodiode chip constituting an optical head in accordance with the ninth embodiment of the present invention.

An optical head in accordance with the ninth embodiment has almost the same structure as the structure of the optical head in accordance with the eighth embodiment, but is different only in that the photodiode chip 22 is replaced with a photodiode chip 27. FIG. 18 is a plan view of the photodiode chip 27.

The photodiode chip 27 has almost the same structure as the structure of the photodiode chip 22, but is different only in a shape of the light-receiving sections formed in association with the semicircular beam spots. Specifically, each of the rectangular light-receiving sections formed in association with the semicircular beam spots 26c, 26d, 26e, 26i, 26g, 26h, 26i and 26j is partitioned into two regions by a division line parallel to an optically radial direction of the medium. Thus, the rectangular light-receiving sections formed around the semicircular beam spots 26c, 26d, 26e, 26f, 26g, 26h, 26i and 26j include regions 27ca and 27cb, 27da and 27db, 27ea and 27eb, 27fa and 27fb, 27ga and 27gb, 27ha and 27hb, 27ia and 27ib, and 27ja and 27jb, respectively.

A focus error signal FE9 is obtained by a spot-size process in accordance with the following equation, based on signals S27aa to S27jb detected at the light-receiving sections 27aa to 27jb constituting the front and rear light-receiving sections 302 and 303 formed on a light-receiving plane of the photodiode chip 27.

$$FE9 = S27aa - S27ab + S27ac - S27ba + S27bb - S27bc$$

Track error signals TE14 and TE15 are obtained by a push-pull process and a phase difference process, respectively, in accordance with the following equations.

$$TE14 = (S27ca + S27eb + S27ha + S27jb) + (S27cb + S27ea + S27hb + S27ja) - (S27da + S27fb + S27ga + S27ib) - (S27db + S27fa + S27gb + S27ia)$$

$$TE15 = \text{Phase difference between } (S27ca + S27eb + S27ha + S27jb) + (S27db + S27fa + S27gb + S27ia) \text{ and } (S27cb + S27ea + S27hb + S27ja) + (S27da + S27fb + S27ga + S27ib)$$

A signal indicative of data to be reproduced can be obtained as a sum:

$$(S27ca + S27eb + S27ha + S27jb) + (S27cb + S27ea + S27hb + S27ja) + (S27da + S27fb + S27ga + S27ib) + (S27db + S27fa + S27gb + S27ia)$$

In accordance with the ninth embodiment, even if the beam spots 26a to 26j are deviated in an x-axis direction due to assembling errors in the laser diode chip 1 and the photodiode chip 27, since the photodiode chip 27 is not formed with a division line parallel to a z-axis, there would not be generated track offset, and the focus error signal would not be influenced.

In accordance with the ninth embodiment, since the laser diode chip 1 emits a light in parallel with the photodiode chip 27, an optical head can be designed to have a reduced thickness equal to a sum of thicknesses of the prism 23 and the photodiode chip 27.

In addition, the ninth embodiment ensures no optical loss in the prism 23.

In accordance with the ninth embodiment, since the focus error signal FE9 is detected in the form of variation in a size of the first and second beam spots 26a and 26b in a z-axis direction, and the track error signal component is detected in the form of variation in an amount of a light of the first and second beam spots 26a and 26b in an x-axis direction, the track error signal component is unlikely to be mixed into the focus error signal FE9.

Tenth Embodiment

Figure 19:
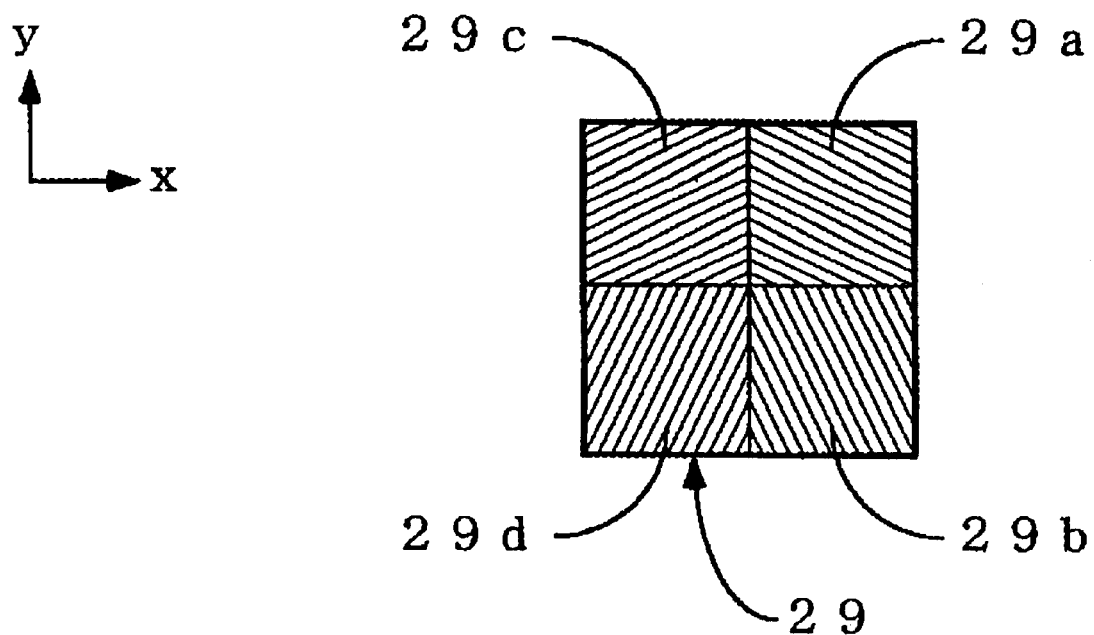
FIG. 19 is a right side view of a four-divisional grating constituting an optical head in accordance with the tenth embodiment of the present invention.

An optical head in accordance with the tenth embodiment has almost the same structure as the structure of the optical head in accordance with the eighth embodiment, but is different only in that the two-divisional grating 24 is replaced with a four-divisional grating 29, and that the photodiode chip 22 is replaced with a photodiode chip 28. FIG. 19 is a right side view of the four-divisional grating 29, and FIG. 20 is a plan view of the photodiode chip 28.

As illustrated in FIG. 19, the four-divisional grating 29 is divided into first to fourth regions 29a, 29b, 29c and 29d by two division lines extending in y- and x-axes directions.

The photodiode chip 28 has a light-receiving plane 281 in parallel with the second outer surface 77. As illustrated in FIG. 20, a front light-receiving section 304 and a rear light-receiving section 305 are formed on the light-receiving plane 281.

Figure 20:
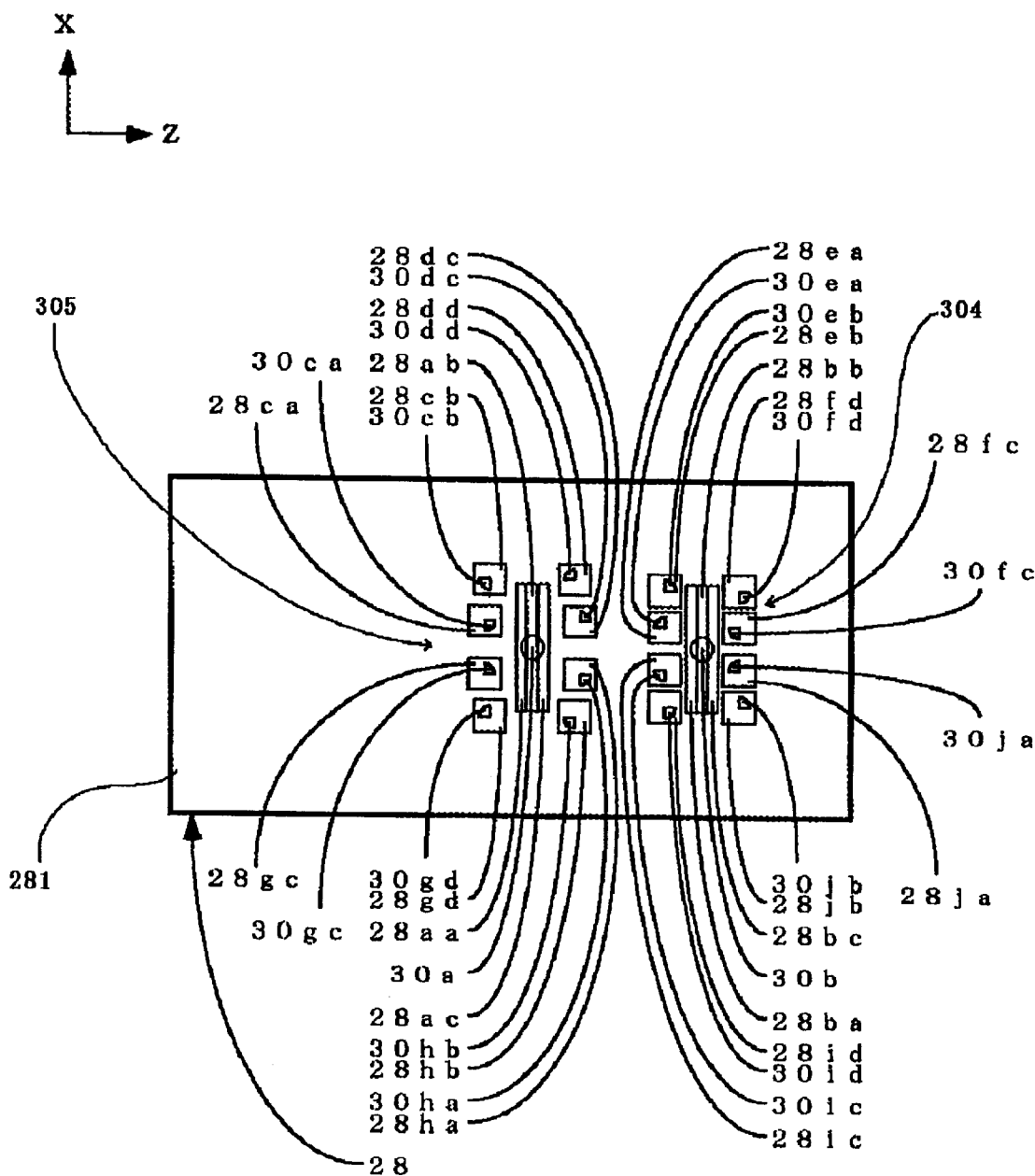
FIG. 20 is a top plan view illustrating a photodiode chip constituting an optical head in accordance with the tenth embodiment of the present invention.

With reference to FIG. 20, a light having been reflected at the first inner plane 23a forms nine beam spots 30a, 30ca, 30cb, 30dc, 30dd, 30gc, 30gd, 30ha and 30hb on the photodiode chip 28, and a light having been reflected at the second inner plane 23b forms nine beam spots 30b, 30ea, 30eb, 30fc, 30fd, 30ic, 30id, 30ja and 30jb on the photodiode chip 28.

The beam spots 30ca, 30ea, 30ha and 30ja are comprised of diffracted lights passing through the first region 29a of the four-divisional grating 29. The beam spots 30cb, 30eb, 30hb and 30jb are comprised of diffracted lights passing through the second region 29b of the four-divisional grating 29. The beam spots 30dc, 30fc, 30gc and 30ic are comprised of diffracted lights passing through the third region 29c of the four-divisional grating 29. The beam spots 30dd, 30fd, 30gd and 30id are comprised of diffracted lights passing through the fourth region 29d of the four-divisional grating 29. The beam spots 30a and 30b are comprised of transmitted lights emitted from the four-divisional grating 29.

The eight beam spots 30ea, 30eb, 30fc, 30fd, 30ic, 30id, 30ja and 30jb in the front light-receiving section 304, except the beam spot 30b, are quadrants in shape, and are arranged around the beam spot 30b which is circular in shape. Similarly, the eight beam spots 30ca, 30cb, 30dc, 30dd, 30gc, 30gd, 30ha and 30hb in the rear light-receiving section 305, except the beam spot 30a, are quadrants in shape, and are arranged around the beam spot 30a which is circular in shape.

Each of the beam spots is formed by diving each of the semicircular beam spots in the eighth embodiment into quadrants. The quadrant beam spots are spaced away from one another in a direction parallel to an optically radial direction of the medium.

The front light-receiving section 304 is formed in association with the beam spots 30b, 30ea, 30eb, 30fc, 30fd, 30ic, 30id, 30ja and 30jb, and the rear light-receiving section 305 is formed in association with the beam spots 30a, 30ca, 30cb, 30dc, 30dd, 30gc, 30gd, 30ha and 30hb.

The front light-receiving section 304 is comprised of rectangular light-receiving sections formed around the beam spots 30b, 30ea, 30eb, 30fc, 30fd, 30ic, 30id, 30ja and 30jb. Around the circular beam spot 30b are formed three light-receiving sections 28ba, 28bb and 28bc partitioned by two division lines both parallel to an optically radial direction of the medium. Rectangular light-receiving sections 28ea, 28eb, 28fc, 28fd, 28ic, 28id, 28ja and 28jb are formed around the quadrant beam spots 30ea, 30eb, 30fc, 30fd, 30ic, 30id, 30ja and 30jb, respectively.

Similarly, the rear light-receiving section 305 is comprised of rectangular light-receiving sections formed around the beam spots 30a, 30ca, 30cb, 30dc, 30dd, 30gc, 30gd, 30ha and 30hb. Around the circular beam spot 30a are formed three light-receiving sections 28aa, 28ab and 28ac partitioned by two division lines both parallel to an optically radial direction of the medium. Rectangular light-receiving sections 28ca, 28cb, 28dc, 28dd, 28gc, 28gd, 28ha and 28hb are formed around the quadrant beam spots 30ca, 30cb, 30dc, 30dd, 30gc, 30gd, 30ha and 30hb, respectively.

A focus error signal FE10 is obtained by a spot-size process in accordance with the following equation, based on signals S28aa to S28jb detected at the light-receiving sections 28aa to 28jb constituting the front and rear light-receiving sections 304 and 305 formed on a light-receiving plane of the photodiode chip 28.

$$FE10 = S28aa - S28ab + S28ac - S28ba + S28bb - S28bc$$

Track error signals TE16 and TE17 are obtained by a push-pull process and a phase difference process, respectively, in accordance with the following equations.

$$TE16 = (S28ca + S28ea + S28ha + S28ja) + (S28cb + S28eb + S28hb + S28jb) - (S28dc + S28fc + S28gc + S28ic) - (S28dd + S28fd + S28gd + S28id)$$

TE17 = Phase difference between $(S28ca + S28ea + S28ha + S28ja) + (S28dd + S28fd + S28gd + S28id)$ and $(S28cb + S28eb + S28hb + S28jb) + (S28dc + S28fc + S28gc + S28ic)$ A signal indicative of data to be reproduced can be obtained as a sum:

$$(S28ca + S28ea + S28ha + S28ja) + (S28cb + S28eb + S28hb + S28jb) + (S28dc + S28fc + S28gc + S28ic) + (S28dd + S28fd + S28gd + S28id)$$

In accordance with the tenth embodiment, even if the beam spots 30a to 30jb are deviated in an x-axis direction due to assembling errors in the laser diode chip 1 and the photodiode chip 28, since the photodiode chip 28 is not formed with a division line parallel to a z-axis, there would not be generated track offset, and the focus error signal would not be influenced.

If deviated in an x-axis direction, the four-divisional grating 29 would generate track offset in a push-pull process. However, since a light having been reflected at the medium has a great diameter in the four-divisional grating 29, the light could have great tolerance in an x-axis direction. If deviated in a y-axis direction, the four-divisional grating 29 would generate defects in a track error signal obtained by a phase difference process. However, since a light having been reflected at the medium has a great diameter in the four-divisional grating 29, the light could also have great tolerance in a y-axis direction.

If an oscillation wavelength of a light emitted from the laser diode chip 1 varies due to temperature fluctuation and so on, a diffraction angle of the diffracted light emitted from the four-divisional grating 29 would also vary. However, in the tenth embodiment, none of the beam spots 30ca to 30jb is cross over a plurality of the light-receiving sections, and hence, is influenced by the variation in a diffraction angle of the diffracted light.

In accordance with the tenth embodiment, since the laser diode chip 1 emits a light in parallel with the photodiode chip 28, an optical head can be designed to have a reduced thickness equal to a sum of thicknesses of the prism 23 and the photodiode chip 28.

In addition, the ninth embodiment ensures no optical loss in the prism 23.

In accordance with the tenth embodiment, since the focus error signal FE10 is detected in the form of variation in a size of the first and second beam spots 30a and 30b in a z-axis direction, and the track error signal component is detected in the form of variation in an amount of a light of the first and second beam spots 30a and 30b in an x-axis direction, the track error signal component is unlikely to be mixed into the focus error signal FE10.

Eleventh Embodiment

Figure 21A:
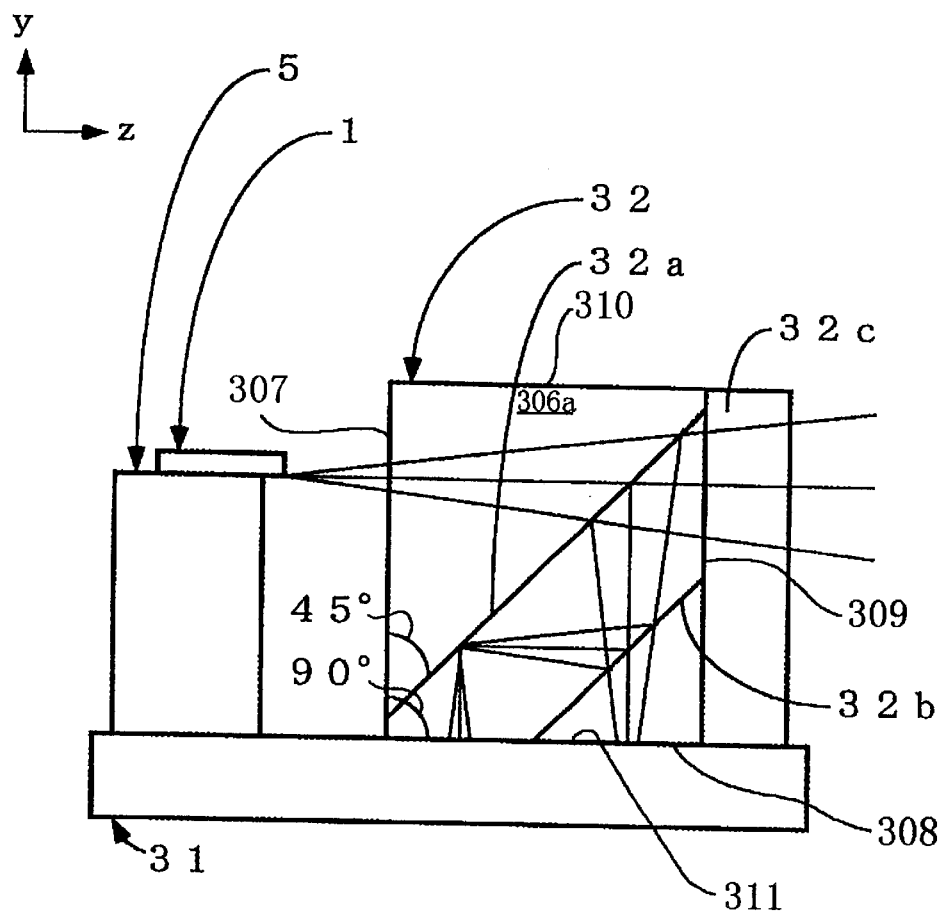
FIG. 21A is a side view illustrating an optical head in accordance with the eleventh embodiment of the present invention.
Figure 21B:
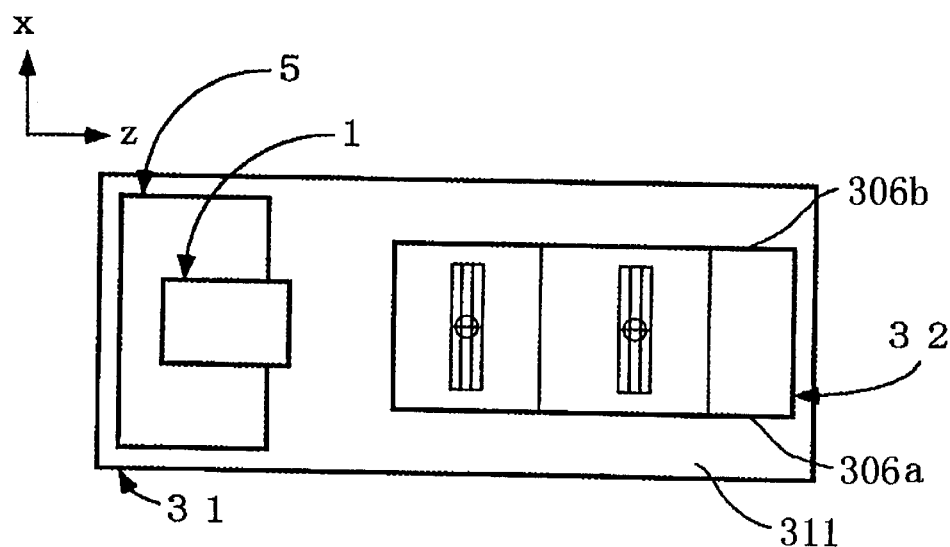
FIG. 21B is a top plan view of the optical head illustrated in FIG. 21A.

FIGS. 21A and 21B illustrate an optical head in accordance with the eleventh embodiment of the present invention.

An optical head in accordance with the eleventh embodiment is comprised of a laser diode chip 1, a sub-mount 5 on which the laser diode chip 1 is mounted and which keeps the laser diode chip 1 at a predetermined height, a lens (not illustrated) for focusing a light emitted from the laser diode chip 1, onto a medium (not illustrated), an optical separator or prism 32 for separating a light reflected from the medium, from an optical axis of a light directing to the lens from the laser diode chip 1, a photodiode chip 31 receiving a light separated from the optical axis by means of the prism 32, and a quarter wavelength plate 32c mounted on the photodiode chip 31 integrally with the prism 32.

The optical separator or prism 32 is a square pole in shape defined by a first sidewall 306a and a second sidewall 306b in parallel with each other, and first, second, third and fourth outer surfaces 307, 308, 309 and 310 all perpendicular to both the first and second sidewalls 306a and 306b. The first and third outer surfaces 307 and 309 are in parallel with each other.

The prism 32 is designed to have first and second inner planes 32a and 32b both perpendicular to the first and second sidewalls 306a and 306b, in parallel with one another, and both inclined relative to the first outer surface 307 at a predetermined angle of 45 degrees.

The quarter wavelength plate 32c converts a light having passed through the third outer surface 73 of the prism 32 to a circularly polarized light from a linearly polarized light, and also converts a light having been reflected from the medium from a circularly polarized light to a linearly polarized light having an orientation perpendicular to an original orientation.

Figure 22:
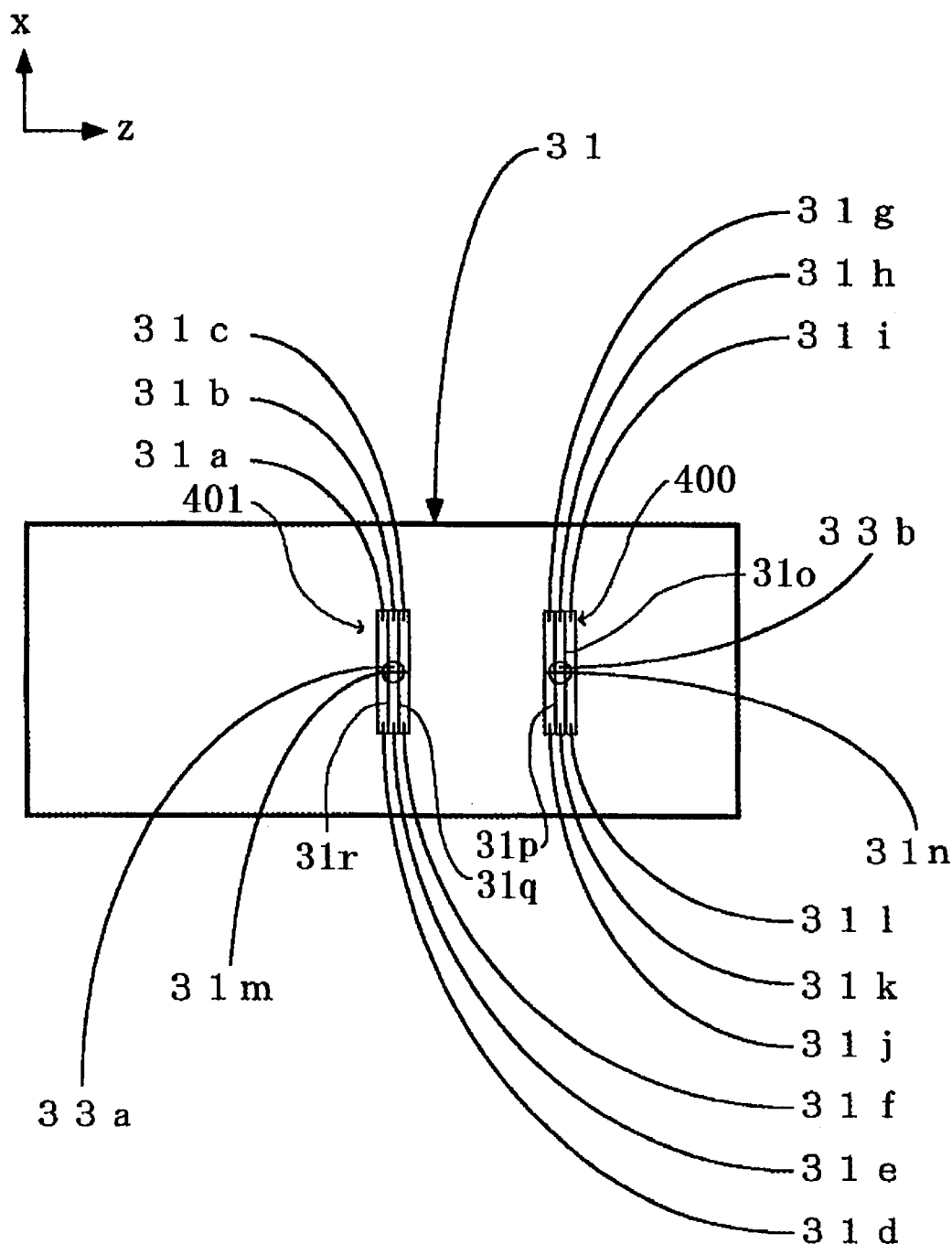
FIG. 22 is a top plan view illustrating a photodiode chip constituting an optical head in accordance with the eleventh embodiment of the present invention.

The photodiode chip 31 has a light-receiving plane 311 in parallel with the second outer surface 308. As illustrated in FIG. 22, a front light-receiving section 400 and a rear light-receiving section 401 are formed on the light-receiving plane 311 of the photodiode chip 31.

With reference to FIG. 22, a light having been reflected at the first inner plane 32a and having passed through the second inner plane 32b forms a first beam spot 33b on the photodiode chip 31. A light having been reflected at both the first inner plane 32a and the second inner plane 32b, and having been reflected again at the first inner plane 32a forms a second beam spot 33a on the photodiode chip 31. The front and rear light-receiving sections 400 and 401 are associated with the first and second beam spots 33b and 33a, respectively.

As illustrated in FIG. 22, the front light-receiving section 400 is comprised of six light-receiving sections 31g, 31h, 31i, 31j, 31k and 31l defined by a first front division line 31n parallel to an optically tangential direction of the medium, and second and third front division lines 31o and 31p both parallel to an optically radial direction of the medium.

Similarly, the rear light-receiving section 401 is comprised of six light-receiving sections 31a, 31b, 31c, 31d, 31e and 31f defined by a first rear division line 31m parallel to an optically tangential direction of the medium, and second and third rear division lines 31q and 31r both parallel to an optically radial direction of the medium.

The laser diode chip 1 is positioned so that an optical length between the laser diode chip 1 and the first inner plane 32a is equal to (a+b+3c)/2 wherein "a" indicates an optical length between the first inner plane 32a and the rear light-receiving section 401, "b" indicates an optical length between the second inner plane 32b and the front light-receiving section 400, and "c" indicates an optical length between the first and second inner planes 32a and 32b.

The optical head in accordance with the eleventh embodiment operates as follows.

A light emitted from the laser diode chip 1 and polarized in a y-axis direction enters the prism 32 through the first outer surface 307 so that an optical axis thereof is perpendicular to the first outer surface 307. Then, the light transmits through the first inner plane 32a, and leaves the prism 32 at the third outer surface 309 with an optical axis thereof being perpendicular to the third outer surface 309. The light having left the prism 32 is converted into a circularly polarized light in the quarter wavelength plate 32c, and then, is focused onto the medium through the lens (not illustrated).

The light having been reflected by the medium advances on the same optical path in an opposite direction, and is converted by the quarter wavelength plate 32c into a light polarized in an x-axis direction. Then, the light enters the prism 32 at the third outer surface 309 with an optical axis thereof being perpendicular to the third outer surface 309.

The light having entered the prism 32 is reflected at the first inner plane 32a. The light having been reflected at the first inner plane 32a is reflected at the second inner plane 32b by half, and the remaining half of the light passes through the second inner plane 32b.

The light having been reflected at the second inner plane 32b is reflected at the first inner plane 32a, leaves the prism 32 at the second outer surface 308, enters the photodiode chip 31, and is received in the rear light-receiving section 401.

The light having passed through the second inner plane 32b leaves the prism 32 at the second outer surface 308, enters the photodiode chip 31, and is received in the front light-receiving section 400.

An additional light-receiving section may be formed on the sub-mount 5, similarly to the above-mentioned first embodiment. The formation of such an additional light-receiving section prevents variation in an amount of a light emitted from the laser diode chip 1 which variation is caused by degradation occurring with the lapse of time, or by temperature variation.

The photodiode chip 31 may be designed to have an alignment mark or marks for accurately mounting the sub-mount 5 on the photodiode chip 31.

It is not always necessary to form the quarter wavelength plate 32c integrally with the prism 32. The quarter wavelength plate 32c may be positioned at any place intermediate between the prism 32 and the medium.

A focus error signal FE11 is obtained by a spot-size process in accordance with the following equation, based on signals S31a to S31l detected at the light-receiving sections 31a to 31l constituting the front and rear light-receiving sections 400 and 401 formed on the light-receiving plane 31l of the photodiode chip 31.

FE11=(S31a+S31c+S31k)−(S31b+S31j+S31l)+(S31d+S31f+S31h)−(S31e+S31g+S31i)

A track error signal TE18 is obtained by a push-pull process in accordance with the following equation.

TE18=(S31a+S31c+S31k)+(S31b+S31j+S31l)−(S31d+S31f+S31h)−(S31e+S31g+S31i)

A signal indicative of data to be reproduced can be obtained as a sum of the signals S31a to S31l.

The laser diode chip 1 and the photodiode chip 31 are fixedly installed in such a position that the beam spot 33a is uniformly divided by the first rear division line 31m partitioning the light-receiving sections 31a, 31b and 31c from the light-receiving sections 31d, 31e and 31f, and that the beam spot 33b is uniformly divided by the first front division line 31n partitioning the light-receiving sections 31g, 31h and 31i from the light-receiving sections 31j, 31k and 31l.

However, the beam spots 33a and 33b deviate in an x-axis direction, if the laser diode chip 1 and the photodiode chip 31 are assembled containing assembling error therein. In accordance with the eleventh embodiment, even if such assembling error exists in the laser diode chip 1 and the photodiode chip 31, −(S31g+S31h+S31i)+(S31j+S31k+S31l) is decreased (or increased) to a degree to which (S31a+S31b+S31c)−(S31d+S31e+S31f) is increased (or decreased). Hence, they are cancelled with each other, ensuring no track offset in a push-pull process.

Each of the first and second inner planes 32a and 32b makes an angle of 45 degrees relative to the first outer surface 307 of the prism 32, and the photodiode chip 31 makes an angle of 90 degrees relative to the first outer surface 307 of the prism 32. Hence, even if the sub-mount 5 would have a thickness different from a designed thickness, and accordingly, a light-emitting point of the laser diode chip 1 is deviated relative to the photodiode chip 31 in a y-axis direction, a relative positional relation in a direction of an optical axis between the laser diode chip 1 and the photodiode chip 31 remains unchanged, ensuring that there is not generated focus offset caused by the deviation in the light-emitting point of the laser diode chip 1.

When a focus error signal is to be detected by a spot-size process, a size of a beam spot formed on the photodiode chip 31 varies to a greater degree relative to a deviation of the medium in an optical axis direction, as an optical length between front and rear light-converging points of the photodiode chip 31 positioned so that the medium is located on a light-converging point of the lens, and the photodiode chip 31 is set shorter. Herein, considering the facts that a ratio of variation in a size of a beam spot has a relation with sensitivity of a focus error signal, and that an optical length between the light-converging point and the photodiode chip 31 is equal to a half of a distance between the first and second inner planes 32a and 32b, it is understood that a shorter distance between the first and second inner plane 32a and 32b ensures a focus error signal. to have greater sensitivity.

In the prism 7 in the above-mentioned first to third embodiments, even if a distance between the first and second inner planes 7a and 7b is intended to narrow in order to prevent a light having been reflected at the first inner plane 7a from being reflected again at the second inner plane 7b, there is a limitation in doing so. However, in the optical head in accordance with the eleventh embodiment, since a light is reflected twice at the first inner plane 32a in an optical path from the medium to the photodiode chip 31, a distance between the first and second inner planes 32a and 32b can be narrowed to an intended degree.

In addition, it was necessary to form the base 17d or 23c under the prism 17 or 23 in the fourth to tenth embodiments. To the contrary, the eleventh embodiment makes it no longer necessary to form a base such as the base 17d or 23c under the prism 32, ensuring enhancement in productivity of an optical head.

Furthermore, since the optical head is no longer necessary to include a base, if an alignment mark is formed on the photodiode chip 31, the prism 32 can be accurately assembled on the photodiode chip 31 by aligning a line at which the second inner plane 32b makes contact with the photodiode chip 31, to the alignment mark.

When a light is radiated to a prism, a light enters the prism at a plane at various incident angles, and is diverged. It is quite difficult to provide the same reflectance and transmittance to all incident angles. However, in accordance with the eleventh embodiment, a light directing from the laser diode chip 1 to the lens is diverged only once at the first inner plane 32a, there would be small dispersion in an intensity profile of the light.

In the eleventh embodiment, the laser diode chip 1 is positioned so that an optical length between the laser diode chip 1 and the first inner plane 32a is equal to (a+b+3c)/2, as mentioned earlier. Hence, an optical length d between the laser diode chip 1 and the first outer surface 71 is equal to c/2, which means that a big gap is formed therebetween. As a result, even if the laser diode chip 1 is assembled slightly out of place, it would be possible to keep the laser diode chip 1 from making abutment with the prism 32.

In accordance with the eleventh embodiment, since the laser diode chip 1 emits a light in parallel with the photodiode chip 31, an optical head can be designed to have a reduced thickness equal to a sum of thicknesses of the prism 32 and the photodiode chip 31.

In addition, the eleventh embodiment ensures no optical loss in the prism 32.

In accordance with the eleventh embodiment, since the focus error signal FE11 is detected in the form of variation in a size of the beam spots 33a and 33b in a z-axis direction, and the track error signal component is detected in the form of variation in an amount of a light of the beam spots 33a and 33b in an x-axis direction, the track error signal component is unlikely to be mixed into the focus error signal FE11.

In the eleventh embodiment, various methods of detecting a focus error signal, a track error signal and a data reproducing signal may be used by replacing the photodiode chip 31 with another photodiode chip, as having been described in the second embodiment in which the photodiode chip 6 in the first embodiment is replaced with the photodiode chip 14, and in the third embodiment in which the photodiode chip 6 in the first embodiment is replaced with the photodiode chip 15.

As the lens to be used in the eleventh embodiment, there may be used a single finite lens or a combination of a collimate lens and an objective lens. The combination may include a beam splitter located between the collimate lens and the objective lens for separating a light directing to the medium from the laser diode chip 1, or a light directing to the photodiode chip 31 from the medium. This ensures these lights to be parallel lights in the case that the medium is located on a light-converging point of the objective lens. Hence, these lights could be readily dealt with.

The medium mentioned in the eighth embodiment includes an optical disc, an optical tape, and the like, and may be composed of phase-change material or photo-electro-magnetic material, for instance.

Twelfth Embodiment

Figure 23A:
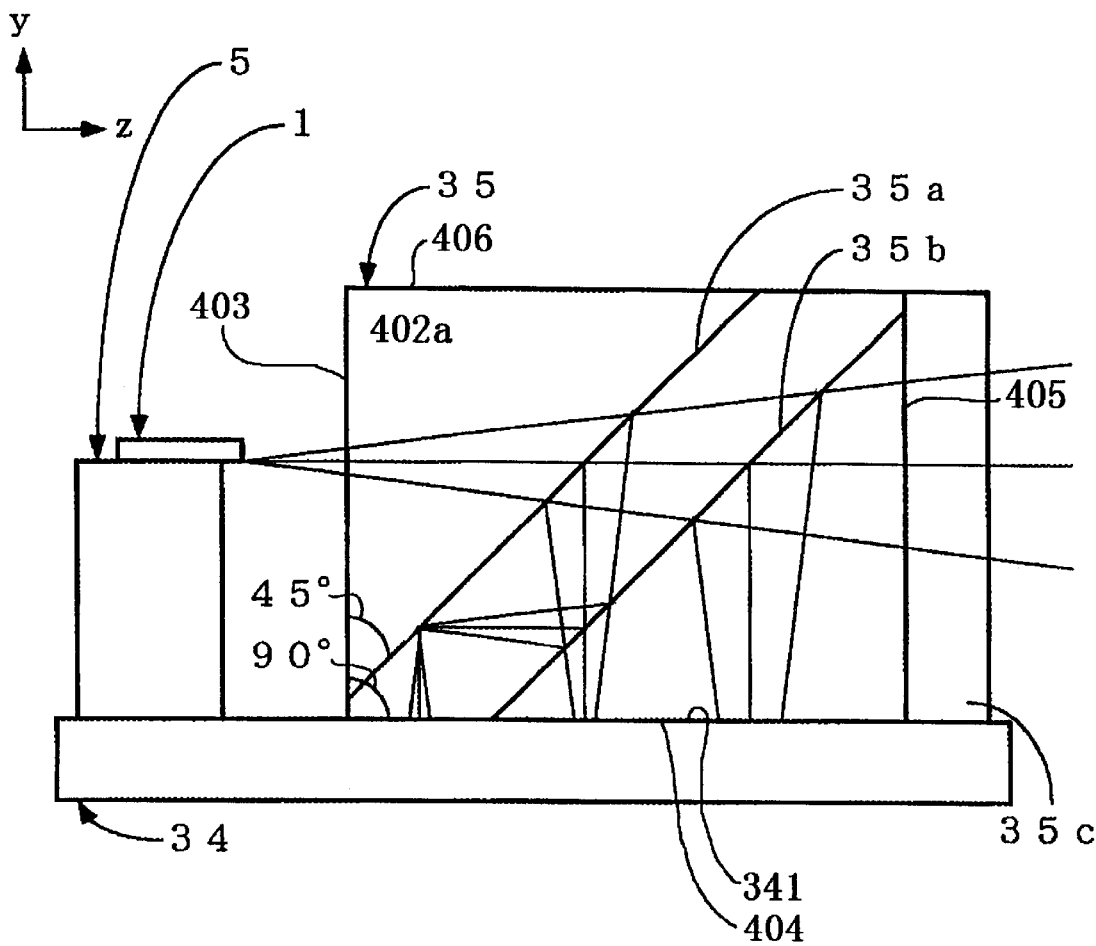
FIG. 23A is a side view illustrating an optical head in accordance with the twelfth embodiment of the present invention.
Figure 23B:
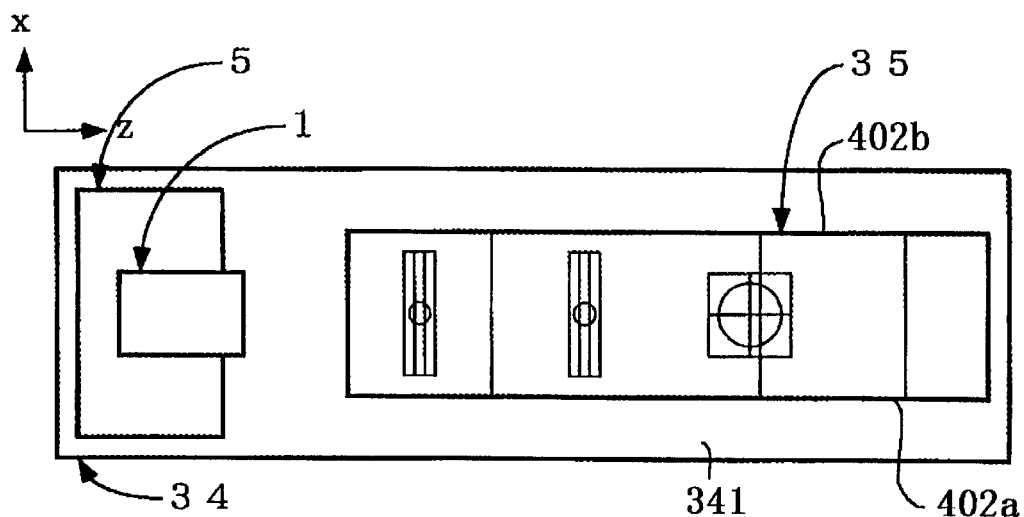
FIG. 23B is a top plan view of the optical head illustrated in FIG. 23A.

FIGS. 23A and 23B illustrate an optical head in accordance with the twelfth embodiment of the present invention.

An optical head in accordance with the thirteenth embodiment is comprised of a laser diode chip 1, a sub-mount 5 on which the laser diode chip 1 is mounted and which keeps the laser diode chip 1 at a predetermined height, a lens (not illustrated) for focusing a light emitted from the laser diode chip 1, onto a medium (not illustrated), an optical separator or prism 35 for separating a light reflected from the medium, from an optical axis of a light directing to the lens from the laser diode chip 1, a photodiode chip 34 receiving a light separated from the optical axis by means of the prism 35, and a quarter wavelength plate 35c formed on the photodiode chip 34 integrally with the prism 35.

The optical separator or prism 35 is a square pole in shape defined by a first sidewall 402a and a second sidewall 402b in parallel with each other, and first, second, third and fourth outer surfaces 403, 404, 405 and 406 all perpendicular to both the first and second sidewalls 402a and 402b. The first and third outer surfaces 403 and 405 are in parallel with each other.

The prism 35 is designed to have first and second inner planes 35a and 35b both perpendicular to the first and second sidewalls 402a and 402b, in parallel with one another, and both inclined relative to the first outer surface 403 at a predetermined angle of 45 degrees.

The quarter wavelength plate 35c converts a light having passed through the third outer surface 405 of the prism 35 to a circularly polarized light from a linearly polarized light, and also converts a light having been reflected from the medium from a circularly polarized light to a linearly polarized light having an orientation perpendicular to an original orientation.

Figure 24:
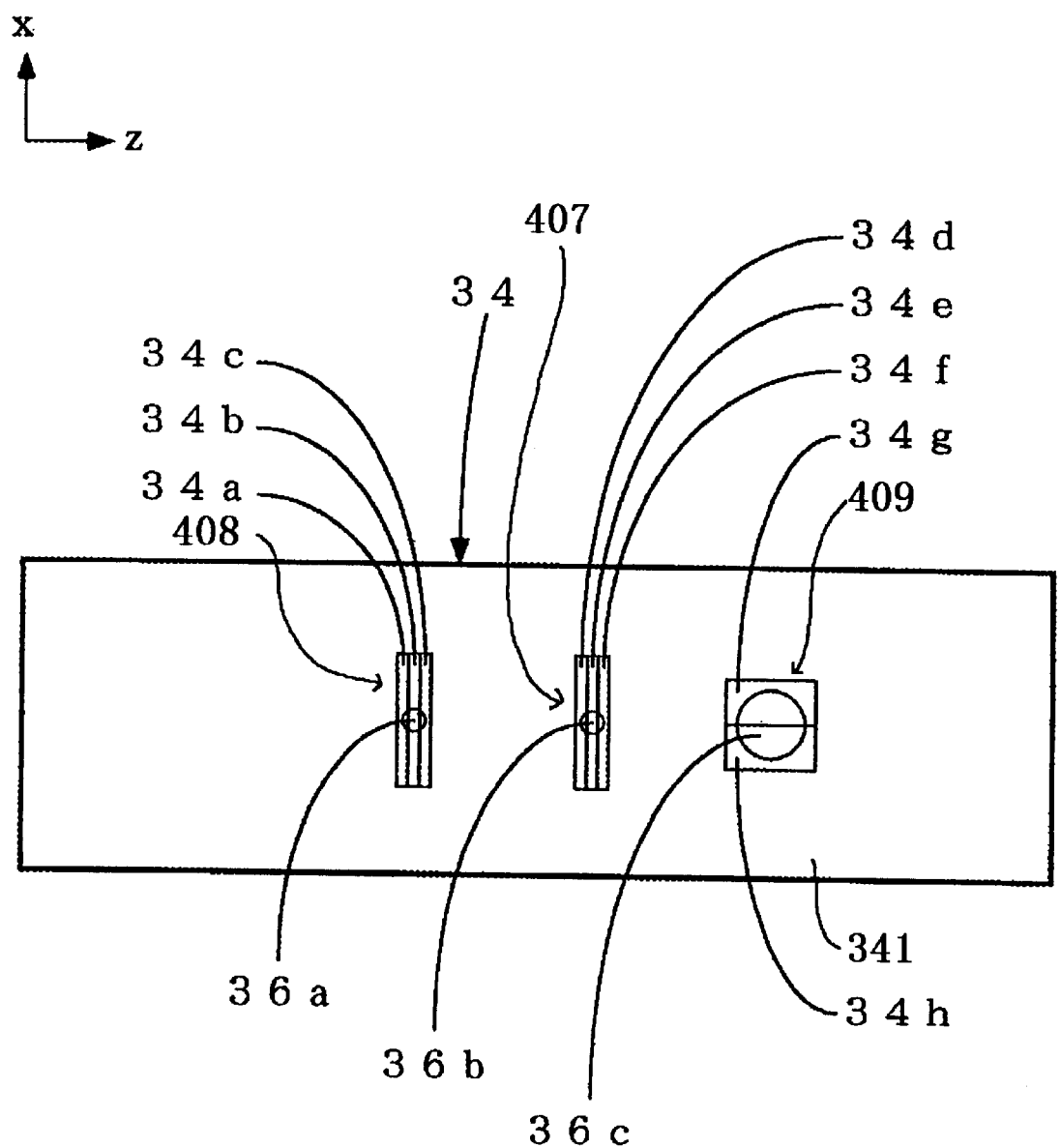
FIG. 24 is a top plan view illustrating a photodiode chip constituting the optical head illustrated in FIGS. 23A and 23B.

The photodiode chip 34 has a light-receiving plane 341 in parallel with the second outer surface 404. As illustrated in FIG. 24, a front light-receiving section 407 and a rear light-receiving section 408 are formed on the light-receiving plane 341 of the photodiode chip 34.

With reference to FIG. 24, a light having passed through the second inner plane 35b, having been reflected at the first inner plane 35a, having been reflected again at the second inner plane 35b, and having been reflected again at the second inner plane 35b forms a first beam spot 36a on the photodiode chip 34. A light having passed through the second inner plane 35b, having been reflected at the first inner plane 35a, and having passed through the second inner plane 35b forms a second beam spot 36b on the photodiode chip 34. A light having been reflected at the second inner plane 35b forms a third beam spot 36c on the photodiode chip 34.

Front, rear and additional light-receiving sections 407, 408 and 409 are formed on the light-receiving plane 341 of the photodiode chip 34 in association with the second, first and third beam spots 36b, 36a and 36c, respectively.

As illustrated in FIG. 24, the front light-receiving section 407 is comprised of three light-receiving sections 34d, 34e and 34f defined by two division lines parallel to an optically radial direction of the medium. Similarly, the rear light-receiving section 408 is comprised of three light-receiving sections 34a, 34b and 34c defined by two division lines parallel to an optically radial direction of the medium. The additional light-receiving section 409 is comprised of two light-receiving sections 34g and 34h defined by a division line parallel to an optically tangential direction of the medium.

The laser diode chip 1 is positioned so that an optical length between the laser diode chip 1 and the first inner plane 35a is equal to (a+b+3c)/2 wherein "a" indicates an optical length between the first inner plane 35a and the rear light-receiving section 408, "b" indicates an optical length between the second inner plane 35b and the front light-receiving section 407, and "c" indicates an optical length between the first and second inner planes 35a and 35b.

The optical head in accordance with the twelfth embodiment operates as follows.

A light emitted from the laser diode chip 1 and polarized in a y-axis direction enters the prism 35 through the first outer surface 403 so that an optical axis thereof is perpendicular to the first outer surface 403. Then, the light transmits through the first and second inner planes 35a and 35b in this order, and leaves the prism 35 at the third outer surface 405 with an optical axis thereof being perpendicular to the third outer surface 405. The light having left the prism 35 is converted into a circularly polarized light in the quarter wavelength plate 35c, and then, is focused onto the medium through the lens (not illustrated).

The light having been reflected by the medium advances on the same optical path in an opposite direction, and is converted by the quarter wavelength plate 35c into a light polarized in an x-axis direction. Then, the light enters the prism 35 at the third outer surface 405 with an optical axis thereof being perpendicular to the third outer surface 405.

The light having entered the prism 35 is reflected at the second inner plane 35b by half, and the remaining half of the light passes through the second inner plane 35b.

The light having been reflected at the second inner plane 35b leaves the prism 35 at the second outer surface 404, enters the photodiode chip 34, and is received in the additional light-receiving section 409.

The light having passed through the second inner plane 35b is reflected at the first inner plane 35a. Then, the light is reflected at the second inner plane 35b by half, and the remaining half of the light passes through the first inner plane 35a. The light having been reflected at the second inner plane 35b is reflected again at the first inner plane 35a, leaves the prism 35 at the second outer surface 404, enters the photodiode chip 34, and is received in the rear light-receiving section 408.

The light having been reflected at the first inner plane 35a and having passed through the second inner plane 35b leaves the prism 35 at the second outer surface 404, enters the photodiode chip 34, and is received in the front light-receiving section 407.

An additional light-receiving section may be formed on the sub-mount 5, similarly to the above-mentioned first embodiment. The formation of such an additional light-receiving section prevents variation in an amount of a light emitted from the laser diode chip 1 which variation is caused by degradation occurring with the lapse of time, or by temperature variation.

The photodiode chip 34 may be designed to have an alignment mark or marks for accurately mounting the sub-mount 5 on the photodiode chip 34.

It is not always necessary to form the quarter wavelength plate 35c integrally with the prism 35. The quarter wavelength plate 35c may be positioned at any place intermediate between the prism 35 and the medium.

A focus error signal FE12 is obtained by a spot-size process in accordance with the following equation, based on signals S34a to S34h detected at the light-receiving sections 34a to 34h constituting the front, rear and additional light-receiving sections 407, 408 and 409 formed on the light-receiving plane 34l of the photodiode chip 34.

FE12=S34a−S34b+S34c−S34d+S34e−S34f

A track error signal TE19 is obtained by a push-pull process in accordance with the following equation.

TE19=S34g−S34h

A signal indicative of data to be reproduced can be obtained as a sum of the signals S34g and S34h.

In the above-mentioned first to third embodiments, when the first and second beam spots 8a and 8b are deviated in an x-axis direction due to assembling error in the laser diode chip 1 and the photodiode chip 6 or 16, they are uniformly deviated. That is, if a light emitted from the laser diode chip 1 does not have an optical axis in parallel with a z-axis, there would be generated track offset in a push-pull process. In addition, even if a light emitted from the laser diode chip 1 has an optical axis in parallel with a z-axis, a track error signal obtained by a push-pull process would have a reduced signal amplitude.

In accordance with the twelfth embodiment, the beam spot 36c is greater in size than the beams spots 8a and 8b, which ensures the laser diode chip 1 to have greater tolerance in an x-axis direction. In addition, since a division line parallel to a z-axis is formed only in the beam spot 36c, the laser diode chip 1 is given greater tolerance for rotation in an x-z plane.

Each of the first and second inner planes 35a and 35b makes an angle of 45 degrees relative to the first outer surface 403 of the prism 35, and the photodiode chip 34 makes an angle of 90 degrees relative to the first outer surface 403 of the prism 35. Hence, even if the sub-mount 5 would have a thickness different from a designed thickness, and accordingly, a light-emitting point of the laser diode chip 1 is deviated relative to the photodiode chip 34 in a y-axis direction, a relative positional relation in a direction of an optical axis between the laser diode chip 1 and the photodiode chip 34 remains unchanged, ensuring that there is not generated focus offset caused by the deviation in the light-emitting point of the laser diode chip 1.

When a focus error signal is to be detected by a spot-size process, a size of a beam spot formed on the photodiode chip 34 varies to a greater degree relative to a deviation of the medium in an optical axis direction, as an optical length between front and rear light-converging points of the photodiode chip 34 positioned so that the medium is located on a light-converging point of the lens, and the photodiode chip 34 is set shorter.

Herein, considering the facts that a ratio of variation in a size of a beam spot has a relation with sensitivity of a focus error signal, and that an optical length between the light-converging point and the photodiode chip 34 is equal to a half of a distance between the first and second inner planes 35a and 35b, it is understood that a shorter distance between the first and second inner plane 35a and 35b ensures a focus error signal. to have greater sensitivity.

In the prism 7 in the above-mentioned first to third embodiments, even if a distance between the first and second inner planes 7a and 7b is intended to narrow in order to prevent a light having been reflected at the first inner plane 7a from being reflected again at the second inner plane 7b, there is a limitation in doing so. However, in the optical head in accordance with the twelfth embodiment, since a light is reflected twice at the first inner plane 35a in an optical path from the medium to the photodiode chip 34, a distance between the first and second inner planes 35a and 35b can be narrowed to an intended degree.

In addition, it was necessary to form the base 17d or 23c under the prism 17 or 23 in the fourth to tenth embodiments. To the contrary, the twelfth embodiment makes it no longer necessary to form a base such as the base 17d or 23c under the prism 35, ensuring enhancement in productivity of an optical head.

Furthermore, since the optical head is no longer necessary to include a base, if an alignment mark is formed on the photodiode chip 34, the prism 35 can be accurately assembled on the photodiode chip 34 by aligning a line at which the second inner plane 35b makes contact with the photodiode chip 34, to the alignment mark.

In the twelfth embodiment, the laser diode chip 1 is positioned so that an optical length between the laser diode chip 1 and the first inner plane 35a is equal to (a+b+3c)/2, as mentioned earlier. Hence, an optical length "d" between the laser diode chip 1 and the first outer surface 403 is equal to c/2, which means that a big gap is formed therebetween. As a result, even if the laser diode chip 1 is assembled slightly out of place, it would be possible to keep the laser diode chip 1 from making abutment with the prism 35.

In accordance with the twelfth embodiment, since the laser diode chip 1 emits a light in parallel with the photodiode chip 34, an optical head can be designed to have a reduced thickness equal to a sum of thicknesses of the prism 35 and the photodiode chip 34.

In addition, the twelfth embodiment ensures no optical loss in the prism 35.

In accordance with the twelfth embodiment, since the focus error signal FE12 is detected in the form of variation in a size of the first and second beam spots 36a and 36b in a z-axis direction, and the track error signal component is detected in the form of variation in an amount of a light of the first and second beam spots 36a and 36b in an x-axis direction, the track error signal component is unlikely to be mixed into the focus error signal FE12.

In the twelfth embodiment, various methods of detecting a focus error signal, a track error signal and a data reproducing signal may be used by replacing the photodiode chip 34 with another photodiode chip, as having been described in the fifth embodiment in which the photodiode chip 16 in the fourth embodiment is replaced with the photodiode chip 19, in the sixth embodiment in which the photodiode chip 16 in the fourth embodiment is replaced with the photodiode chip 20, and in the seventh embodiment in which the photodiode chip 16 in the fourth embodiment is replaced with the photodiode chip 21.

As the lens to be used in the twelfth embodiment, there may be used a single finite lens or a combination of a collimate lens and an objective lens. The combination may include a beam splitter located between the collimate lens and the objective lens for separating a light directing to the medium from the laser diode chip 1, or a light directing to the photodiode chip 34 from the medium. This ensures these lights to be parallel lights in the case that the medium is located on a light-converging point of the objective lens. Hence, these lights could be readily dealt with.

The medium mentioned in the twelfth embodiment includes an optical disc, an optical tape, and the like, and may be composed of phase-change material or photo-electro-magnetic material, for instance.

Thirteenth Embodiment

Figure 25A:
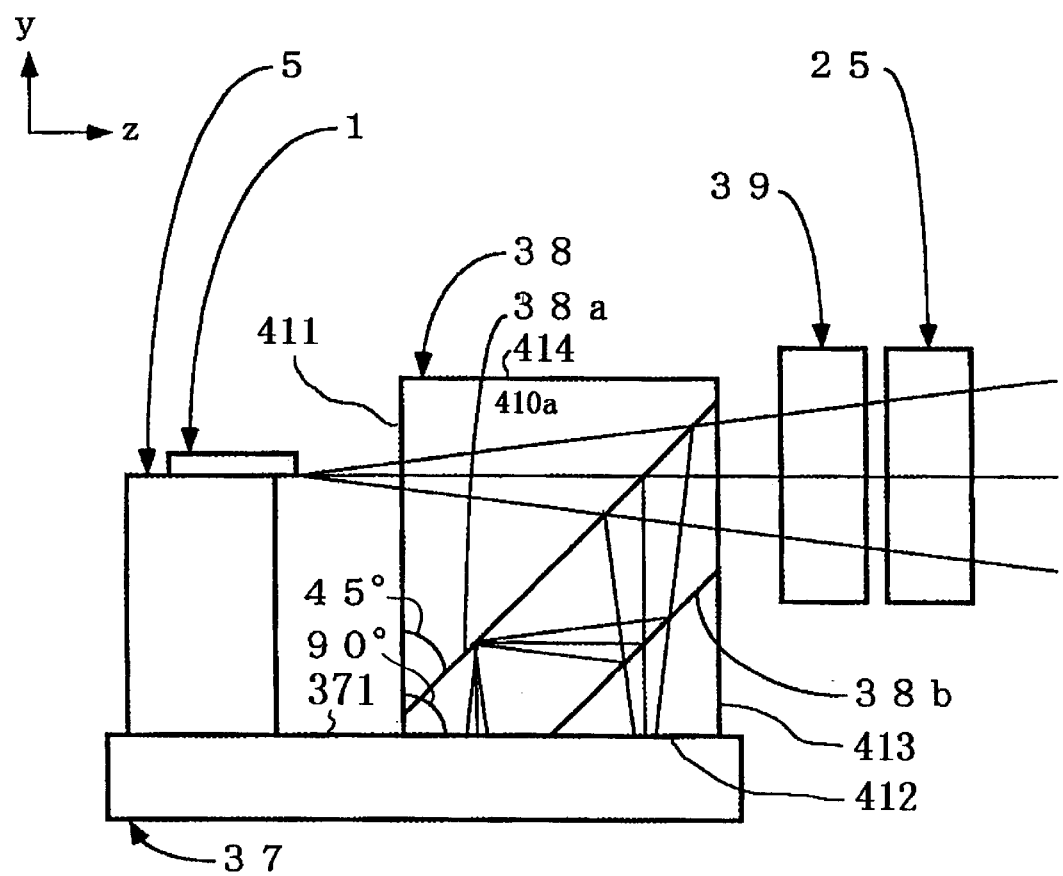
FIG. 25A is a side view illustrating an optical head in accordance with the thirteenth embodiment of the present invention.
Figure 25B:
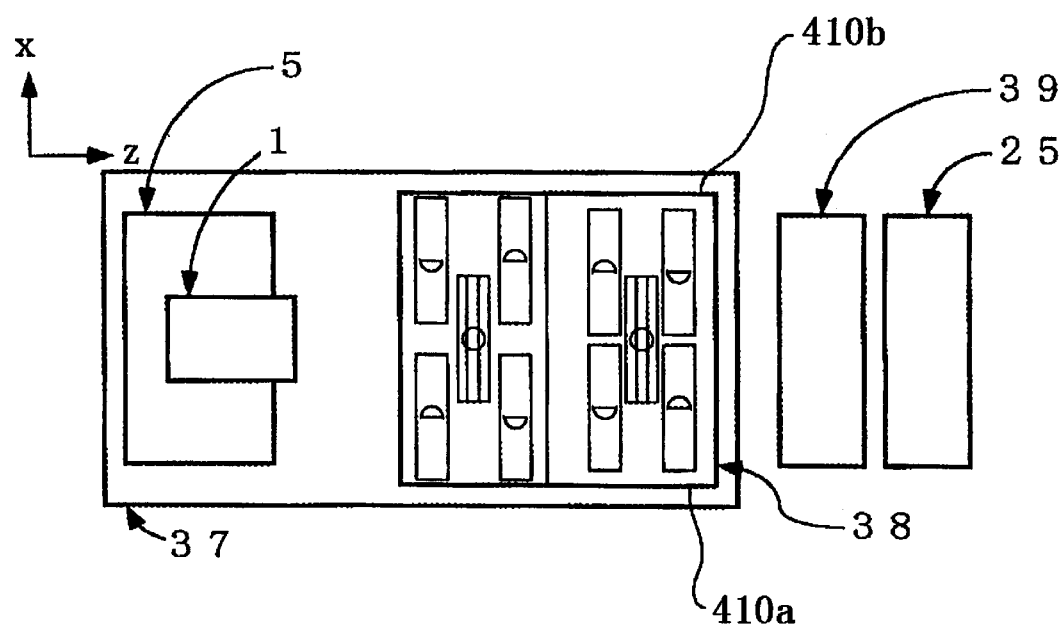
FIG. 25B is a top plan view of the optical head illustrated in FIG. 25A.

FIGS. 25A and 25B illustrate an optical head in accordance with the thirteenth embodiment of the present invention.

An optical head in accordance with the thirteenth embodiment is comprised of a laser diode chip 1, a sub-mount 5 on which the laser diode chip 1 is mounted and which keeps the laser diode chip 1 at a predetermined height, a lens (not illustrated) for focusing a light emitted from the laser diode chip 1, onto a medium (not illustrated), an optical separator or prism 38 for separating a light reflected from the medium, from an optical axis of a light directing to the lens from the laser diode chip 1, a photodiode chip 37 receiving a light separated from the optical axis by means of the prism 38, a diffraction device or two-divisional grating 39 positioned in facing relation with the third outer surface 73 of the prism 38, and a quarter wavelength plate 25 positioned adjacent to the two-divisional grating 39.

The optical separator or prism 38 is a square pole in shape defined by a first sidewall 410a and a second sidewall 410b in parallel with each other, and first, second, third and fourth outer surfaces 411, 412, 413 and 414 all perpendicular to both the first and second sidewalls 410a and 410b. The first and third outer surfaces 411 and 413 are in parallel with each other.

The prism 38 is designed to have first and second inner planes 38a and 38b both perpendicular to the first and second sidewalls 410a and 410b, in parallel with one another, and both inclined relative to the first outer surface 411 at a predetermined angle of 45 degrees.

The two-divisional grating 39 is designed to have first and second regions 39a and 39b partitioned by a division line extending in a y-axis direction.

The quarter wavelength plate 25 converts a light having passed through the third outer surface 413 of the prism 38 to a circularly polarized light from a linearly polarized light, and also converts a light having been reflected from the medium from a circularly polarized light to a linearly polarized light having an orientation perpendicular to an original orientation.

Figure 27:
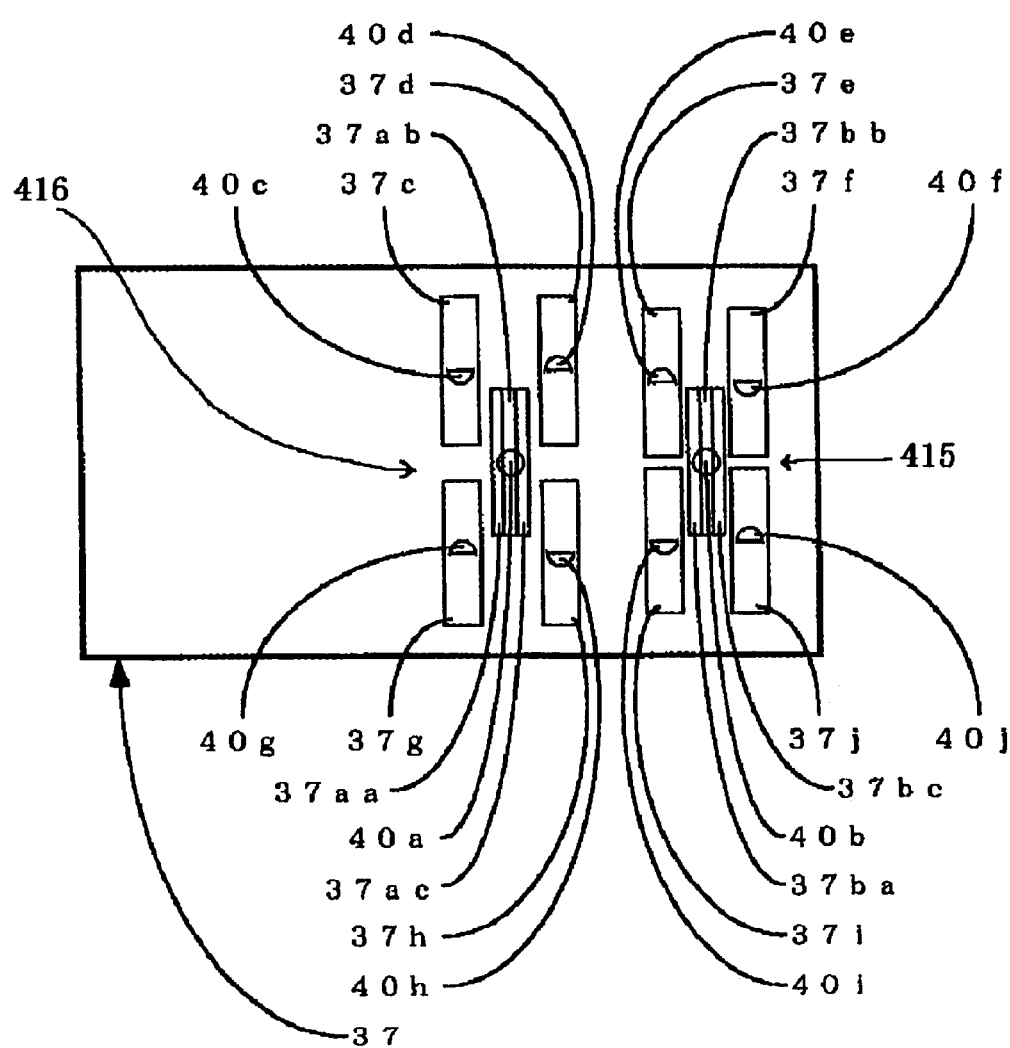
FIG. 27 is a top plan view illustrating a photodiode chip constituting the optical head illustrated in FIGS. 25A and 25B.

The photodiode chip 37 has a light-receiving plane 371 in parallel with the second outer surface 412. As illustrated in FIG. 27, a front light-receiving section 415 and a rear light-receiving section 416 are formed on the light-receiving plane 371 of the photodiode chip 37.

With reference to FIG. 27, a light having been reflected at the first inner plane 38a and having passed through the second inner plane 38b forms beam spots 40b, 40e, 40f, 40i and 40j on the photodiode chip 37. A light having been reflected at both the first inner plane 38a and the second inner plane 38b, and having been reflected again at the first inner plane 38a forms beam spots 40a, 40c, 40d, 40g and 40h on the photodiode chip 37. The front light-receiving section 415 is associated with the beam spots 40b, 40e, 40f, 40i and 40j, and the rear light-receiving section 416 is associated with the beam spots 40a, 40c, 40d, 40g and 40h.

Each of the beam spots 40c, 40e, 40h and 40j is comprised of a diffracted light emitted from the first region 39a of the two-divisional grating 39, and each of the beam spots 40d, 40f, 40g and 40i is comprised of a diffracted light emitted from the second region 39b of the two-divisional grating 39. Each of the beam spots 40a and 40b is comprised of a transmitted light emitted from the two-divisional grating 39.

The light-receiving sections 37ba, 37bb, 37bc, 37e, 37f, 37i and 37j constituting the front light-receiving section 415 and the light-receiving sections 37aa, 37ab, 37ac, 37c, 37d, 37g and 37h constituting the rear light-receiving section 416 are the same in shape and arrangement as the light-receiving sections formed on the photodiode chip 22 in the eighth embodiment illustrated in FIG. 17.

The laser diode chip 1 is positioned so that an optical length between the laser diode chip 1 and the first inner plane 38a is equal to (a+b+3c)/2 wherein "a" indicates an optical length between the first inner plane 38a and the rear light-receiving section 416, "b" indicates an optical length between the second inner plane 38b and the front light-receiving section 415, and "c" indicates an optical length between the first and second inner planes 38a and 38b.

The optical head in accordance with the thirteenth embodiment operates as follows.

A light emitted from the laser diode chip 1 and polarized in a y-axis direction enters the prism 38 through the first outer surface 411 so that an optical axis thereof is perpendicular to the first outer surface 411. Then, the light transmits through the first inner plane 38a, and leaves the prism 38 at the third outer surface 413 with an optical axis thereof being perpendicular to the third outer surface 413. After passing through the two-divisional grating 39, the light having left the prism 38 is converted into a circularly polarized light in the quarter wavelength plate 25, and then, is focused onto the medium through the lens (not illustrated).

The light having been reflected by the medium advances on the same optical path in an opposite direction, and is converted by the quarter wavelength plate 25 into a light polarized in an x-axis direction. Then, the light is separated into a diffracted light and a transmitted light in the two-divisional grating 39. Then, the transmitted light enters the prism 38 at the third outer surface 413 with an optical axis thereof being perpendicular to the third outer surface 413.

FIG. 25A illustrates only the transmitted light emitted from the two-divisional grating 39, but does not illustrate the diffracted light.

The light having entered the prism 38 is reflected at the first inner plane 38a. The light having been reflected at the first inner plane 38a is reflected at the second inner plane 38b by half, and the remaining half of the light passes through the second inner plane 38b.

The light having been reflected at the second inner plane 38b is reflected again at the first inner plane 38a, leaves the prism 38 at the second outer surface 412, enters the photodiode chip 37, and is received in the rear light-receiving section 416.

The light having been reflected at the first inner plane 38a and having passed through the second inner plane 38b leaves the prism 38 at the second outer surface 412, enters the photodiode chip 37, and is received in the front light-receiving section 415.

An additional light-receiving section may be formed on the sub-mount 5, similarly to the above-mentioned first embodiment. The formation of such an additional light-receiving section prevents variation in an amount of a light emitted from the laser diode chip 1 which variation is caused by degradation occurring with the lapse of time, or by temperature variation.

The photodiode chip 37 may be designed to have an alignment mark or marks for accurately mounting the sub-mount 5 on the photodiode chip 37.

The quarter wavelength plate 25 may be positioned at any place intermediate between the two-divisional grating 39 and the medium.

A focus error signal FE13 is obtained by a spot-size process in accordance with the following equation, based on signals S37aa to S37j detected at the light-receiving sections 37aa to 37j constituting the front and rear light-receiving sections 415 and 416 formed on the light-receiving plane 37l of the photodiode chip 37.

FE13=S37aa−S37ab+S37ac−S37ba+S37bb−S37bc

A track error signal TE20 is obtained by a push-pull process in accordance with the following equation.

TE20=(S37c+S37e+S37h+S37j)−(S37d+S37f+S37g+S37i)

A signal indicative of data to be reproduced can be obtained as a sum of the signals S37c, S37e, S37h, S37j, S37d, S37f, S37g and S37i.

In accordance with the thirteenth embodiment, even if the beam spots 40a to 40j are deviated in an x-axis direction due to assembling errors in the laser diode chip 1 and the photodiode chip 37, since the photodiode chip 37 is not formed with a division line parallel to a z-axis, there would not be generated track offset, and the focus error signal would not be influenced.

If the two-divisional grating 39 is deviated in an x-axis direction, there would be generated track offset. However, a light having been reflected at the medium could have great tolerance in an x-axis direction, because the light has a great diameter in the two-divisional grating 39.

In addition, since the two-divisional grating 39 does not have a division line parallel to an x-axis, and is uniform in a y-axis direction, a tolerance in a y-axis direction is infinite, unless the light is not out of the two-divisional grating 39.

If an oscillation wavelength of a light emitted from the laser diode chip 1 varies due to temperature fluctuation and so on, a diffraction angle of the diffracted light emitted from the two-divisional grating 39 would also vary. However, in the thirteenth embodiment, none of the beam spots 40c to 40j is cross over a plurality of the light-receiving sections, and hence, is influenced by the variation in a diffraction angle of the diffracted light.

The two-divisional grating 39 may be replaced with a hologram device having a lens function. Such a hologram device would provide convergence and divergence functions to the diffracted light.

Each of the first and second inner planes 38a and 38b makes an angle of 45 degrees relative to the first outer surface 411 of the prism 38, and the photodiode chip 37 makes an angle of 90 degrees relative to the first outer surface 411 of the prism 38. Hence, even if the sub-mount 5 would have a thickness different from a designed thickness, and accordingly, a light-emitting point of the laser diode chip 1 is deviated relative to the photodiode chip 37 in a y-axis direction, a relative positional relation in a direction of an optical axis between the laser diode chip 1 and the photodiode chip 37 remains unchanged, ensuring that there is not generated focus offset caused by the deviation in the light-emitting point of the laser diode chip 1.

When a focus error signal is to be detected by a spot-size process, a size of a beam spot formed on the photodiode chip 37 varies to a greater degree relative to a deviation of the medium in an optical axis direction, as an optical length between front and rear light-converging points of the photodiode chip 37 positioned so that the medium is located on a light-converging point of the lens, and the photodiode chip 37 is set shorter.

Herein, considering the facts that a ratio of variation in a size of a beam spot has a relation with sensitivity of a focus error signal, and that an optical length between the light-converging point and the photodiode chip 37 is equal to a half of a distance between the first and second inner planes 38a and 38b, it is understood that a shorter distance between the first and second inner plane 38a and 38b ensures a focus error signal. to have greater sensitivity.

In the prism 7 in the above-mentioned first to third embodiments, even if a distance between the first and second inner planes 7a and 7b is intended to narrow in order to prevent a light having been reflected at the first inner plane 7a from being reflected again at the second inner plane 7b, there is a limitation in doing so. However, in the optical head in accordance with the present embodiment, since a light is reflected twice at the first inner plane 38a in an optical path from the medium to the photodiode chip 37, a distance between the first and second inner planes 38a and 38b can be narrowed to an intended degree.

In addition, it was necessary to form the base 17d or 23c under the prism 17 or 23 in the fourth to tenth embodiments. To the contrary, the thirteenth embodiment makes it no longer necessary to form a base such as the base 17d or 23c under the prism 38, ensuring enhancement in productivity of an optical head.

Furthermore, since the optical head is no longer necessary to include a base, if an alignment mark is formed on the photodiode chip 37, the prism 38 can be accurately assembled on the photodiode chip 37 by aligning a line at which the second inner plane 38b makes contact with the photodiode chip 37, to the alignment mark.

When a light is radiated to a prism, a light enters the prism at a plane at various incident angles, and is diverged. It is quite difficult to provide the same reflectance and transmittance to all incident angles. However, in accordance with the present embodiment, a light directing from the laser diode chip 1 to the lens is diverged only once at the first inner plane 38a, there would be small dispersion in an intensity profile of the light.

In the present embodiment, the laser diode chip 1 is positioned so that an optical length between the laser diode chip 1 and the first inner plane 38a is equal to (a+b+3c)/2, as mentioned earlier. Hence, an optical length d between the laser diode chip 1 and the first outer surface 411 is equal to c/2, which means that a big gap is formed therebetween. As a result, even if the laser diode chip 1 is assembled slightly out of place, it would be possible to keep the laser diode chip 1 from making abutment with the prism 38.

In accordance with the present embodiment, since the laser diode chip 1 emits a light in parallel with the photodiode chip 37, an optical head can be designed to have a reduced thickness equal to a sum of thicknesses of the prism 38 and the photodiode chip 37.

In addition, the present embodiment ensures no optical loss in the prism 38.

In accordance with the present embodiment, since the focus error signal FE13 is detected in the form of variation in a size of the beam spots 40a and 40b in a z-axis direction, and the track error signal component is detected in the form of variation in an amount of a light of the beam spots 40a and 40b in an x-axis direction, the track error signal component is unlikely to be mixed into the focus error signal FE13.

In the thirteenth embodiment, various methods of detecting a focus error signal, a track error signal and a data reproducing signal may be used by replacing the photodiode chip 37 with another photodiode chip, as having been described in the ninth embodiment in which the photodiode chip 22 in the eighth embodiment is replaced with the photodiode chip 27, and in the tenth embodiment in which the photodiode chip 22 in the eighth embodiment is replaced with the photodiode chip 28.

As the lens to be used in the eleventh embodiment, there may be used a single finite lens or a combination of a collimate lens and an objective lens. The combination may include a beam splitter located between the collimate lens and the objective lens for separating a light directing to the medium from the laser diode chip 1, or a light directing to the photodiode chip 37 from the medium. This ensures these lights to be parallel lights in the case that the medium is located on a light-converging point of the objective lens. Hence, these lights could be readily dealt with.

The medium mentioned in the present embodiment includes an optical disc, an optical tape, and the like, and may be composed of phase-change material or photo-electro-magnetic material, for instance.

The two-divisional grating 39 may be comprised of a device composed of lithium niobate crystal on which a grid-like slit is formed in dependence on whether proton is exchanged or not. Namely, the two-divisional grating 39 utilizes the fact that an index ellipsoid is deformed, if proton exchange is applied to lithium niobate crystal. A phase difference between dielectric films deposited on a region to which proton exchange is applied, and a portion to which proton exchange is not applied is multiplied by $N\pi$ for a light polarized in a y-axis direction, and is set equal to an appropriate value for a light polarized in an x-axis direction, wherein N is an even integer and $\pi$ is indicated in a unit of radian. As a result, the two-divisional grating 39 can be designed to allow a light polarized in a y-axis direction to pass therethrough, and a light polarized in an x-axis direction to diffract and pass therethrough.

Fourteenth Embodiment

An optical head in accordance with the fourteenth embodiment has almost the same structure as the structure of the optical head in accordance with the thirteenth embodiment, but is different only in that the two-divisional grating 39 is replaced with a two-divisional grating 41, and that the photodiode chip 37 is replaced with a photodiode chip 42.

Figure 28:
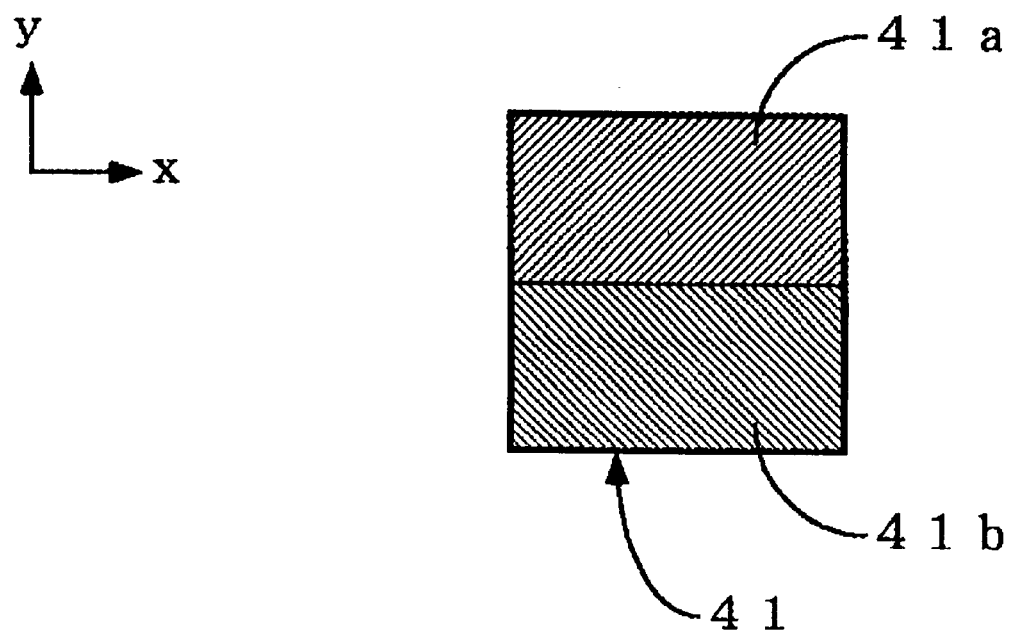
FIG. 28 is a right side view of a two-divisional grating constituting an optical head in accordance with the fourteenth embodiment of the present invention.

FIG. 28 is a right side view of the two-divisional grating 41. As illustrated in FIG. 28, the two-divisional grating 41 is designed to have first and second regions 41a and 41b partitioned by a horizontal division line.

Figure 29:
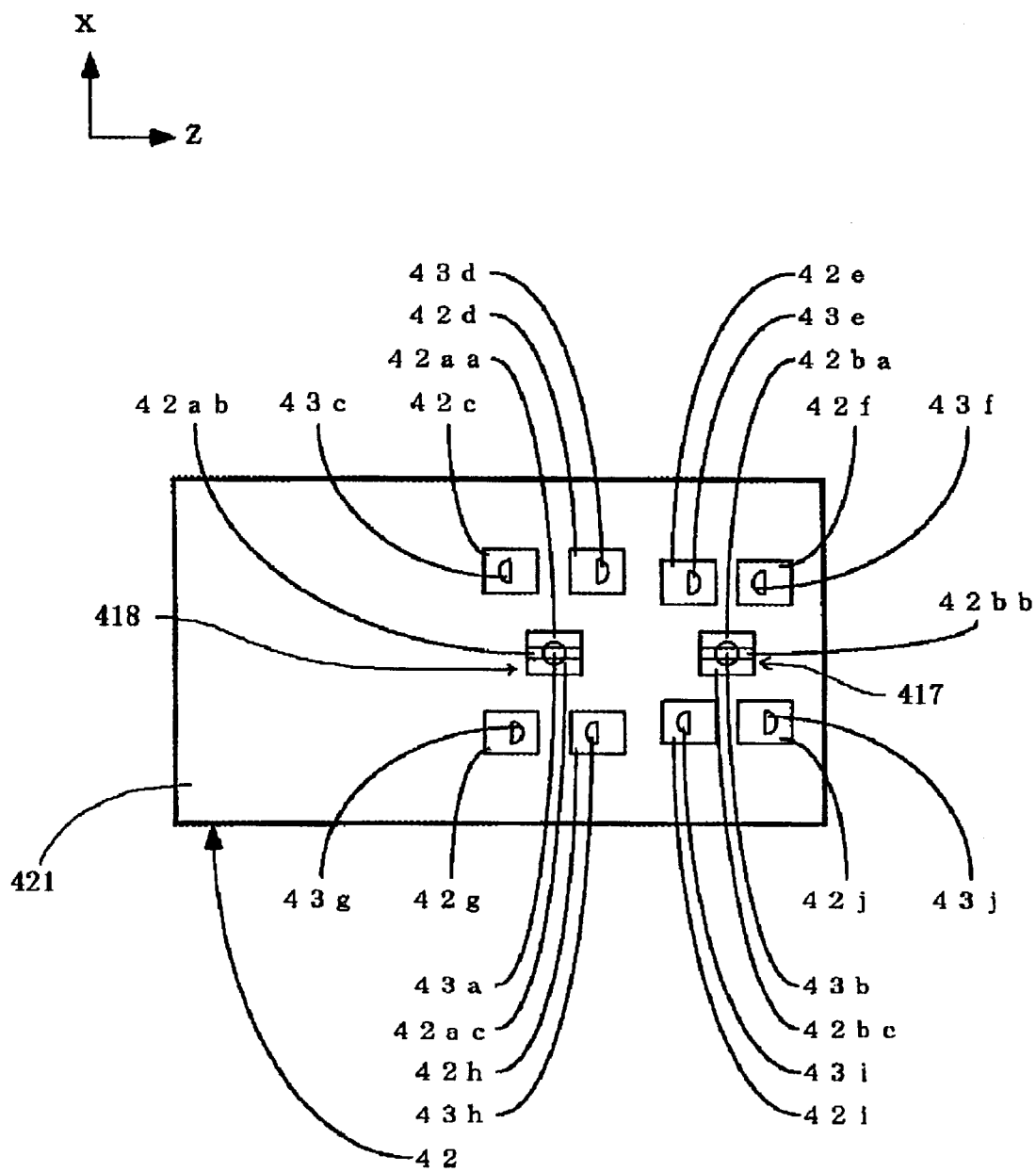
FIG. 29 is a top plan view illustrating a photodiode chip constituting an optical head in accordance with the fourteenth embodiment of the present invention.

As illustrated in FIG. 29, the photodiode chip 42 has a light-receiving plane 421 in parallel with the second outer surface 72. A front light-receiving section 417 and a rear light-receiving section 418 are formed on the light-receiving plane 421.

With reference to FIG. 29, a light having been reflected at the first inner plane 38a and having passed through the second inner plane 38b forms five beam spots 43b, 43e, 43f, 43i and 43j on the photodiode chip 42. A light having been reflected at both the first and second inner planes 38a and 38b and having been reflected again at the first inner plane 38a forms five beam spots 43a, 43c, 43d, 43g and 43h on the photodiode chip 42. The beam spots 43d, 43f, 43g and 43i are comprised of a diffracted light emitted from the first region 41a of the two-divisional grating 41, and the beam spots 43c, 43e, 43h and 43j are comprised of a diffracted light emitted from the second region 41b of the two-divisional grating 41. The beam spots 43a and 43b are comprised of a transmitted light passing through the two-divisional grating 41.

The beam spots 43c, 43d, 43g and 43h are all semicircular in shape, and are positioned radially around the beam spot 43a which is circular in shape. Similarly, the beam spots 43e, 43f, 43i and 43j are all semicircular in shape, and are positioned radially around the beam spot 43b which is circular in shape. In the rear light-receiving section 418, the beam spots 43g and 43h are positioned so that the arcuate portions of them face each other, and the beam spots 43c and 43d are positioned so that the linear portions of them face each other. In the front light-receiving section 417, the beam spots 43i and 43j are positioned so that the linear portions of them face each other, and the beam spots 43e and 43f are positioned so that the arcuate portions of them face each other.

The front light-receiving section 417 is associated with the beam spots 43b, 43e, 43f, 43i and 43j, and the rear light-receiving section 418 is associated with the beam spots 43a, 43c, 43d, 43g and 43h.

As illustrated in FIG. 29, the front light-receiving section 417 is comprised of five rectangular light-receiving sections each located around each of the beam spots 43b, 43e, 43f, 43i and 43j. Around the circular beam spot 43b are formed three light-receiving sections 42ba, 42bb and 42bc partitioned by two division lines both parallel to an optically tangential direction of the medium. Around the semicircular beam spots 43e, 43f, 43i and 43j are formed rectangular light-receiving sections 42e, 42f, 42i and 42j, respectively.

Similarly, the rear light-receiving section 418 is comprised of five rectangular light-receiving sections each located around each of the beam spots 43a, 43c, 43d, 43g and 43h. Around the circular beam spot 43a are formed three light-receiving sections 42aa, 42ab and 42ac partitioned by two division lines both parallel to an optically tangential direction of the medium. Around the semicircular beam spots 43c, 43d, 43g and 43h are formed rectangular light-receiving sections 42c, 42d, 42g and 42h, respectively.

A focus error signal FE14 is obtained by a spot-size process in accordance with the following equation, based on signals S42aa to S42j detected at the light-receiving sections 42aa to 42j constituting the front and rear light-receiving sections 417 and 418 formed on the light-receiving plane 371 of the photodiode chip 42.

FE14=S42aa−S42ab+S42ac−S42ba+S42bb−S42bc

A track error signal TE21 is obtained by a push-pull process in accordance with the following equation.

TE21=(S42c+S42e+S42h+S42j)−(S42d+S42f+S42g+S42i)

A signal indicative of data to be reproduced can be obtained as a sum of the signals S42c, S42e, S42h, S42j, S42d, S42f, S42g and S42i.

In accordance with the present embodiment, even if the beam spots 43a to 43j are deviated in an x-axis direction due to assembling errors in the laser diode chip 1 and the photodiode chip 42, since the photodiode chip 42 is not formed with a division line parallel to a z-axis, there would not be generated track offset, and the focus error signal would not be influenced.

If the two-divisional grating 41 were deviated in an x-axis direction, there would be generated track offset. However, a light having been reflected at the medium could have great tolerance in a y-axis direction, because the light has a great diameter in the two-divisional grating 41.

In addition, since the two-divisional grating 41 does not have a division line parallel to a y-axis, and is uniform in an x-axis direction, a tolerance in an x-axis direction is infinite, unless the light is not out of the two-divisional grating 41.

If an oscillation wavelength of a light emitted from the laser diode chip 1 varies due to temperature fluctuation and so on, a diffraction angle of the diffracted light emitted from the two-divisional grating 41 would also vary. However, in the present embodiment, none of the beam spots 43c to 43j is cross over a plurality of the light-receiving sections, and hence, is influenced by the variation in a diffraction angle of the diffracted light.

The two-divisional grating 41 is uniform in an x-axis direction, however, may be replaced with a hologram device having a lens function. Such a hologram device would provide convergence and divergence functions to the diffracted light.

In accordance with the fourteenth embodiment, since the laser diode chip 1 emits a light in parallel with the photodiode chip 42, an optical head can be designed to have a reduced thickness equal to a sum of thicknesses of the prism 38 and the photodiode chip 42.

In addition, the present embodiment ensures no optical loss in the prism 38.

In accordance with the present embodiment, since the focus error signal FE14 is detected in the form of variation in a size of the first and second beam spots 43a and 43b in an x-axis direction, and the track error signal component is detected in the form of variation in an amount of a light of the first and second beam spots 43a and 43b in a z-axis direction, the track error signal component is unlikely to be mixed into the focus error signal FE14.

As is obvious in comparison of FIG. 29 to FIG. 27, the photodiode chip 42 in the fourteenth embodiment can be obtained by rotating the light-receiving sections of the photodiode chip 37 in the thirteenth embodiment around an optical axis thereof without any linear displacement. In the above-mentioned first to twelfth embodiments as well as the present embodiment, there may be used a photodiode chip which is obtained by rotating the light-receiving sections of the photodiode chip in each of the embodiments around an optical axis thereof without any linear displacement.

The two-divisional grating 41 may be comprised of a device composed of lithium niobate crystal on which a grid-like slit is formed in dependence on whether proton is exchanged or not. Namely, the two-divisional grating 41 utilizes the fact that an index ellipsoid is deformed, if proton exchange is applied to lithium niobate crystal. A phase difference between dielectric films deposited on a region to which proton exchange is applied, and a portion to which proton exchange is not applied is multiplied by $N\pi$ for a light polarized in a y-axis direction, and is set equal to an appropriate value for a light polarized in an x-axis direction, wherein N is an even integer and $\pi$ is indicated in a unit of radian. As a result, the two-divisional grating 41 can be designed to allow a light polarized in a y-axis direction to pass therethrough, and a light polarized in an x-axis direction to diffract and pass therethrough.

Fifteenth Embodiment

Figure 30:
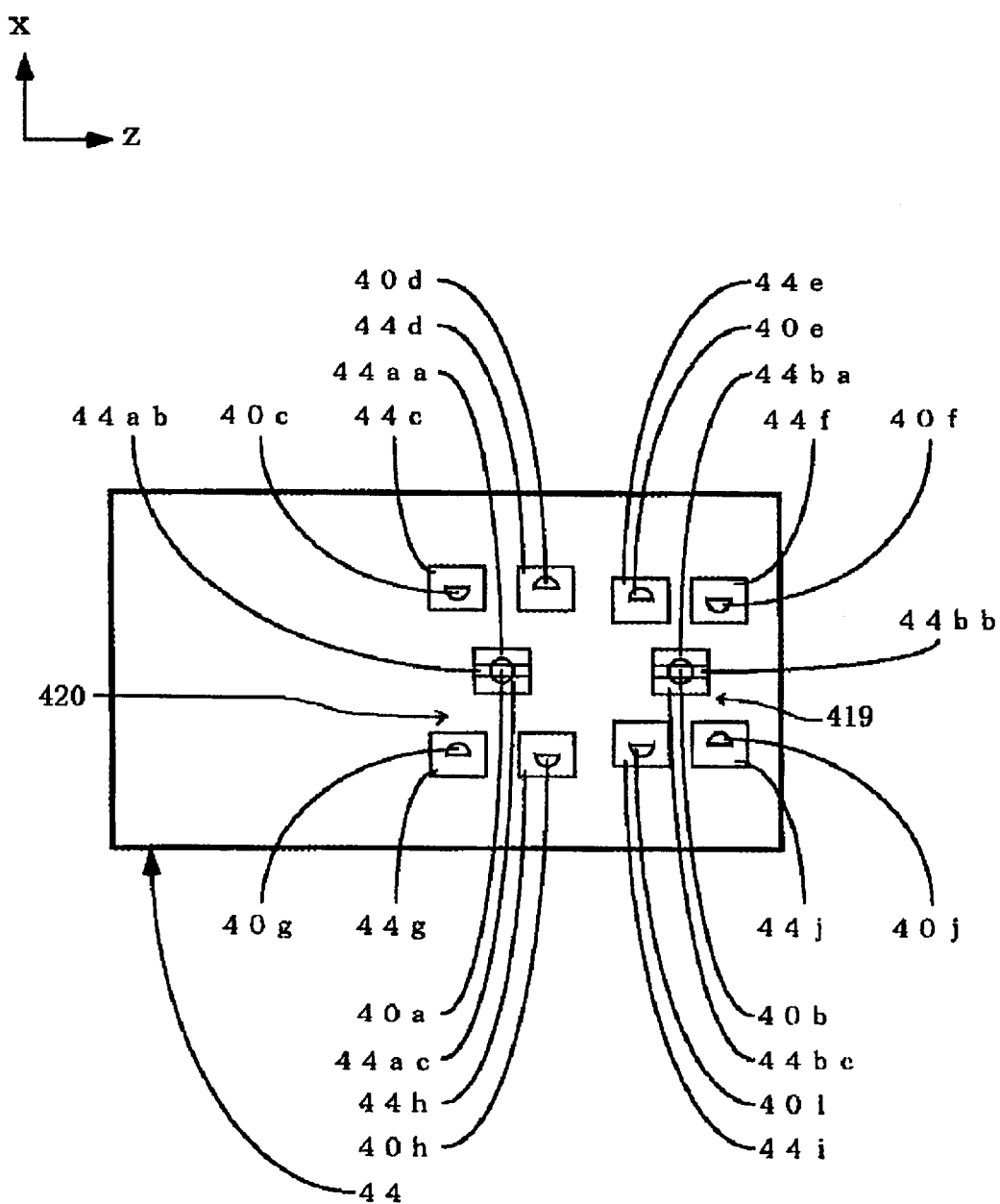
FIG. 30 is a top plan view illustrating a photodiode chip constituting an optical head in accordance with the fifteenth embodiment of the present invention.

An optical head in accordance with the fifteenth embodiment has almost the same structure as the structure of the optical head in accordance with the thirteenth embodiment, but is different only in that the photodiode chip 37 is replaced with a photodiode chip 44. FIG. 30 is a plan view of the photodiode chip 44.

The photodiode chip 44 in the fifteenth embodiment can be obtained by rotating the light-receiving sections 37aa, 37ab and 37ac, and 37ba, 37bb and 37bc of the photodiode chip 37 in the thirteenth embodiment around an optical axis thereof by 90 degrees without any linear displacement.

With reference to FIG. 30, a light having been reflected at both the first and second inner planes 38a and 38b, and having been reflected again at the first inner plane 38a forms five beam spots 40a, 40c, 40d, 40g and 40h on the photodiode chip 44. A light having been reflected at the first inner plane 38a and having passed through the second inner plane 38b forms five beam spots 40b, 40e, 40f, 40i and 40j on the photodiode chip 44.

The beam spots 40d, 40f, 40g and 40i are comprised of a diffracted light emitted from the first region 39a of the two-divisional grating 39, and the beam spots 40c, 40e, 40h and 40j are comprised of a diffracted light emitted from the second region 39b of the two-divisional grating 39. The beam spots 40a and 40b are comprised of a transmitted light passing through the two-divisional grating 39.

A focus error signal FE15 is obtained by a spot-size process in accordance with the following equation, based on signals S44aa to S44j detected at the light-receiving sections 44aa to 44j constituting the front and rear light-receiving sections 419 and 420 formed on a light-receiving plane of the photodiode chip 44.

FE15=S44aa−S44ab+S44ac−S44ba+S44bb−S44bc

A track error signal TE22 is obtained by a push-pull process in accordance with the following equation.

TE22=(S44c+S44e+S44h+S44j)−(S44d+S44f+S44g+S44i)

A signal indicative of data to be reproduced can be obtained as a sum of the signals S44c, S44e, S44h, S44j, S44d, S44f, S44g and S44i.

In accordance with the present embodiment, even if the beam spots 40a to 40j are deviated in a z-axis direction due to assembling errors in the laser diode chip 1 and the photodiode chip 44, since the photodiode chip 44 is not formed with a division line parallel to an x-axis, there would not be generated track offset, and the focus error signal would not be influenced.

If the two-divisional grating 39 is deviated in an x-axis direction, there would be generated track offset. However, a light having been reflected at the medium could have great tolerance in a y-axis direction, because the light has a great diameter in the two-divisional grating 39.

In addition, since the two-divisional grating 39 does not have a division line parallel to an x-axis, and is uniform in a y-axis direction, a tolerance in a y-axis direction is infinite, unless the light is not out of the two-divisional grating 39.

If an oscillation wavelength of a light emitted from the laser diode chip 1 varies due to temperature fluctuation and so on, a diffraction angle of the diffracted light emitted from the two-divisional grating 39 would also vary. However, in the present embodiment, none of the beam spots 40c to 40j is cross over a plurality of the light-receiving sections, and hence, is influenced by the variation in a diffraction angle of the diffracted light.

The two-divisional grating 39 is uniform in a y-axis direction, however, may be replaced with a hologram device having a lens function. Such a hologram device would provide convergence and divergence functions to the diffracted light.

In accordance with the present embodiment, since the laser diode chip 1 emits a light in parallel with the photodiode chip 44, an optical head can be designed to have a reduced thickness equal to a sum of thicknesses of the prism 38 and the photodiode chip 44.

In addition, the present embodiment ensures no optical loss in the prism 38.

As mentioned earlier, the photodiode chip 44 in the fifteenth embodiment is obtained by rotating the light-receiving sections in the thirteenth embodiment around an optical axis of each of the light-receiving sections. Since the focus error signal FE15 is detected in the form of variation in a size of the first and second beam spots 40a and 40b in an x-axis direction, and the track error signal component is detected in the form of variation in an amount of a light of the first and second beam spots 40a and 40b in an x-axis direction, the track error signal component is unlikely to be mixed into the focus error signal FE15.

In the above-mentioned twelfth to fourteenth embodiments, there may be used a photodiode chip which is obtained by rotating the light-receiving sections of the photodiode chip in each of the embodiments around an optical axis thereof without any linear displacement.

Sixteenth Embodiment

Figure 31A:
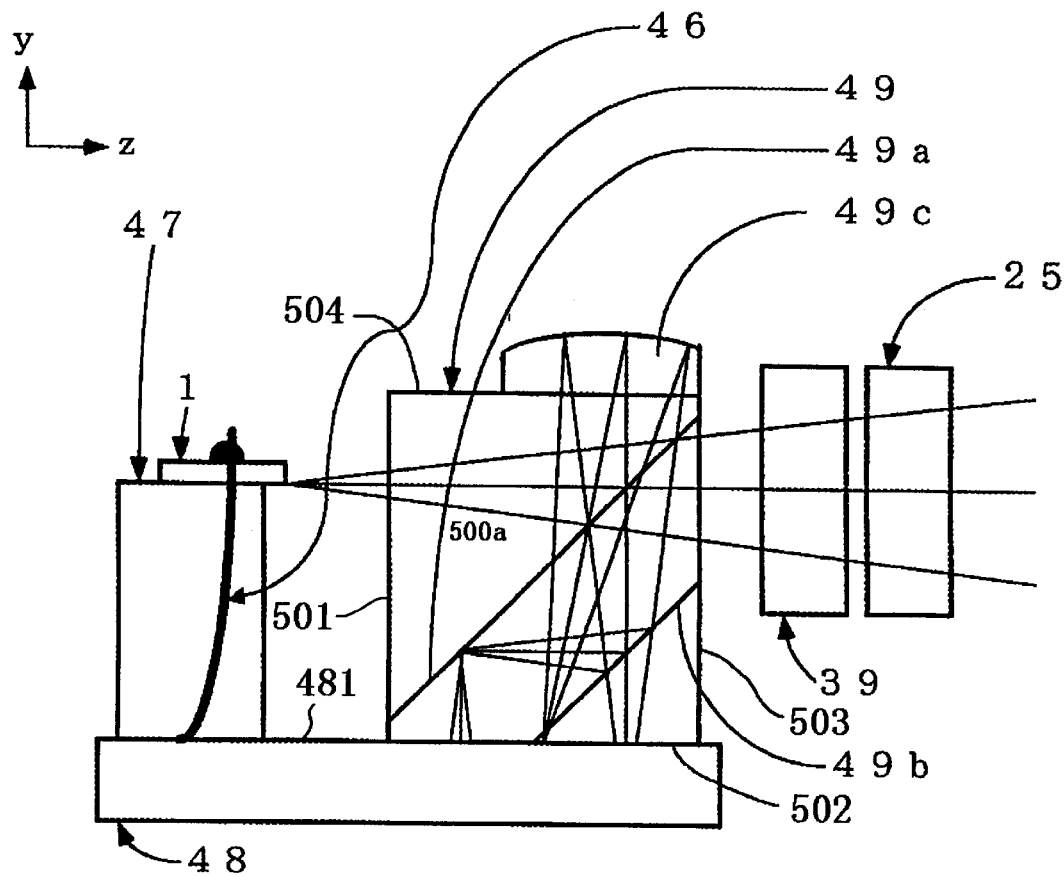
FIG. 31A is a side view illustrating an optical head in accordance with the sixteenth embodiment of the present invention.
Figure 31B:
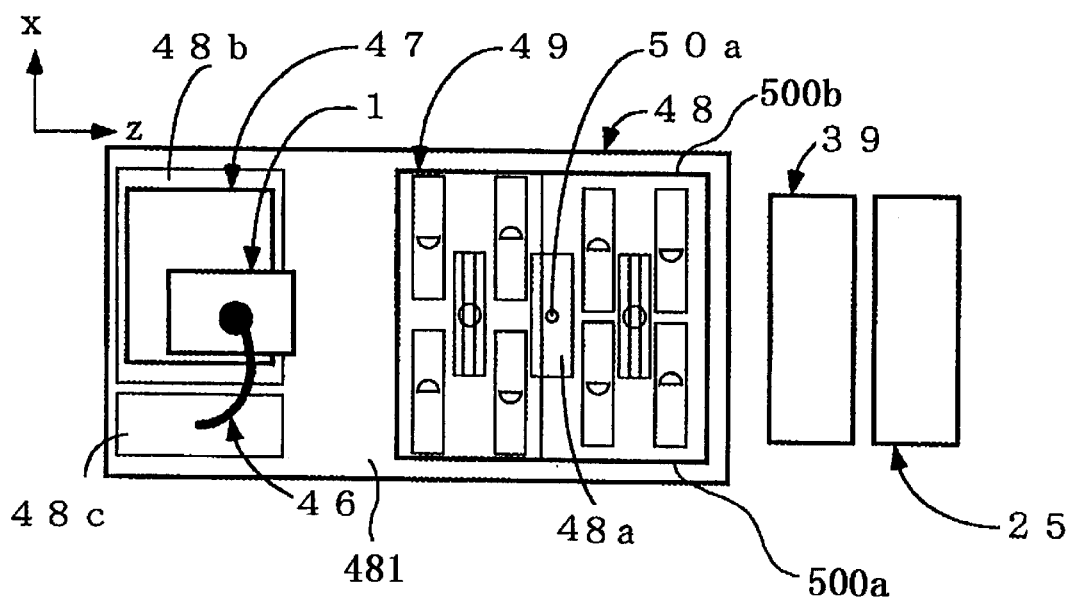
FIG. 31B is a top plan view of the optical head illustrated in FIG. 31A.

FIGS. 31A and 31B illustrate an optical head in accordance with the sixteenth embodiment. The optical head in accordance with the sixteenth embodiment has almost the same structure as the structure of the optical head in accordance with the thirteenth embodiment, but is different only in that the sub-mount 5 is replaced with a Si heat sink 47, the photodiode chip 37 is replaced with a photodiode chip 48, and the prism 38 is replaced with a prism 49.

An optical head in accordance with the sixteenth embodiment is comprised of a laser diode chip 1, a Si heat sink 47 on which the laser diode chip 1 is mounted and which keeps the laser diode chip 1 at a predetermined height, a lens (not illustrated) for focusing a light emitted from the laser diode chip 1, onto a medium (not illustrated), an optical separator or prism 49 for separating a light reflected from the medium, from an optical axis of a light directing to the lens from the laser diode chip 1, a photodiode chip 48 receiving a light separated from the optical axis by means of the prism 49, a diffraction device or two-divisional grating 39 positioned in facing relation with the third outer surface 73 of the prism 49, and a quarter wavelength plate 25 positioned adjacent to the two-divisional grating 39.

The optical separator or prism 49 is a square pole in shape defined by a first sidewall 500a and a second sidewall 500b in parallel with each other, and first, second, third and fourth outer surfaces 501, 502, 503 and 504 all perpendicular to both the first and second sidewalls 500a and 500b. The first and third outer surfaces 501 and 503 are in parallel with each other.

The prism 49 is designed to have first and second inner planes 49a and 49b both perpendicular to the first and second sidewalls 500a and 500b, in parallel with one another, and both inclined relative to the first outer surface 502 at a predetermined angle of 45 degrees.

A reflection mirror 49c is mounted on the fourth outer surface 504 of the prism 504.

Figure 26:
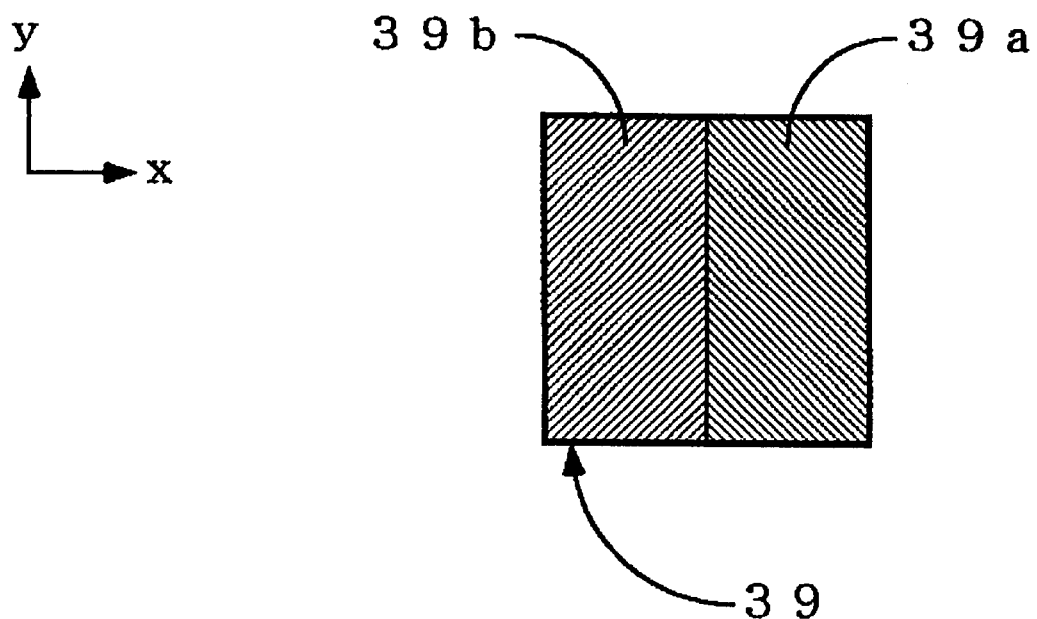
FIG. 26 is a right side view of a two-divisional grating constituting the optical head illustrated in FIGS. 25A and 25B.

The two-divisional grating 39 is designed to have first and second regions 39a and 39b partitioned by a division line extending in a y-axis direction, similarly to one illustrated in FIG. 26.

The quarter wavelength plate 25 converts a light having passed through the third outer surface 73 of the prism 49 to a circularly polarized light from a linearly polarized light, and also converts a light having been reflected from the medium from a circularly polarized light to a linearly polarized light having an orientation perpendicular to an original orientation.

The photodiode chip 48 has a light-receiving plane 48l in parallel with the second outer surface 502. As illustrated in FIG. 31B, two electrodes 48b and 48c are formed on the light-receiving plane 48l. The electrode 48b is formed just below the Si heat sink 47. The electrode 48c is located adjacent to the electrode 48b without making contact with the Si heat sink 47. The laser diode chip 1 is in electrical connection with the electrode 48c through a bonding wire 46.

A front light-receiving section, a rear light-receiving section and a central light-receiving section 48a are formed on the light-receiving plane 48l of the photodiode chip 48. The central light-receiving section 48a is located at the center between the front and rear light-receiving sections. The front and rear light-receiving sections are the same in shape and arrangement as the front light-receiving section 415 and the rear light-receiving section 416 of the photodiode chip 37 illustrated in FIG. 27. In brief, the light-receiving sections formed on the light-receiving plane 48l of the photodiode chip 48 is comprised of the light-receiving sections formed on the light-receiving plane of the photodiode chip 37 and the central light-receiving section 48a.

The laser diode chip 1 is positioned so that an optical length between the laser diode chip 1 and the first inner plane 49a is equal to (a+b+3c)/2 wherein "a" indicates an optical length between the first inner plane 49a and the rear light-receiving section, "b" indicates an optical length between the second inner plane 49b and the front light-receiving section, and "c" indicates an optical length between the first and second inner planes 49a and 49b.

The optical head in accordance with the sixteenth embodiment operates as follows.

A light emitted from the laser diode chip 1 and polarized in a y-axis direction enters the prism 49 through the first outer surface 71 so that an optical axis thereof is perpendicular to the first outer surface 71. The light is reflected at the first inner plane 49a by 3%, and the light passes through the first inner plane 49a by (100−β)%.

The light having been reflected at the first inner plane 49a is reflected at and collected by the reflection mirror 49c. Through there is generated a loss of β% at the first inner plane 49a, the light having been emitted from the laser diode chip 1 passes through the second inner plane 49 by (100−β)β/100%, and enters the photodiode chip 48. A beam spot 50a formed by the light having entered the photodiode chip 48 is detected by the central light-receiving section 48a of the photodiode chip 48, which would ensure prevention in variation in an amount of a light emitted from the laser diode chip 1 which variation is caused by degradation with the lapse of time and temperature variation. That is, it is possible to accurately control an amount of a light to be emitted from the laser diode chip 1, because a portion of a light collected onto the medium is separated to detect.

The photodiode chip 48 provides power to the laser diode chip 1 through both the electrode 48b on which the Si heat sink 47 is mounted and the electrode 48c making electrical contact with the laser diode chip 1 through the bonding wire 46.

It is not necessary for the Si heat sink 47 to have light-receiving sections unlike the sub-mount 5. Hence, the Si heat sink 47 may be composed of electrically conductive silicon entirely covered with an electrode composed of Ti/Pt/Au/Sn by evaporation, ensuring lower fabrication cost than the sub-mount 5.

In the sixteenth embodiment, a method of detecting an amount of a light emitted from the laser diode chip 1 is improved in comparison with the thirteenth embodiment illustrated in FIGS. 25A and 25B. The improvement provided by the sixteenth embodiment can be applied to the above-mentioned first to twelfth, fourteenth and fifteenth embodiments.

The above-mentioned constant β can be selected among figures in the range of 0 to 100 both inclusive. For instance, the constant β may be set equal to 4 or 10. It is preferred to select a smaller value as the constant β for the purpose of power saving, as long as it is possible to stably control an amount of a light emitted from the laser diode chip 1.

Seventeenth Embodiment

Figure 32:
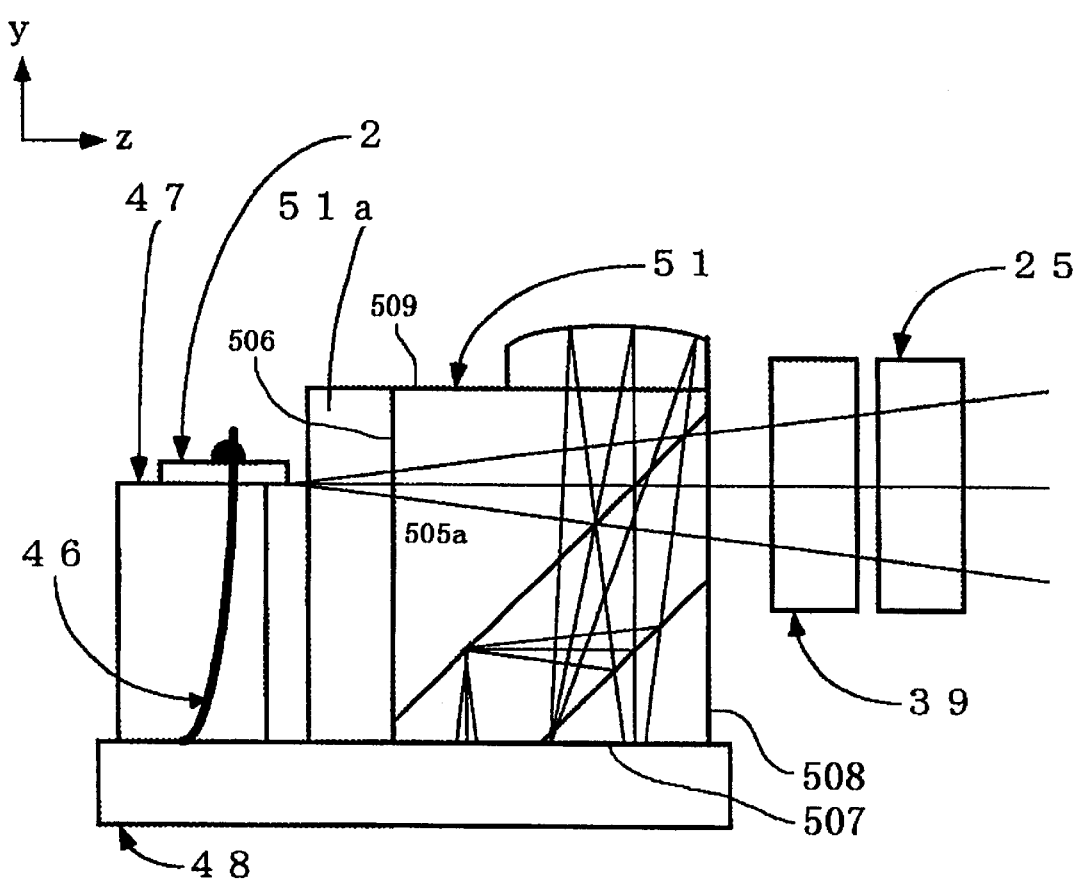
FIG. 32 is a side view illustrating an optical head in accordance with the seventeenth embodiment of the present invention.

FIG. 32 illustrates an optical head in accordance with the seventeenth embodiment. An optical head in accordance with the seventeenth embodiment has almost the same structure as the structure of the optical head in accordance with the sixteenth embodiment, but is different only in that the laser diode chip 1 is replaced with a laser diode chip 2, and that the prism 49 is replaced with a prism 51.

The laser diode chip 2 emits TE polarized light. The optical head in accordance with the seventeenth embodiment further includes a half-wave plate 51a adhered to the first outer surface 506 of the prism 51.

The laser diode chip 1 emits TM polarized light, whereas the laser diode chip 2 emits TE polarized light. Hence, a light polarized in an x-axis direction, emitted from the laser diode chip 2, is converted into a light polarized in a y-axis direction by means of the half-wave plate 51a located adjacent to the prism 51.

The seventeenth embodiment is different from the sixteenth embodiment only in that the half-wave plate 51a is provided in accordance with a direction of polarization of a light emitted from a laser diode chip. A half-wave plate may be formed integrally with a prism in accordance with a direction of polarization of a light emitted from a laser diode chip, also in the above-mentioned first to fifteenth embodiments.

Eighteenth Embodiment

Figure 33A:
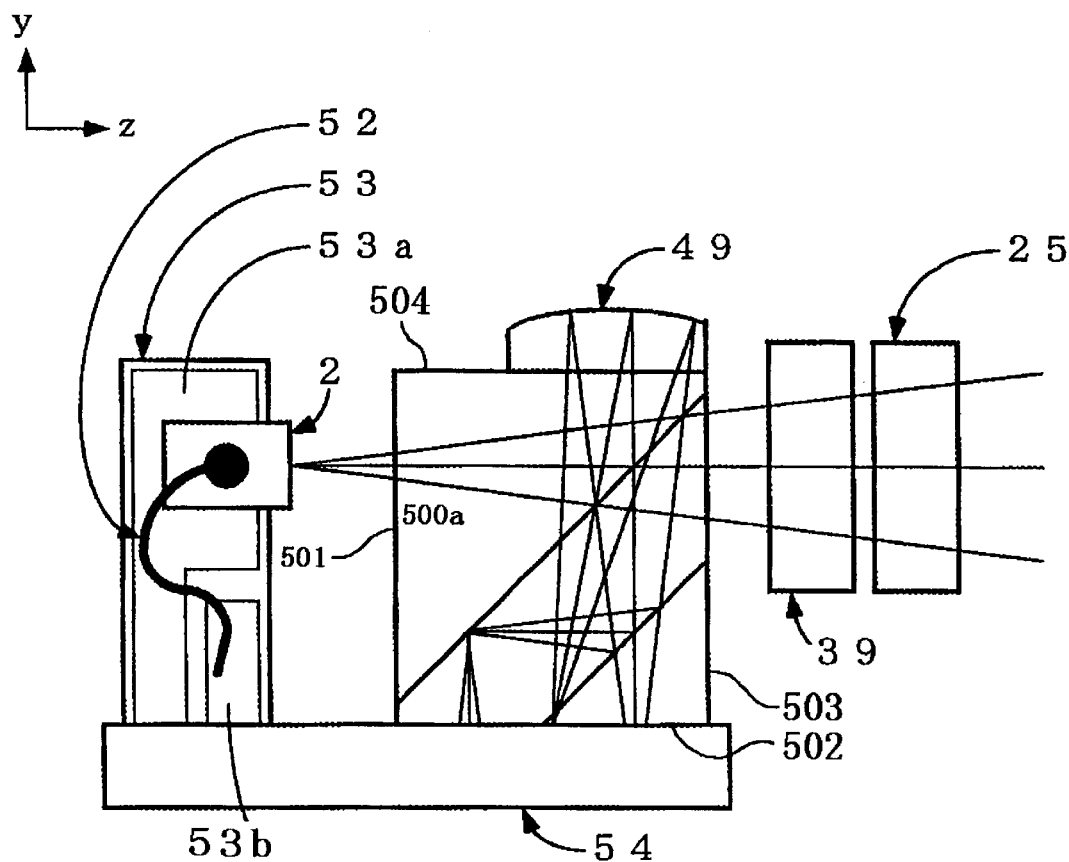
FIG. 33A is a side view illustrating an optical head in accordance with the eighteenth embodiment of the present invention.
Figure 33B:
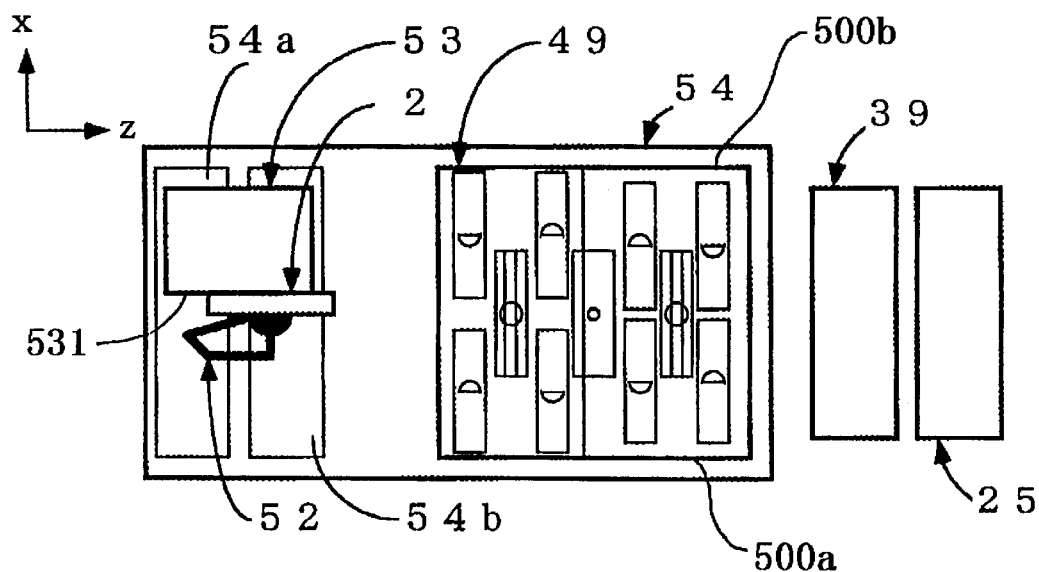
FIG. 33B is a top plan view of the optical head illustrated in FIG. 33A.

FIGS. 33A and 33B illustrate an optical head in accordance with the eighteenth embodiment. An optical head in accordance with the eighteenth embodiment has almost the same structure as the structure of the optical head in accordance with the sixteenth embodiment, but is different only in that the laser diode chip 1 is replaced with a laser diode chip 2, the Si heat sink 47 is replaced with an AlN heat sink 53, and the photodiode chip 48 is replaced with a photodiode chip 54.

The laser diode chip 2 emits TE polarized light. In the eighteenth embodiment, the laser diode chip 2 is mounted on a sidewall 531 of the AlN heat sink 53. That is, the laser diode chip 2 is mounted with being rotated by 90 degrees in an x-y plane in comparison with the laser diode chip 1 in the sixteenth embodiment illustrated in FIGS. 31A and 31B.

On the photodiode chip 54 are formed a first electrode 54a and a second electrode 54b. The AlN heat sink 53 is mounted on the photodiode chip 54 cross over both the first and second electrodes 54a and 54b. As illustrated in FIG. 33A, the AlN heat sink 53 is formed at the sidewall 531 thereof with a third electrode 53a making electrical contact with the first electrode 54a and a fourth electrode 53b making electrical contact with the second electrode 54b.

The laser diode chip 2 is mounted on the sidewall 531 of the AlN heat sink 53 in electrical connection with the third electrode 53a. The laser diode chip 2 is in electrical connection with the fourth electrode 53b through a bonding wire 52.

The laser diode chip 1 emits TM polarized light, whereas the laser diode chip 2 emits TE polarized light. Hence, the laser diode chip 2 is kept in rotation by 90 degrees in an x-y plane relative to the laser diode chip 1, ensuring that a light polarized in an x-axis direction, emitted from the laser diode chip 2, is converted into a light polarized in a y-axis direction The photodiode chip 54 supplies power to the AlN heat sink 53 through the first and second electrodes 54a and 54b formed on the photodiode chip 54 and further through the third and fourth electrodes 53a and 53b formed at the sidewall 531 of the AlN heat sink 53. Then, the AlN heat sink 53 supplies power to the laser diode chip 2 through the third electrode 53a on which the laser diode chip 2 is mounted and the fourth electrode 53b making electrical contact to the laser diode chip 2 through the bonding wire 52.

The eighteenth embodiment is different from the sixteenth embodiment only in that the laser diode chip 2 is kept in rotation in accordance with a direction of polarization of a light emitted therefrom. A laser diode chip may be mounted onto a sub-mount or a heat sink with being kept in rotation in accordance with a direction of polarization of a light emitted therefrom, also in the above-mentioned first to fifteenth embodiments.

Nineteenth Embodiment

Figure 34A:
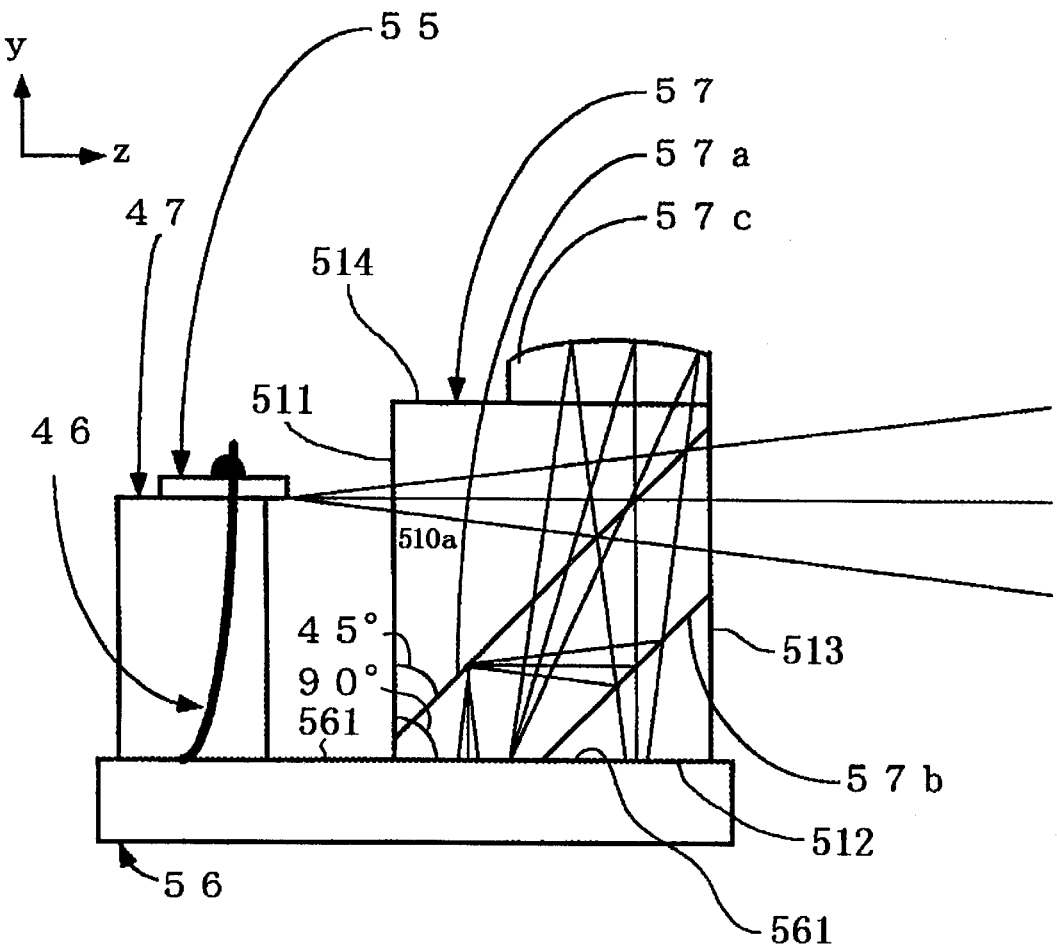
FIG. 34A is a side view illustrating an optical head in accordance with the nineteenth embodiment of the present invention.
Figure 34B:
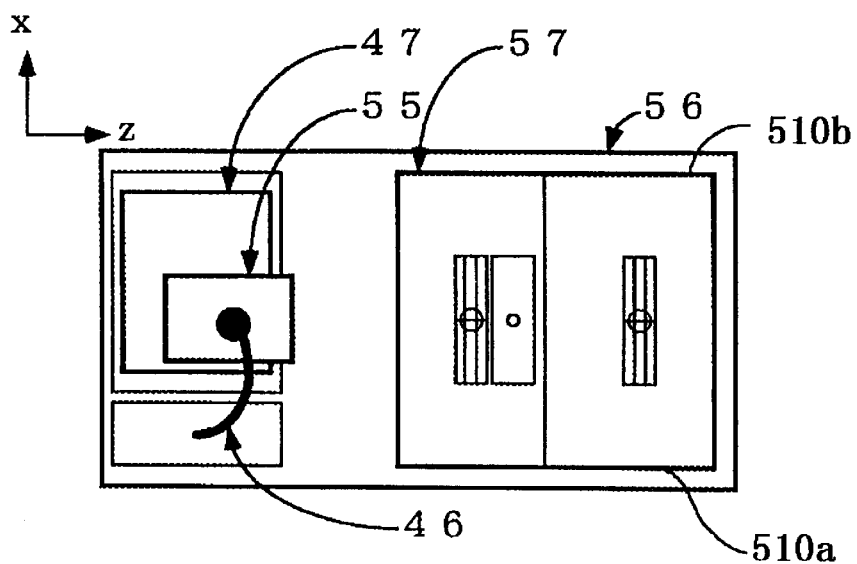
FIG. 34B is a top plan view of the optical head illustrated in FIG. 34A.

FIGS. 34A and 34B illustrate an optical head in accordance with the nineteenth embodiment of the present invention.

The optical head in accordance with the nineteenth embodiment includes an improvement to the optical head in accordance with the eleventh embodiment illustrated in FIGS. 21A and 21B in order to allow the laser diode chip 55 to emit a light polarized in any direction, not to be influenced even when the medium is composed of material having birefringence, and to separate a part of a light focused in the medium.

The optical head in accordance with the nineteenth embodiment is comprised of a laser diode chip 55, a Si heat sink 47 on which the laser diode chip 55 is mounted and which keeps the laser diode chip 55 at a predetermined height, a lens (not illustrated) for focusing a light emitted from the laser diode chip 1, onto a medium (not illustrated), an optical separator or prism 57 for separating a light reflected from the medium, from an optical axis of a light directing to the lens from the laser diode chip 55, a photodiode chip 56 receiving a light separated from the optical axis by means of the prism 57, and a reflection mirror 57c mounted on the prism 57.

The optical separator or prism 57 is a square pole in shape defined by a first sidewall 510a and a second sidewall 510b in parallel with each other, and first, second, third and fourth outer surfaces 511, 512, 513 and 514 all perpendicular to both the first and second sidewalls 510a and 510b. The first and third outer surfaces 511 and 513 are in parallel with each other.

The prism 57 is designed to have first and second inner planes 57a and 57b both perpendicular to the first and second sidewalls 510a and 510b, in parallel with one another, and both inclined relative to the first outer surface 511 at a predetermined angle of 45 degrees.

The laser diode chip 55 is in electrical connection with the photodiode chip 56 through a bonding wire 46.

Figure 35:
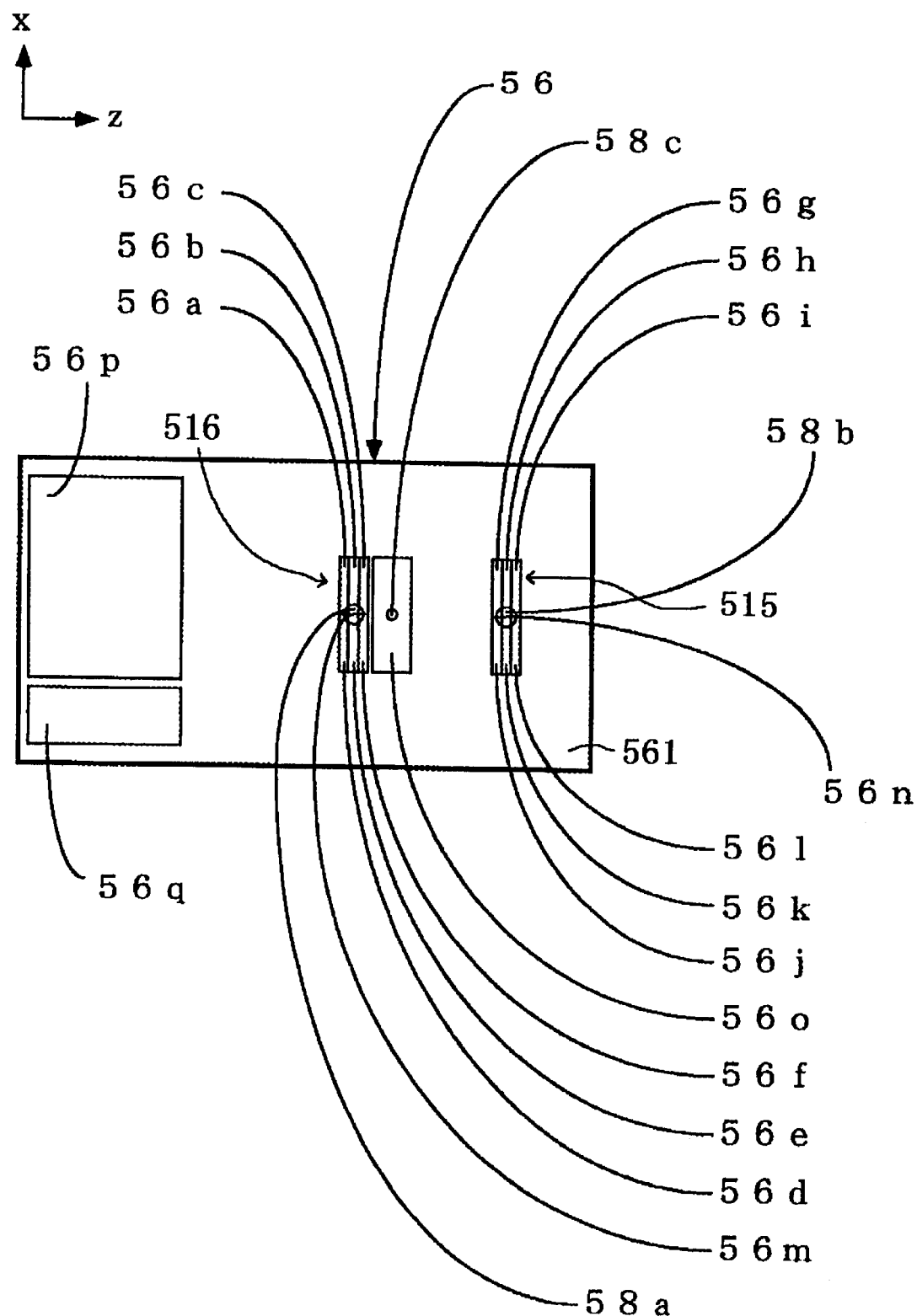
FIG. 35 is a top plan view illustrating a photodiode chip constituting the optical head illustrated in FIGS. 34A and 34B.

A photodiode chip 56 has a light-receiving plane 561 in parallel with a second outer surface 512. As illustrated in FIG. 35, a front light-receiving section 515, a rear light-receiving section 516 and a central light-receiving section 560 are formed on the light-receiving plane 561 of the photodiode chip 56.

With reference to FIG. 35, a light having been reflected at the first inner plane 57a and having passed through the second inner plane 57b forms a beam spot 58b on the photodiode chip 56. A light having been reflected at both the first inner plane 57a and the second inner plane 57b, and having been reflected again at the first inner plane 57a forms a beam spot 58a on the photodiode chip 56. A light having been reflected at the first inner plane 57a and having been reflected again at the reflection mirror 57c forms a beam spot 58c on the photodiode chip 56. The front light-receiving section 515, the rear light-receiving section 516 and the central light-receiving section 560 are associated with the beam spots 58b, 58a and 58c, respectively.

As illustrated in FIG. 35, the front light-receiving section 515 is comprised of six light-receiving sections 56g, 56h, 56i, 56j, 56k and 56l defined by a division line 56n parallel to an optically tangential direction of the medium, and two division lines both parallel to an optically radial direction of the medium.

Similarly, the rear light-receiving section 516 is comprised of six light-receiving sections 56a, 56b, 56c, 56d, 56e and 56f defined by a division line 56m parallel to an optically tangential direction of the medium, and two division lines both parallel to an optically radial direction of the medium.

The central light-receiving section 560 is comprised of a single rectangular light-receiving section.

The front light-receiving section 515, the rear light-receiving section 516, and the central light-receiving section 56o are arranged in parallel with one another. The central light-receiving section 56o is located closer to the rear light-receiving section 516 than the front light-receiving section 515.

The optical head in accordance with the nineteenth embodiment operates as follows.

A light emitted from the laser diode chip 55 enters the prism 57 through the first outer surface 514 so that an optical axis thereof is perpendicular to the first outer surface 514. The light is reflected at the first inner plane 57a by γ%, and the light passes through the first inner plane 57a by (100−γ)%.

The light having been reflected at the first inner plane 57a is reflected at and collected by the reflection mirror 57c. Though there is generated a loss of γ% at the first inner plane 57a, the light having been emitted from the laser diode chip 55 enters the photodiode chip 56 by (100−γ)γ/100%, and is received in the central light-receiving section 56o.

The light having passed through the first inner plane 57a is focused onto the medium through the lens (not illustrated). The light having been reflected at the medium advances the same optical path in an opposite direction, and is reflected at the first inner plane 57a by γ%. The light having been reflected at the first inner plane 57a is reflected again at the second inner plane 57b by 10000/(γ+100)%, and passes through the second inner plane 57b by 100/(γ+100)%.

The light having been reflected at the second inner plane 57b is reflected at the first inner plane 57a by γ%, enters the photodiode chip 56, and is received in the rear light-receiving section 516.

The light having passed through the second inner plane 57b enters the photodiode chip 56, and is received in the front light-receiving section 515.

A focus error signal FE19 is obtained by a spot-size process in accordance with the following equation, based on signals S56a to S56l and S56o detected at the light-receiving sections 56a to 56l and 56o constituting the front, rear and central light-receiving sections 515, 516 and 56o formed on the light-receiving plane 561 of the photodiode chip 56.

FE19=(S56a+S56c+S56k)−(S56b+S56j+S56l)+(S56d+S56f+S56h)−(S56e+S56g+S56i)

A track error signal TE22 is obtained by a push-pull process in accordance with the following equation.

TE22=(S56a+S56c+S56k)+(S56b+S56j+S56l)−(S56d+S56f+S56h)−(S56e+S56g+S56i)

A signal indicative of data to be reproduced can be obtained as a sum of the signals S56a to S56l.

It is possible to accurately control an amount of a light to be emitted from the laser diode chip 56 regardless of degradation with the lapse of time and temperature variation by virtue of the signal S56o obtained by separating a portion of a light collected onto the medium.

The photodiode chip 56 provides power to the laser diode chip 55 through both an electrode 56p on which the Si heat sink 47 is mounted and an electrode 56q making electrical contact with the laser diode chip 56 through the bonding wire 46.

It is not necessary for the Si heat sink 47 to have light-receiving sections unlike the sub-mount 5. Hence, the Si heat sink 47 may be composed of electrically conductive silicon entirely covered with an electrode composed of Ti/Pt/Au/Sn by evaporation, ensuring lower fabrication cost than the sub-mount 5.

The laser diode chip 55 and the photodiode chip 56 are fixedly installed in such a position that the beam spot 58a is uniformly divided by the a division line 56m partitioning the light-receiving sections 56a, 56b and 56c from the light-receiving sections 56d, 56e and 56f, and that the beam spot 58b is uniformly divided by a division line 56n partitioning the light-receiving sections 56g, 56h and 56i from the light-receiving sections 56j, 56k and 56l.

However, the beam spots 68a and 58b deviate in an x-axis direction, if the laser diode chip 55 and the photodiode chip 56 are assembled containing assembling error therein. In accordance with the present embodiment, even if such assembling error exists in the laser diode chip 55 and the photodiode chip 56, −(S56g+S56h+S56i)+(S56j+S56k+S56l) is decreased (or increased) to a degree to which (S56a+S56b+S56c)−(S56d+S56e+S56i) is increased (or decreased). Hence, they are cancelled with each other, ensuring no track offset.

Each of the first and second inner planes 57a and 57b makes an angle of 45 degrees relative to the first outer surface 511 of the prism 57, and the photodiode chip 56 makes an angle of 90 degrees relative to the first outer surface 511 of the prism 57. Hence, even if the Si heat sink 47 would have a thickness different from a designed thickness, and accordingly, a light-emitting point of the laser diode chip 55 is deviated relative to the photodiode chip 56 in a y-axis direction, a relative positional relation in a direction of an optical axis between the laser diode chip 55 and the photodiode chip 56 remains unchanged, ensuring that there is not generated focus offset caused by the deviation in the light-emitting point of the laser diode chip 55.

When a focus error signal is to be detected by a spot-size process, a size of a beam spot formed on the photodiode chip 56 varies to a greater degree relative to a deviation of the medium in an optical axis direction, as an optical length between front and rear light-converging points of the photodiode chip 56 positioned so that the medium is located on a light-converging point of the lens, and the photodiode chip 56 is set shorter.

Herein, considering the facts that a ratio of variation in a size of a beam spot has a relation with sensitivity of a focus error signal, and that an optical length between the light-converging point and the photodiode chip is equal to a half of a distance between the first and second inner planes 57a and 57b, it is 101 understood that a shorter distance between the first and second inner plane 57a and 57b ensures a focus error signal to have greater sensitivity.

In the prism 7 in the above-mentioned first to third embodiments, even if a distance between the first and second inner planes 57a and 57b is intended to narrow in order to prevent a light having been reflected at the first inner plane 7a from being reflected again at the second inner plane 7b, there is a limitation in doing so. However, a distance between the first and second inner planes 57a and 57b can be narrowed to an intended degree, because a light is reflected twice at the first inner plane 57a in an optical path from the medium to the photodiode chip 56.

In addition, it was necessary to form the base 17d or 23c under the prism 17 or 23 in the fourth to tenth embodiments. To the contrary, the nineteenth embodiment makes it no longer necessary to form a base such as the base 17d or 23c under the prism 57, ensuring enhancement in productivity of an optical head.

Furthermore, since the optical head is no longer necessary to include a base, if an alignment mark is formed on the photodiode chip 56, the prism 57 can be accurately assembled on the photodiode chip 56 by aligning a line at which the second inner plane 57b makes contact with the photodiode chip 56, to the alignment mark.

When a light is radiated to a prism, a light enters the prism at a plane at various incident angles, and is diverged. It is quite difficult to provide the same reflectance and transmittance to all incident angles. However, in accordance with the present embodiment, a light directing from the laser diode chip 55 to the lens is diverged only once at the first inner plane 57a, there would be small dispersion in an intensity profile of the light.

In the present embodiment, the laser diode chip 55 is positioned so that an optical length between the laser diode chip 55 and the first inner plane 57a is equal to (a+b+3c)/2, wherein "a" indicates an optical length between the first inner plane 57a and the rear light-receiving section 516, "b" indicates an optical length between the second inner plane 57b and the front light-receiving section 515, and "c" indicates an optical length between the first and second inner planes 57a and 57b. Hence, an optical length d between the laser diode chip 55 and the first outer surface 511 is equal to c/2, which means that a big gap is formed therebetween. As a result, even if the laser diode chip 55 is positioned slightly out of place in assembling, it would be possible to keep the laser diode chip 55 from making abutment with the prism 57.

In accordance with the present embodiment, since the laser diode chip 55 emits a light in parallel with the photodiode chip 56, an optical head can be designed to have a reduced thickness equal to a sum of thicknesses of the prism 57 and the photodiode chip 56.

In accordance with the present embodiment, since the focus error signal FE19 is detected in the form of variation in a size of the beam spots 58a and 58b in a z-axis direction, and the track error signal component is detected in the form of variation in an amount of a light of the beam spots 58a and 58b in an x-axis direction, the track error signal component is unlikely to be mixed into the focus error signal FE19.

The nineteenth embodiment allows the laser diode chip 55 to emit a light polarized in any direction, and is not influenced even when the medium is composed of material having birefringence.

In the nineteenth embodiment, various methods of detecting a focus error signal, a track error signal and a data reproducing signal may be used by replacing the photodiode chip 56 with another photodiode chip, as having been described in the second embodiment in which the photodiode chip 6 in the first embodiment is replaced with the photodiode chip 14, and in the third embodiment in which the photodiode chip 6 in the first embodiment is replaced with the photodiode chip 15.

As the lens to be used in the present embodiment, there may be used a single finite lens or a combination of a collimate lens and an objective lens. The combination may include a beam splitter located between the collimate lens and the objective lens for separating a light directing to the medium from the laser diode chip 55, or a light directing to the photodiode chip 56 from the medium. This ensures these lights to be parallel lights in the case that the medium is located on a light-converging point of the objective lens. Hence, these lights could be readily dealt with.

The medium mentioned in the present embodiment includes an optical disc, an optical tape, and the like, and is composed of phase-change material or photo-electromagnetic material, for instance.

The above-mentioned constant x may be selected from a value in the range of 0 to 100. A light utilization efficiency in data reproduction could be maximized, if the constant γ is set equal to 61.8. However, since the central light-receiving section 56o receives a light too much in comparison with the other light-receiving sections, if the constant γ is set equal to 61.8, it would be better to set a reflectance of the reflection mirror 57c to be equal to about 10%.

Twentieth Embodiment

Figure 36:
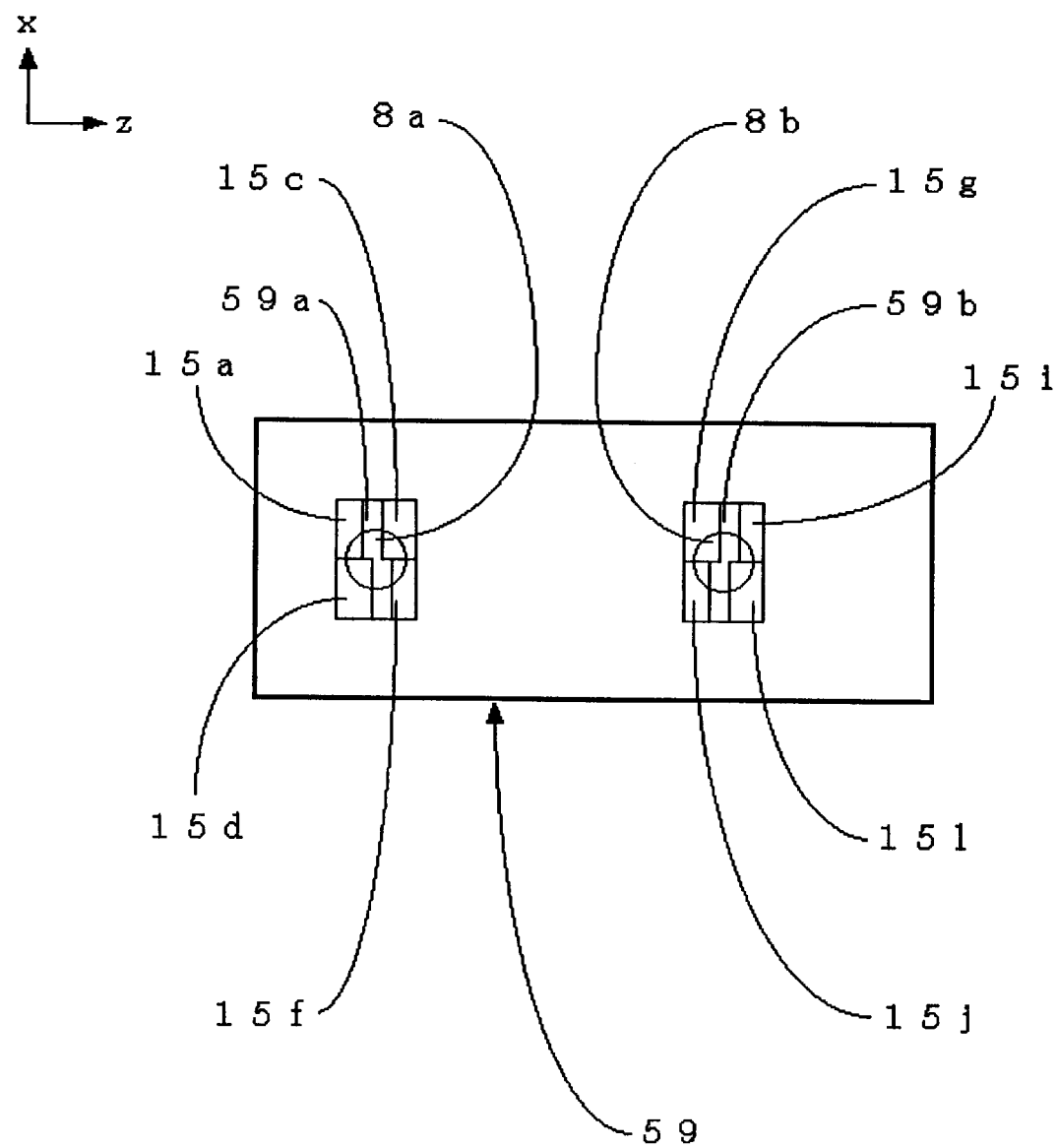
FIG. 36 is a top plan view illustrating a photodiode chip constituting an optical head in accordance with the twentieth embodiment of the present invention.

An optical head in accordance with the twentieth embodiment has almost the same structure as the structure of the optical head in accordance with the third embodiment illustrated in FIG. 9, but is different only in that the photodiode chip 15 in the third embodiment is replaced with a photodiode chip 59. FIG. 36 is a plan view of the photodiode chip 59.

The optical head in accordance with the third embodiment is assembled in such a manner that a center of the beam spot 8a is coincident with a center of the rear light-receiving section 87, and that a center of the beam spot 8b is coincident with a center of the front light-receiving section 86. However, when the photodiode chip 15 is fixed, the centers of beam spot and the light-receiving section may be deviated with each other.

Figure 37A:
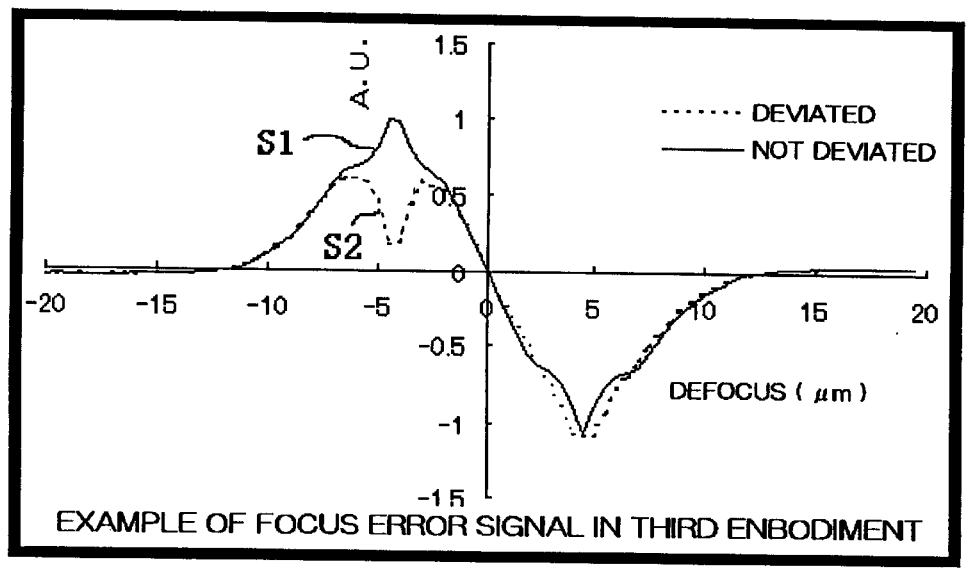
FIG. 37A illustrates a waveform of a focus error signal detected in the optical head in accordance with the third embodiment.

FIG. 37A illustrated an example of a focus error signal detected by the optical head in accordance with the third embodiment.

If the beam spots 8a and 8b are deviated in both x- and z-axes directions, a focus error signal is shifted from a signal S1 represented with a solid line to a signal S2 represented with a broken line. A focus servo has a parameter established based on a waveform of a focus error signal. Hence, if the beam spots 8a and 8b are deviated as mentioned above, a focus error signal would have such a recess as illustrated in FIG. 37A, which would cause the focus servo to be improper.

The reason why the focus error signal has a recess if the beam spots 8a and 8b are deviated is that a beam spot would have a smaller size as an optical disc is deviated from a light-converging point of a lens to a greater degree, and thus, the beam spot 8a might be no longer in alignment with the twelfth light-receiving section 15b or the ninth light-receiving section 15e, or the beam spot 8b might be no longer in alignment with the fifth light-receiving section 15h or the fourth light-receiving section 15k.

Thus, the optical head in accordance with the twentieth embodiment is designed to include the photodiode chip 59 which is capable of preventing the above-mentioned matter, in place of the photodiode chip 15.

The photodiode chip 59 in the twentieth embodiment is designed to include a thirteenth light-receiving section 59a in place of the ninth and twelfth light-receiving sections 15e and 15b in the third embodiment, and a fourteenth light-receiving section 59b in place of the fourth and fifth light-receiving sections 15k and 15h in the third embodiment.

The photodiode chip 59 in the twentieth embodiment has the same structure as the structure of the photodiode chip 15 in the third embodiment except the thirteenth and fourteenth light-receiving sections 59a and 59b. Hence, the light-receiving sections that correspond to those of the photodiode chip 15 illustrated in FIG. 9 have been provided with the same reference numerals.

In the photodiode chip 15 in the third embodiment, illustrated in FIG. 9, the ninth and twelfth light-receiving sections 15e and 15b are positioned adjacent to each other so that one of longer sides of them are in alignment in a line. On the other hand, in the photodiode chip 59 in the twentieth embodiment, illustrated in FIG. 36, the thirteenth light-receiving section 59a has a shape obtained by arranging the ninth and twelfth light-receiving sections 15e and 15b in the third embodiment in such a manner that shorter sides of them partially overlap each other. That is, the thirteenth light-receiving section 59a is crank-shaped. Similarly, the fourteenth light-receiving section 59b has a shape obtained by arranging the fourth and fifth light-receiving sections 15k and 15h in the third embodiment in such a manner that shorter sides of them partially overlap each other. That is, the fourteenth light-receiving section 59b is crank-shaped.

Figure 37B:
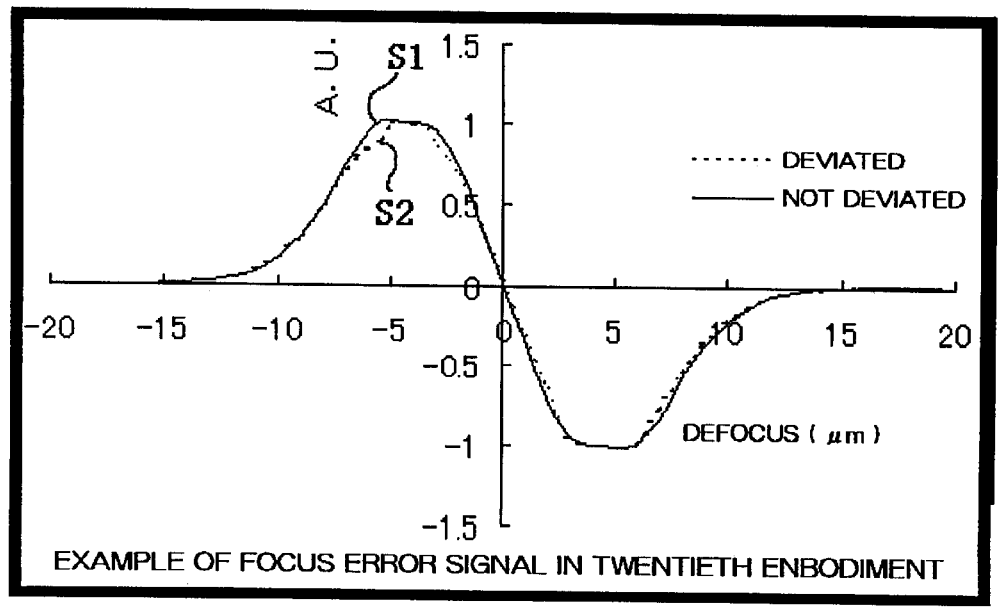
FIG. 37B illustrates a waveform of a focus error signal detected in the optical head in accordance with the twentieth embodiment.

FIG. 37B illustrates an example of a focus error signal detected by the optical head in accordance with the twentieth embodiment.

If the beam spots 8a and 8b are deviated in both x- and z-axes directions, a focus error signal is shifted from a signal Si represented with a solid line to a signal S2 represented with a broken line. However, the shift from the signal S1 to the signal S2 is quite small. That is, as illustrated in FIG. 37B, there is almost no difference in a waveform between the signals S1 and S2.

The reason is as follows. In the twentieth embodiment, the ninth and twelfth light-receiving sections 15e and 15b in the third embodiment are replaced with the thirteenth light-receiving section 59a, and the fourth and fifth light-receiving sections 15k and 15h in the third embodiment are replaced with the fourteenth light-receiving section 59b, to thereby extend a length the light-receiving section associated with the beam spots 8a and 8b in a z-axis direction. Hence, even if the beam spots 8a and 8b are deviated in both x- and z-axes directions, the beam spots 8a and 8b will not be over the thirteenth and fourteenth light-receiving sections 59a and 59b.

Similarly to the twentieth embodiment, in the sixth embodiment illustrated in FIG. 13, the problem that a focus error signal has a recess in its waveform can be solved by further extending the fifth and second light-receiving sections 20e and 20b, and the eleventh and eighth light-receiving sections 30l and 20h of the photodiode chip 20, in a z-axis direction.

In the seventh embodiment illustrated in FIG. 14, the problem that a focus error signal has a recess in its waveform can be solved by further extending the light-receiving sections 21e and 21b, and the light-receiving sections 21k and 21h of the photodiode chip 21, in a z-axis direction.

Twenty-first Embodiment

Figure 38:
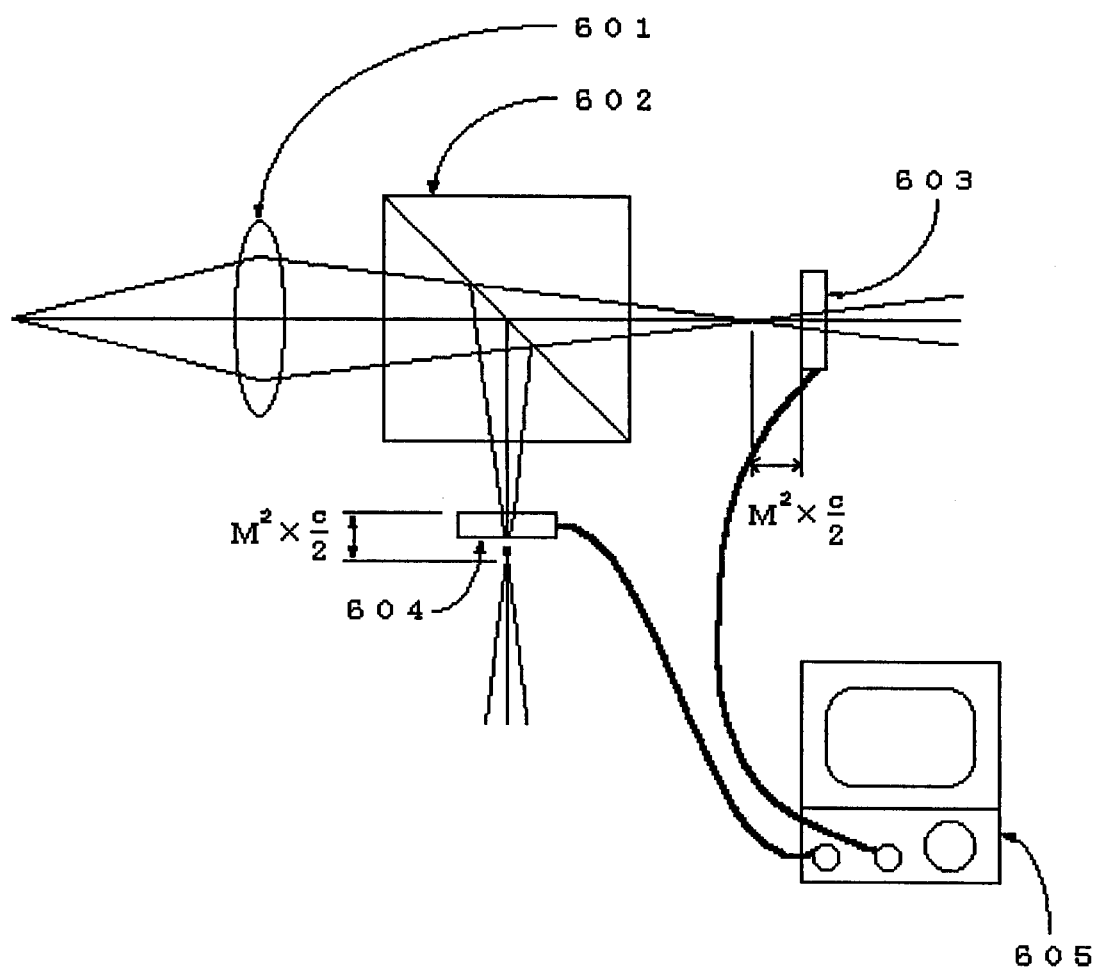
FIG. 38 is a schematic view illustrating an apparatus for fabricating an optical head, in accordance with the twenty-first embodiment of the present invention.

FIG. 38 illustrates an apparatus for fabricating an optical head in accordance with the present invention. The apparatus in accordance with the twenty-first embodiment is used to fabricate the optical head in the above-mentioned first to twentieth embodiments.

The apparatus for fabricating an optical head is comprised of a microscope 601, a beam splitter 602 for splitting images having passed through the microscope 601, into two images, a first charge coupled device 603 located at the rear of an image point of the microscope 601 by a distance of $M^2 \times c/2$ for detecting one of the images split by the beam splitter 602, wherein "M" indicates a magnification of the microscope 601, and "c" indicates an optical length between first and second inner planes of an optical separator constituting an optical head to be fabricated, a second charge coupled device 604 located in front of an image point of the microscope 601 by a distance of $M^2 \times c/2$ for detecting the other of the images split by the beam splitter 602, and a monitor 605 for visualizing signals detected by the first and second charge coupled devices 603 and 604.

The apparatus in accordance with the twenty-first embodiment is used to fix an optical separator such as a prism relative to a laser diode chip and a photodiode chip, when a positional relation between the laser diode chip and the photodiode chip has already been fixed.

The optical separator is installed so that an optical axis thereof passes through centers of rear and front light-receiving sections. If the rear and front light-receiving sections are observed with only a microscope being installed in alignment with an optical axis, the optical head would be optically equivalent to an optical head where a rear light-receiving section, a laser diode chip, and a front light-receiving section are aligned in a line in an optical axis with being spaced from one another by a distance of c/2. Hence, if a light is focused on the rear light-receiving section, it would be impossible to observe the front light-receiving section, and if a light is focused on the front light-receiving section, it would be impossible to observe the rear light-receiving section.

On the other hand, the apparatus in accordance with the twenty-first embodiment makes it possible to observe a signal detected at the second charge coupled device 604, through the rear light-receiving section, and observe a signal detected at the first charge coupled device 603, through the front light-receiving section, by focusing a light onto the laser diode chip.

Figure 39:
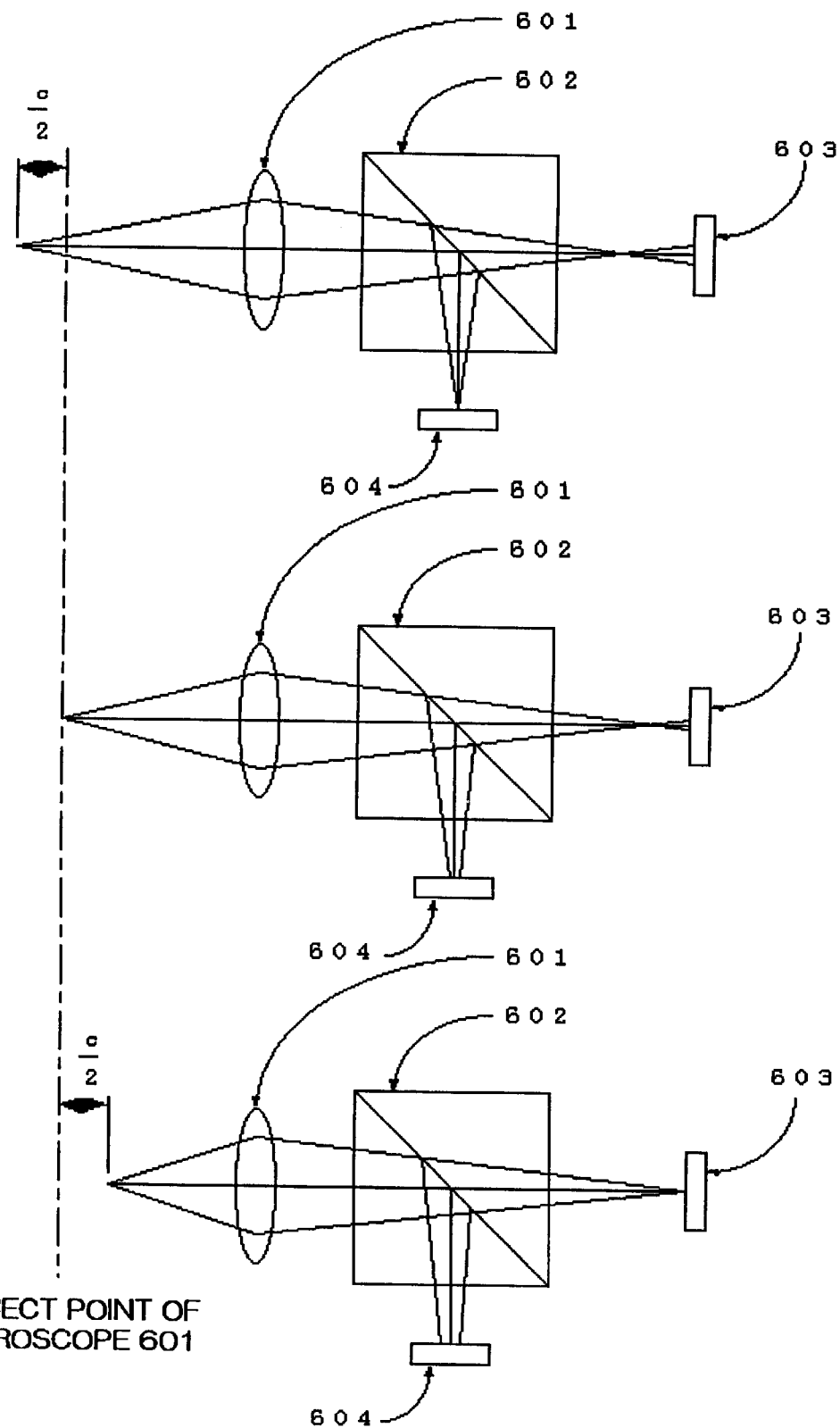
FIG. 39 illustrates where images are focused in the apparatus illustrated in FIG. 38.

This is because that an image of an object (the rear light-receiving section) located at the rear of an object point of the microscope 601 by a distance of c/2 is focused on the second charge coupled device 604, as illustrated in the uppermost illustration in FIG. 39, and also because an image of an object (the front light-receiving section) located in front of an object point of the microscope 601 by a distance of c/2 is focused on the first charge coupled device 603, as illustrated in the lowermost illustration in FIG. 39.

As illustrated in the middle illustration in FIG. 39, an image of an object (the laser diode chip) located at an object point of the microscope 601 is not focused on both the second and first charge coupled devices 604 and 603. Hence, it is observed, when a light is emitted from the laser diode chip, as if beam spots were formed in both the rear and front light-receiving sections.

It would be possible to simultaneously observe both the rear and front light-receiving sections by visualizing both a signal detected by the second charge coupled device 604 and a signal detected by the first charge coupled device 603 through the monitor 605. The optical separator can be installed in such a manner that an optical axis passes through centers of the rear and front light-receiving sections, by aligning a center of a light-emitting point of the laser diode chip which would be out of focus and be observed as if it were a beam spot, with the centers of the rear and front light-receiving sections.

In the apparatus in accordance with the twenty-first embodiment, in contrast with the arrangement illustrated in FIG. 38, the second charge coupled device 604 may be located at the rear of an image point of the microscope 601 by a distance of $M^2 \times c/2$, and the first charge coupled device 603 may be located in front of an image point of the microscope 601 by a distance of $M^{2 \times c}/2$.

The apparatus in accordance with the twenty-first embodiment is designed to include the monitor 605, because the optical separator is manually adjusted by an operator. However, if a robot would adjust the optical separator, it is not always necessary for the apparatus to include the monitor 605.

Twenty-second Embodiment

Figure 40:
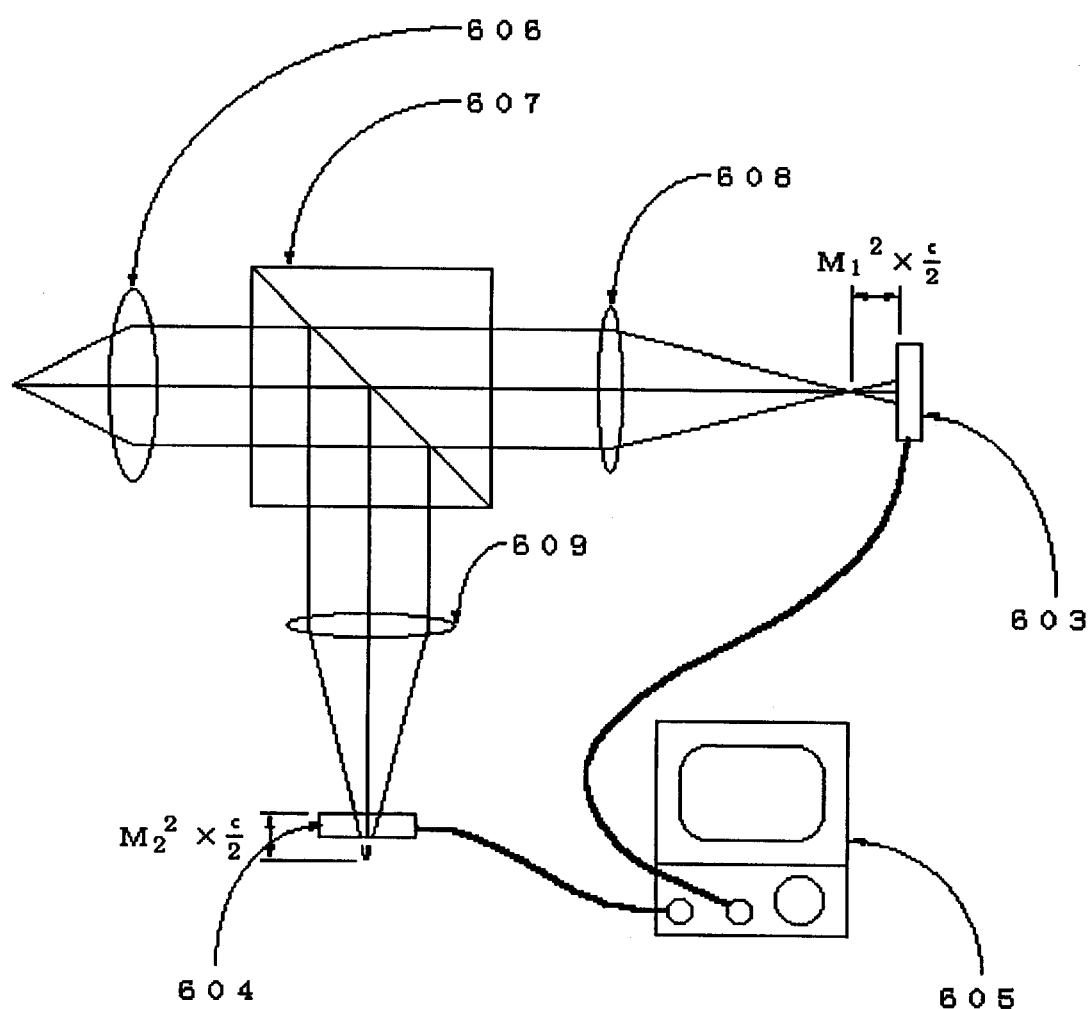
FIG. 40 is a schematic view illustrating an apparatus for fabricating an optical head, in accordance with the twenty-second embodiment of the present invention.

FIG. 40 illustrates an apparatus for fabricating an optical head in accordance with the present invention. The apparatus in accordance with the twenty-second embodiment is used to fabricate the optical head in the above-mentioned first to twentieth embodiments, similarly to the apparatus in accordance with the twenty-first embodiment, illustrated in FIG. 38.

The apparatus for fabricating an optical head, in accordance with the twenty-second embodiment is comprised of an objective lens 606, a beam splitter 607 for splitting images focused by the objective lens 606, into at least two images, a first eye-piece lens 608 for focusing one of images split by the beam splitter 607, a second eye-piece lens 609 for focusing the other of images split by the beam splitter 607, a first charge coupled device 603 located at the rear of a focal point of the first eye-piece lens 608 by a distance of $M_1^2 \times c/2$ wherein "$M_1$" indicates a combined magnification of the objective lens 606 and the first eye-piece lens 608, and "c" indicates an optical length between first and second inner planes of an optical separator constituting an optical head to be fabricated, a second charge coupled device 604 located in front of a focal point of the second eye-piece lens 609 by a distance of $M_2^2 \times c/2$ wherein "$M_2$" indicates a combined magnification of the objective lens 606 and the second eye-piece lens 609, and a monitor 605 for visualizing signals detected by the first and second charge coupled devices 603 and 604.

The apparatus in accordance with the twenty-second embodiment operates in the same way as the apparatus in accordance with the twenty-first embodiment, and provides the same advantages as those of the apparatus in accordance with the twenty-first embodiment.

While the present invention has been described in connection with the preferred embodiments, the present invention provides various advantages as follows.

The first advantage is that the present invention makes it possible to fabricate an optical head in a smaller thickness.

This is because that the first and third outer surfaces of the prism are parallel with each other, and a light emitted from the laser diode chip towards the lens enters the prism at the first surface with an optical axis being perpendicular to the first surface, and leaves the prism at the third outer surface with an optical axis being perpendicular to the third outer surface, and hence, an optical head can be designed to have a reduced thickness equal to a sum of thicknesses of the optical separator and the photodiode chip.

The second advantage is that there is no optical loss in the optical separator.

The reason is as follows. A light directing towards the lens from the laser diode chip enters the prism at the first outer surface, passes through the first inner plane (or the first and second inner planes, or the first to third inner planes), leaves the prism at the third outer surface, is converted into a circularly polarized light from a linearly polarized light by means of the quarter wavelength plate, and is focused onto a medium through the lens. A light reflected at the medium is converted into a linearly polarized light having an orientation perpendicular to an original orientation, from a circularly polarized light by the quarter wavelength plate, enters the prism at the third outer surface, is reflected at the second inner plane by half, and passes through the second inner plane by half. The light having been reflected at the second inner plane leaves the prism at the second outer surface, and is received in a light-receiving section formed on a light-receiving plane of the photodiode chip. The light having been passed through the second inner plane leaves the prism at the second outer surface, and is received in another light-receiving section formed on a light-receiving plane of the photodiode chip. Thus, a light separated by the optical separator is received in any of light-receiving sections, ensuring no optical loss in the optical separator.

The third advantage is that the optical separator is superior in productivity.

The reason is as follows. Since the first and third outer surface are parallel to each other, and the first and second inner planes are parallel to each other, the optical separator can be fabricated by steps of depositing a plurality of glass plates each coated with a coating, cutting the thus deposited glass plates into slices, optically polishing each of the slices and then cutting the optically polished slices into bar-shaped optical separators, and dicing each of the bar-shaped optical separators into a chip. Thus, the optical head can be fabricated a lot at a time, ensuring enhanced productivity.

If the fourth and second outer surfaces are arranged parallel to each other, the slice can be efficiently cut into the bar-shaped optical separators, which would save fabrication costs, and hence, further enhance productivity.

The fourth advantage is that a light-emitting point of the laser diode chip is deviated relative to the photodiode chip in a direction perpendicular to a light-receiving plane, focus offset caused by such deviation is not generated.

This is because since the first inner plane is inclined by 45 degrees relative to the first outer surface, and the second outer surface is perpendicular to the first outer surface, a relative positional relation in a direction of an optical axis between the laser diode chip and the photodiode chip is kept unchanged.

The fifth advantage is that a component of the track error signal is not mixed into the focus error signal.

The reason is as follows. If the medium is deviated from a light-converging point of the lens in a direction of an optical axis, the beam spots to be formed on the photodiode chip vary in size. In the optical head in accordance with the present invention, the focus error signal is detected based on variation in a size of the beam spots in an optically tangential direction. Hence, if the track error signal component is observed as variation in a light amount of the beam spot in an x-axis direction, the focus error signal is detected as variation in a size of the beam spot in a z-axis direction, and if the track error signal component is observed as variation in a light amount of the beam spot in a z-axis direction, the focus error signal is detected as variation in a size of the beam spot in an x-axis direction. Thus, the component of the track error signal is unlikely to be mixed into the focus error signal.

The sixth advantage is that the optical head could have a great tolerance in a direction perpendicular to an optical axis of the laser diode chip and parallel to a light-receiving plane of the photodiode chip.

This is because it is possible to make the beam spot formed by a light reflected at the third or second inner plane, larger in size.

The seventh advantage is that track offset is hardly generated, even if the diffraction device is deviated in a plane perpendicular to an optical axis.

The reason is that it is possible to allow a light reflected at the medium to have a great diameter in the diffraction device.

The eighth advantage is that a tolerance of the diffraction device in an optically tangential direction is infinite, unless the tolerance is out of the diffraction device.

This is because that the diffraction device is divided into first and second regions by a division line parallel to an optically tangential direction and intersecting with an optical axis, and the track error signal is detected based on a difference between an amount of a diffracted light in the first region and an amount of a diffracted light in the second region.

The ninth advantage is that even if an oscillation wavelength of the laser diode chip varies due to temperature fluctuation and so on, and hence, a diffraction angle of a diffracted light emitted from the diffraction device varies, such variation would exert no influence on the track error signal.

The reason is that since the track error signal is detected based on a diffracted light emitted from the diffraction device, a beam spot formed by the diffracted light emitted from the diffraction device is designed not to be cross a plurality of light-receiving sections.

The tenth advantage is that even if a beam spot is deviated in an optically radial direction due to assembling errors of an optical head, there would not be generated track offset, and the focus error signal would not be influenced.

This is because that the photodiode chip does not always have a division line parallel to an optically tangential direction.

The eleventh advantage is that there would be small dispersion in an intensity profile of a light in an optical path from the laser diode chip to the lens.

A light emitted from the laser diode chip towards the lens enters the optical separator at the first outer surface, passes through the first inner plane, leaves the optical separator at the third outer surface, and is focused into the medium through the lens. When a light is radiated to the optical separator, the light enters the optical separator at a plane at various incident angles, and is diverged. It is quite difficult to provide the same reflectance and transmittance to all incident angles. However, a light directing from the laser diode chip 1 to the lens is diverged only once at the first inner plane, there would be small dispersion in an intensity profile of the light.

The twelfth advantage is that even if the laser diode chip is positioned slightly out of place in assembling, it would be possible to prevent the laser diode chip from making abutment with the optical separator.

The reason is as follows. The laser diode chip is positioned so that an optical length between the laser diode chip and the first inner plane is equal to $(a+b+3c)/2$ wherein "a" indicates an optical length between the first inner plane and the rear light-receiving section, "b" indicates an optical length between the second inner plane and the front light-receiving section, and "c" indicates an optical length between the first and second inner planes. Hence, if the first inner plane is arranged to be inclined by 45 degrees relative to the first outer surface, and the second outer surface is arranged perpendicular to the first outer surface, an optical length between the laser diode chip and the first outer surface is equal to $c/2$, which means that a big gap is formed therebetween. As a result, even if the laser diode chip is assembled slightly out of place, it would be possible to keep the laser diode chip from making abutment with the optical separator.

The thirteenth advantage is that the optical head allows the laser diode chip to emit a light polarized in any direction, and is not influenced even when the medium is composed of material having birefringence.

This is because that the optical separator can be designed to have no polarization.

The fourteenth advantage is that the optical head is less influenced by noises in an electronic amplifier.

For instance, in the above-mentioned sixth embodiment, wirings associated with the eleventh, tenth, fifth and fourth light-receiving sections can be collected into a single wiring, and wirings associated with the twelfth, ninth, sixth and third light-receiving sections can be collected into a single wiring. Thus, a current per a wiring can be increased by bundling wirings as much as possible, which ensures less influence caused by noises in an electronic amplifier.

The fifteenth advantage is that even if an amount of a light forwardly emitted from the laser diode chip is not coincident with an amount of a light backwardly emitted from the laser diode chip in dependence on surrounding situations, it would be possible to accurately measure an amount of a light focused onto the medium.

The reason is as follows. A light emitted from the laser diode chip towards the lens is reflected at any one of the first to third inner planes by $\beta\%(0<\beta<100)$. The thus reflected light is reflected and collected by the reflection mirror mounted on the fourth outer surface, leaves the optical separator at the second outer surface, and is received in a light-receiving section formed on a light-receiving plane of the photodiode chip. Hence, a part of the light focused onto the medium can be separated to thereby use for measuring an amount of the light to be focused onto the medium.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Applications No. 10-75830 filed on Mar. 24, 1998 and No. 11-16724 filed on Jan. 16, 1999 each including specification, claims, drawings and summary is incorporated herein by reference in its entirety.

What is claimed is:

1. An optical head comprising:
   (a) a laser diode chip;
   (b) a lens for focusing lights emitted from said laser diode chip, onto an object;
   (c) an optical separator for separating lights reflected from said object, from an optical axis of a light directing towards said lens from said laser diode chip; and
   (d) a photodiode chip receiving lights having been separated from said optical axis by said optical separator,
   said optical separator being a square pole in shape defined by a first sidewall, a second sidewall in parallel with said first side wall, and first, second, third and fourth outer surfaces all perpendicular to both said first and second sidewalls, said first and third outer surfaces being in parallel with each other,
   said optical separator having first and second inner planes both perpendicular to said first and second sidewalls and in parallel with each other, and both being inclined relative to said first outer surface at a predetermined angle,
   said photodiode chip having a light-receiving plane in parallel with said second outer surface,
   a light directing towards said lens from said laser diode chip, entering said first outer surface, passing through said first and second inner planes in this order, leaving said optical separator at said third outer surface, and being focused onto said object by said lens,
   the light having been reflected by said object, entering said third outer surface, passing through said second inner plane by half, and being reflected at said second inner plane by the remaining half,
   the light having been reflected at said second inner plane, leaving said optical separator at said second outer surface, and being received in a front light-receiving section formed on said light-receiving plane of said photodiode chip,
   the light having passed through said second inner plane, being reflected at said first inner plane, leaving said optical separator at said second outer surface, and being received in a rear light-receiving section formed on said light-receiving plane of said photodiode chip,
   said laser diode chip being positioned so that an optical length between said laser diode chip and said first inner plane is equal to (a+b−c)/2 wherein "a" indicates an optical length between said first inner plane and said rear light-receiving section, "b" indicates an optical length between said second inner plane and said front light-receiving section, and "c" indicates an optical length between said first and second inner planes.

2. The optical head as set forth in claim 1, further comprising a base composed of light-permeable material, and located between said optical separator and said photodiode chip.

3. The optical head as set forth in claim 1, further comprising a quarter wavelength plate located between said optical separator and said object, said quarter wavelength plate converting a light having left said third outer surface or said diffraction device to a circularly polarized light from a linearly polarized light, and also converting a light having been reflected at said object from a circularly polarized light to a linearly polarized light having an orientation perpendicular to an original orientation thereof.

4. The optical head as set forth in claim 3, wherein said quarter wavelength plate is formed integral with said optical separator.

5. The optical head as set forth in claim 1, wherein said first inner plane is inclined relative to said first outer surface by 45 degrees, and said second outer surface is perpendicular to said first outer surface.

6. The optical head as set forth in claim 1, wherein said fourth outer surface is in parallel with said second outer surface.

7. The optical head as set forth in claim 1, wherein when said object moves from a converging point of said lens towards an optical axis, and as a result, a size of a beam spot formed on said photodiode chip is varied, a focus error signal is detected based on variation of said size of a beam spot in an optically tangential direction.

8. The optical head as set forth in claim 1, further comprising a half-wave plate associated with a polarization direction of a light emitted from said laser diode chip, located between said laser diode chip and said optical separator.

9. The optical head as set forth in claim 1, wherein said laser diode chip is positioned in parallel with or perpendicularly to a surface of said photodiode chip in accordance with a polarization direction of a light emitted from said laser diode chip.

10. The optical head as set forth in claim 1, further comprising a semiconductor heat sink on which said laser diode chip is to be mounted.

11. The optical head as set forth in claim 1, further comprising a reflection mirror mounted on said fourth outer surface, and wherein a light directing from said laser diode chip towards said lens is reflected at any one of said first to third inner planes by $\beta\%(0<\beta<100)$, and the thus reflected light is reflected and collected at said reflection mirror, leaves said optical separator at said second outer surface, and received at said light-receiving sections formed on said light-receiving plane of said photodiode chip.

12. The optical head as set forth in claim 1, wherein said front and rear light-receiving sections are both comprised of first to 2N-th light-receiving sections (N is a positive integer equal to or greater than 3), said first to 2N-th light-receiving sections being divided from one another by a first division line parallel to an optically tangential direction of said object and (N−1) division lines perpendicular to said first division line.

13. The optical head as set forth in claim 1, wherein said front light-receiving section is comprised of first to sixth light-receiving sections,
   said first, third and fourth light-receiving sections being located at one side of a front first division line parallel to an optically tangential direction of said object, and said fifth, sixth and second light-receiving sections being located at the other side of said front first division line,
   said first, fifth and sixth light-receiving sections being located at one side of a front second division line parallel to an optically radial direction of said object, and said third, fourth and second light-receiving sections being located at the other side of said front second division line, an optical axis of the light reflected at said second inner plane and leaving said optical separator at said second outer surface, passing through an intersection between said front first division line and said front second division line, and wherein said rear light-receiving section is comprised of seventh to twelfth light-receiving sections, said ninth, tenth and seventh light-receiving sections being located at one side of a rear first division line parallel to an optically tangential direction of said object, and said eighth, eleventh and twelfth light-receiving sections being located at the other side of said rear first division line, said ninth, tenth and eighth light-receiving sections being located at one side of a rear second division line parallel to an optically radial direction of said object, and said seventh, eleventh and twelfth light-receiving sections being located at the other side of said rear second division line, an optical axis of the light reflected at said first inner plane and leaving said optical separator at said second outer surface, passing through an intersection between said rear first division line and said rear second division line.

14. The optical head as set forth in claim 13, wherein a front third division line dividing said third and fourth light-receiving sections from each other, a front fourth division line dividing said fifth and sixth light-receiving sections from each other, a rear third division line dividing said ninth and tenth light-receiving sections from each other, and a rear fourth division line dividing said eleventh and twelfth light-receiving sections from each other are all parallel to an optically radial direction of said object.

15. The optical head as set forth in claim 14, wherein said third light-receiving section is located between said front third division line and said front second division line, said fifth light-receiving section is located between said front fourth division line and said front second division line, said ninth light-receiving section is located between said rear third division line and said rear second division line, said eleventh light-receiving section is located between said rear fourth division line and said rear second division line, said third and fifth light-receiving sections overlap each other on said front second division line, and said ninth and eleventh light-receiving sections overlap each other on said rear second division line.

16. The optical head as set forth in claim 11, wherein said reflection mirror is designed to have reflectance of about 10% when $\beta$ and $\gamma$ are both equal to 61.8.

* * * * *